US008436734B2

(12) United States Patent
Kato et al.

(10) Patent No.: US 8,436,734 B2
(45) Date of Patent: May 7, 2013

(54) LABEL TAPE, LABEL TAPE CARTRIDGE, AND LABEL PRODUCING APPARATUS

(75) Inventors: Takaaki Kato, Nagoya (JP); Koshiro Yamaguchi, Kakamigahara (JP); Yasuo Kimura, Ichinomiya (JP); Takamine Hokazono, Kasugai (JP); Yoshinori Maeda, Nagoya (JP)

(73) Assignee: Brother Kodyo Kabushiki Kaisya, Nagoya (JP)

( * ) Notice: Subject to any disclaimer, the term of this patent is extended or adjusted under 35 U.S.C. 154(b) by 1165 days.

(21) Appl. No.: 12/077,358

(22) Filed: Mar. 19, 2008

(65) Prior Publication Data

US 2008/0232886 A1 Sep. 25, 2008

(30) Foreign Application Priority Data

Mar. 22, 2007 (JP) ................................ 2007-075583

(51) Int. Cl.
*G06K 19/077* (2006.01)
*B41J 11/42* (2006.01)

(52) U.S. Cl.
USPC ..................... 340/572.8; 340/572.1; 400/613; 400/583

(58) Field of Classification Search .................. 400/613, 400/583; 340/572.8
See application file for complete search history.

(56) References Cited

U.S. PATENT DOCUMENTS

| | | | | |
|---|---|---|---|---|
| 5,442,188 A * | 8/1995 | Brimbal et al. | ............... | 250/566 |
| 2007/0009306 A1 * | 1/2007 | Harada et al. | ................. | 400/613 |
| 2007/0041772 A1 | 2/2007 | Harada et al. | | |
| 2007/0172290 A1 * | 7/2007 | Nagae et al. | ................. | 400/613 |
| 2009/0002746 A1 | 1/2009 | Niwa et al. | | |

FOREIGN PATENT DOCUMENTS

| | | | |
|---|---|---|---|
| JP | 05147327 A | * | 6/1993 |
| JP | 11309912 A | * | 11/1999 |
| JP | 2004306476 A | * | 11/2004 |
| JP | 2005-314047 A | | 11/2005 |
| JP | 2006-099502 A | | 4/2006 |
| JP | 2006309557 | | 9/2006 |
| WO | 2006/112467 | | 10/2006 |

OTHER PUBLICATIONS

Japanese Office Action in JP 2007-291228 of Mar. 2, 2012.

* cited by examiner

*Primary Examiner* — Daniel J Colilla
(74) *Attorney, Agent, or Firm* — Gerald Levy; McCarter & English, LLP

(57) ABSTRACT

A tag label producing apparatus has a cartridge holder for setting a first roll configured by winding a base tape equipped with identification marks, which include marks formed by two black strips and arranged with a pitch 2Pp and marks formed by one black strip and arranged with the pitch 2Pp, at a plurality of portions, a feeding roller driving shaft that feeds the base tape supplied from the first roll attached to the cartridge holder a print head that makes a predetermined print on the base tape or a cover film to be bonded thereto, and a mark sensor that detects the identification mark on the base tape, and controls the feeding roller driving shaft and the print head in coordination with each other in accordance with the detection result of the identification mark by the mark sensor.

4 Claims, 35 Drawing Sheets

[FIG.28B]

LABEL TAPE, LABEL TAPE CARTRIDGE, AND LABEL PRODUCING APPARATUS

CROSS-REFERENCE TO RELATED APPLICATIONS

This application claims priority from JP 2007-075583, filed Mar. 22, 2007, the contents of which are hereby incorporated by reference.

BACKGROUND

1. Field

The present disclosure relates to a label tape that produces a label with a predetermined print, a label tape cartridge including the label tape, and a label producing apparatus capable of producing a label.

2. Description of the Related Art

There are known RFID (Radio Frequency Identification) systems for contactlessly reading/writing information between a compact RFID tag and a reader (reading device)/writer (writing device). For example, the RFID circuit element provided on an RFID tag (RFID label) in a label form includes an IC circuit part that stores predetermined RFID tag information and an antenna that is connected to the IC circuit part and transmits and receives information, and even when the RFID tag is soiled or disposed at a hidden position, the reader/writer can access the RFID tag information of the IC circuit part (can read/write information), and now the RFID circuit element is being put into practical use in various fields such as asset management, document management in an office, a name plate attached to the breast of a person, and the like.

As a tag label producing apparatus that produces an RFID label having a variety of uses, for example, such an apparatus described in JP, A, 2006-309557 is known. In the tag label producing apparatus according to the prior art, a tag tape is fed out from a tag tape roll wound with a strip-shaped tag tape (label tape) provided with RFID circuit elements at predetermined intervals in a tape longitudinal direction, and thus each RFID circuit element is transported sequentially. Then, during the transport, predetermined RFID tag information generated on the apparatus is transmitted to the antenna of each RFID circuit element via the apparatus antenna to access (read or write) the RFID tag information of the IC circuit part connected to the antenna of the RFID circuit element, and thus the RFID label is completed. At the same time, in the prior art, an identifier (detection target mark) formed on the tag tape with a predetermined constant pitch is detected by an optical method etc. and the tape feeding control and positioning, and further the printing control, communication control, cutting control, etc., associated therewith are carried out based on the detection of the detection target mark.

Recently, a variety of applications are desired with increasing use of the above-mentioned RFID tag and there is arising the need to produce a plurality of kinds of label having different forms.

As an example, it is desired to be capable of selecting the label length according to the number of letters in a print. In other words, on the tag tape, RFID circuit elements are arranged with a predetermined constant pitch, and therefore, the maximum length of a RFID label including the RFID circuit element that can be produced on a single tag tape is determined fixedly. Because of the arrangement, when the number of letters in a print exceeds a certain number, they cannot be placed on the label. One of measures to deal with this can be thought to separately prepare a tag tape on which the RFID circuit elements are arranged with a comparatively long pitch in addition to a tag tape on which the RFID circuit elements are arranged with a normal pitch in accordance with the case where the number of letters in a print exceeds a certain number. Depending on applications, there may be the case where it is desired to increase the length of a tag label regardless of the number of letters in a print.

In addition, there may be the case where, for example, it is desired to produce both a tag label on which a print (or/and RFID circuit element) is arranged unevenly on one side in a tag label longitudinal direction and a tag label on which a print is arranged unevenly on the other side in accordance with an application, in addition to the need for the label length. It is also possible to deal with this case by preparing in advance a plurality of kinds of tag tape corresponding to each case.

When a plurality of kinds of tag tape is prepared as described above, the detection target mark formed on each tag tape for the feeding control etc. also has a plurality of kinds of form corresponding to the above. In the prior art described above, as an example, the forms of the detection target mark (dimension in the tape longitudinal direction) are made different corresponding to the plurality of kinds of tag tape.

However, there arises a need to newly provide a plurality of kinds of forming capability in the manufacturing facilities (facilities for forming the detection target mark on the tag tape) for manufacturing the label tape (tag tape in this example) in order to form the detection target marks in a plurality of kinds of form as described above. Because of the arrangement, there is a possibility that the configuration of the facilities and their control may become complex and the manufacturing cost of the tag tape may increase as a result.

This also applies to the case where a normal label without RFID circuit element (only a print is included) is produced in addition to the case where the RFID label is produced.

In other words, in general, in the label producing apparatus for producing such a label, a label tape is fed out and transported from a label tape roll wound with a strip-shaped label tape. Then, during the transport, a print is made in a predetermined print area of the label tape and thus a label is completed. There is a case where an encircling cut line (half cut line, set so as to encircle the print area) in a substantially rectangular form formed in advance with a predetermined pitch at a plurality of positions in the label tape longitudinal direction and when the label is used, the area surrounded by the encircling cut line is cut off and affixed to an object to be affixed (there are cases where the tape is cut and where not). When such a label is produced, similar to the above, the detection target mark is formed on the label tape in advance with a pitch associated with the pitch of the encircling cut line and then the tape feeding control and positioning, and further, the printing control etc. associated therewith are carried out based on the detection of the detection target mark.

When preparing a plurality of kinds of label tape in order to deal with the same need as above, it is necessary to form the detection target mark in a plurality of kinds of form on the label tape. Because of the arrangement, similar to the above, there is a possibility that the configuration of the manufacturing facilities (facilities for forming the detection target mark on the label tape) for producing the label tape and their control may become complex and the manufacturing cost of the label tape may increase as a result.

SUMMARY

An object of the present disclosure is to provide a label tape, a label tape cartridge, and a configuration of a label producing apparatus that enable simplification in the structure and control of facilities for forming a detection target mark on the label tape.

In order to achieve the above object, the first aspect is a label tape for producing a label to be affixed on an object to be affixed, comprising a detection target mark arranged with a fixed pitch at a plurality of portions in a tape longitudinal direction, the detection target mark at the plurality of portions including a first detection target mark formed into a first form and arranged with a first fixed pitch and a second detection target mark formed into a second form different from the first form and arranged with a second fixed pitch.

In the first aspect in the present application, even in the case where labels having a variety of lengths are produced using the label tape, it is made possible to smoothly carry out the feeding to a predetermined position and the control of positioning for printing on the tape, cutting, etc., by identifying the first detection target mark and the second detection target mark having different forms of the detection target marks to be detected during the period of feeding for use in accordance with the label length.

As described above, by adopting a method in which the detection target marks in a plurality of different kinds of form are prepared and are identified for use, it is possible to make common all the fixed pitches of the detection target marks provided on labels even if there is a plurality of kinds of label tape having different array regularities of encircling cut line or RFID circuit element in order to produce labels of a variety of lengths. Because of the arrangement, the facilities for forming the detection target mark of the label tape will suffice if equipped with a function of forming the detection target mark with only the above single fixed pitch (it is no longer necessary to change the pitch of the detection target mark for each type of tape), and therefore, the structure and control thereof can be simplified. As a result, the manufacturing cost of the label tape can be reduced.

In order to achieve the above object, the second aspect is a label tape cartridge comprising a label tape roll configured by winding a label tape for producing a label to be affixed to an object to be affixed and configured to be detachable with respect to a label producing apparatus, the label tape including: detection target marks arranged with a fixed pitch at a plurality of portions in a tape longitudinal direction, and the detection target marks at the plurality of portions having: a first detection target mark formed into a first form and arranged with a first fixed pitch; and a second detection target mark formed into a second form different from the first form and arranged with a second fixed pitch.

In the second aspect in the present application, even in the case where the cartridge is mounted to the label producing apparatus and labels having a variety of lengths are produced using the label tape, it is made possible to smoothly carry out the feeding to a predetermined position and the control of positioning to be executed on the label producing apparatus side for printing on the tape, cutting, etc., by identifying the first detection target mark and the second detection target mark having different forms of the detection target marks to be detected during the period of feeding for use in accordance with the label length.

As described above, by adopting a method in which the detection target marks in a plurality of different kinds of form are prepared and are identified for use on the label producing apparatus side, it is possible to make common all the fixed pitches of the detection target marks provided on labels even if there is a plurality of kinds of label tape having different array regularities of encircling cut line or RFID circuit element in order to produce labels of a variety of lengths. Because of the arrangement, the facilities for forming the detection target mark of the label tape will suffice if only equipped with a function of forming the detection target mark with only the above single fixed pitch (it is no longer necessary to change the pitch of the detection target mark for each type of tape), and therefore, the structure and control thereof can be simplified. As a result, the manufacturing cost of the label tape can be reduced.

The third aspect is a label producing apparatus comprising roll setting part for setting a label tape roll that winds a label tape, a feeding device that feeds the label tape supplied from the label tape roll attached to the roll setting part; a printing device that performs a predetermined print on the label tape or a print-receiving tape to be bonded thereto; a mark detecting device that detects the detection target mark of the label tape; and a coordination control portion that controls the feeding device and the printing device in coordination with each other in accordance with the detection result of the detection target mark by the mark detecting device, wherein the label tape has detection target marks arranged with a fixed pitch at a plurality of portions in a tape longitudinal direction, the detection target marks at the plurality of portions including a first detection target mark formed into a first form and arranged with a first fixed pitch and a second detection target mark formed into a second form different from the first form and arranged with a second fixed pitch In the third aspect of the present application, when the label tape roll is set using the roll setting part, the label tape supplied from the label tape roll is transported by the feeding device and a predetermined print is made on the label tape (or on the print-receiving tape to be affixed thereto), and thus the label is produced.

At this time, in the third aspect of the present application, the detection target marks are arranged with a fixed pitch at a plurality of portions in the tape longitudinal direction of the label tape fed out from the label tape roll. These detection target marks include the plurality of kinds of detection target mark having different forms different from one another, that is, the first detection target mark formed into the first form and the second detection target mark formed into the second form.

With the arrangement, in the case where labels having a variety of lengths are produced using the label tape, it is made possible to smoothly carry out the feeding to a predetermined position and the control of positioning for printing on the tape, cutting, etc., by the linked control of the coordination control portion by identifying the first detection target mark and the second detection target mark having different forms of the detection target marks to be detected by the mark detecting device during the period of feeding for use in accordance with the label length.

As described above, by adopting a method in which the detection target marks in a plurality of different kinds of form are prepared on the label tape side and are identified for use on the label producing apparatus side, it is possible to make common all the fixed pitches of the detection target marks provided on labels even if there is a plurality of kinds of label tape having different array regularities of encircling cut line or RFID circuit element in order to produce labels of a variety of lengths. Because of the arrangement, the manufacturing facilities for forming the detection target mark of the label tape will suffice if only equipped with a function of forming the detection target mark with only the above single fixed pitch (it is no longer necessary to change the pitch of the detection target mark for each type of tape), and therefore, the structure and control thereof can be simplified. As a result, the manufacturing cost of the label tape can be reduced.

BRIEF DESCRIPTION OF THE DRAWING

FIGS. 28A and 28B are explanatory diagrams conceptually representing a relationship between an arrangement pitch of identification mark and an arrangement pitch of RFID circuit element in a variation in which Pt=3Pp holds.

FIG. 37A is its top view and FIG. 37B is its bottom view.

DETAILED DESCRIPTION OF THE PREFERRED EMBODIMENTS

Embodiments of the present disclosure will be described below with reference to the drawings.

A first embodiment of the present disclosure will be described with reference to FIG. 1 to FIG. 18. The present embodiment is an embodiment that aims to make uniform the marks of a plurality of kinds of label tape.

Figure 1:
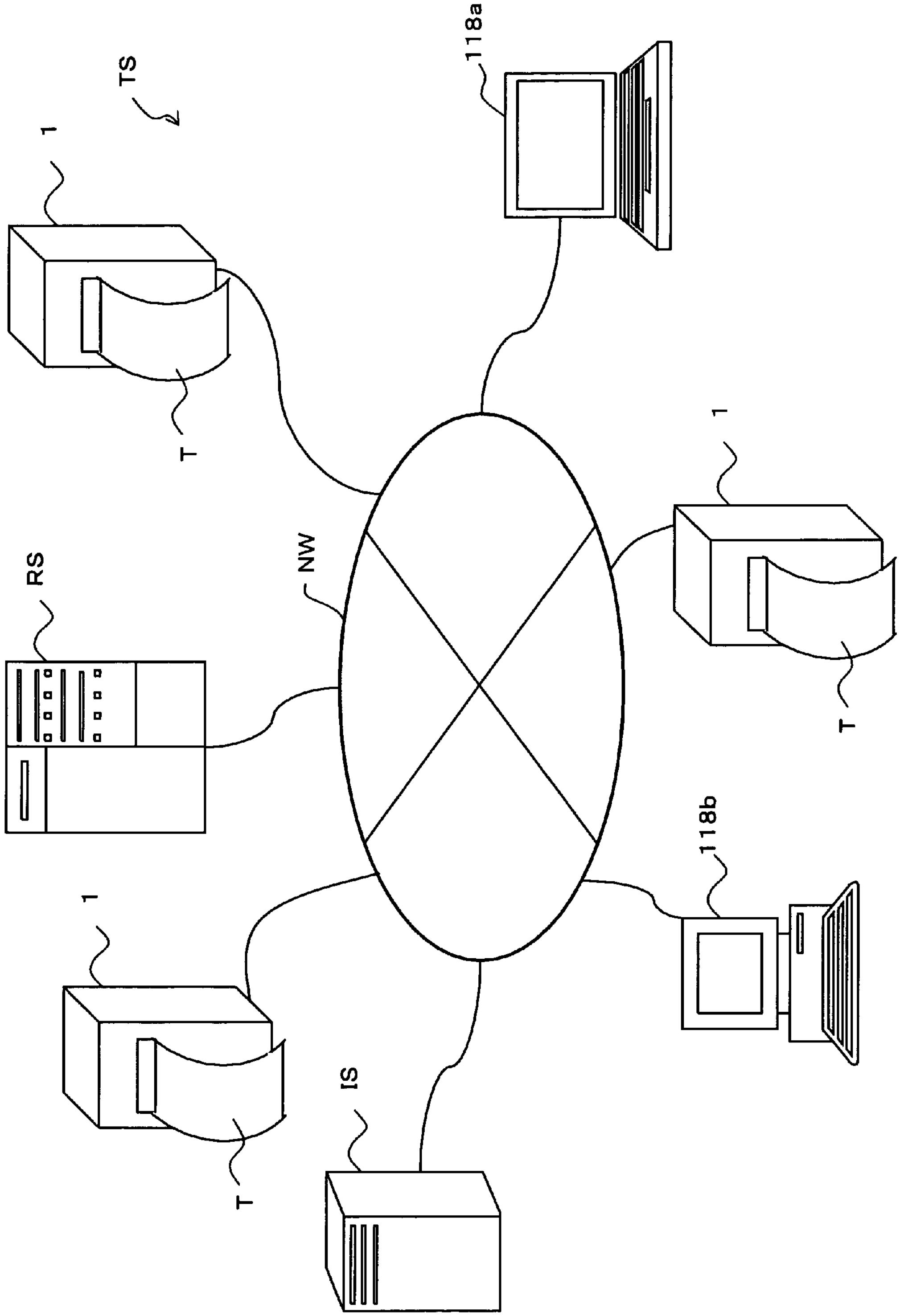
FIG. 1 is a system configuration diagram showing an RFID tag manufacturing system including a tag label producing apparatus in a first embodiment of the present disclosure.

In an RFID tag manufacturing system TS shown in FIG. 1, a tag label producing apparatus 1 in the first embodiment is connected to a route server RS, a plurality of information servers IS, a terminal 118*a*, and a general-purpose computer 118*b* via a wired or wireless communication line NW. The terminal 118*a* and the general-purpose computer 118*b* are collectively referred to simply as "PC118".

Figure 2:
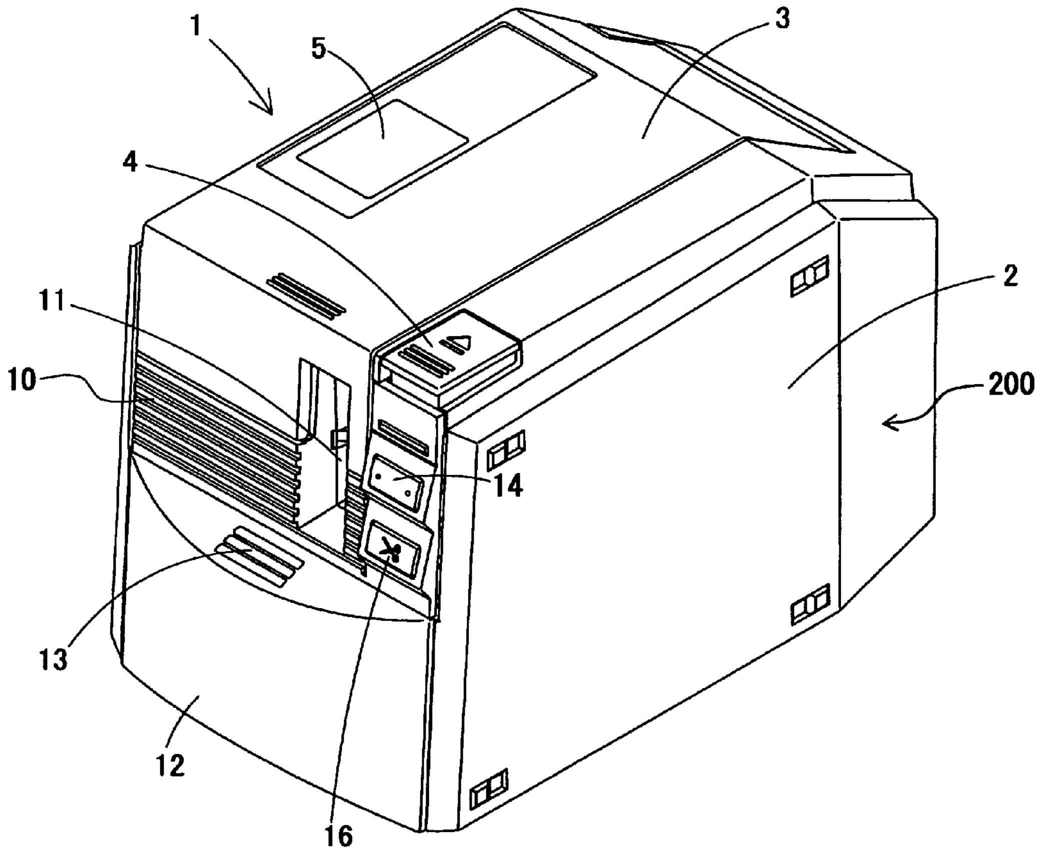
FIG. 2 is a perspective view showing an overall structure of the tag label producing apparatus.

The tag label producing apparatus 1, as shown in FIG. 2, produces an RFID label with print in the apparatus based on the operation from the PC118. The tag label producing apparatus 1 has an apparatus main body 2 having a housing 200 in substantially a shape of hexahedron (substantially a cubic) as its out shell and an opening/closing lid (lid body) 3 provided on the top surface (on the top) of the apparatus main body 2 so that it can open and close (or it may be attached/detached).

The housing 200 of the apparatus main body 2 includes a front wall 10 having a label discharging exit 11 that is situated on the front side (in FIG. 2, on the left-front side) of the apparatus and which discharges an RFID label T (to be described later) produced in the apparatus main body 2 to the outside and a front lid 12 that is provided below the label discharging exit 11 of the front wall 10 and the lower end of which is supported rotatably.

The front lid 12 includes a press part 13 and the front lid 12 is released forward by pressing down the press part 13 from above. In addition, below an opening/closing button 4 of the front wall 10, a power source button 14 that turns on and off the power source of the tag-label producing apparatus 1 is provided. Below the power source button 14, a cutter driving button 16 to drive a cutter mechanism 15 arranged in the apparatus main body 2 by the manual operation of a user is provided and a tag label tape 109 with print (refer to FIG. 4, to be described later) is cut into a desired length by pressing the button 16 and thus the RFID label T (label) is produced (basically, the cutter mechanism 15 performs automatic cutting as will be described later).

The opening/closing lid 3 is rotatably supported by an axis at the end portion on the right-back side of the apparatus main body 2 in FIG. 2 and always biased in the direction of releasing via a biasing member such as a screw etc. Then, when the opening/closing button 4 disposed on the top surface of the apparatus main body 2 so as to be adjacent to the opening/closing lid 3 is pressed, the lock between the opening/closing lid 3 and the apparatus main body 2 is unlocked and released by the action of the above-mentioned biasing member. By the way, on the center-left side of the opening/closing lid 3, a see-through window 5 covered with a transparent cover is provided.

Figure 3:
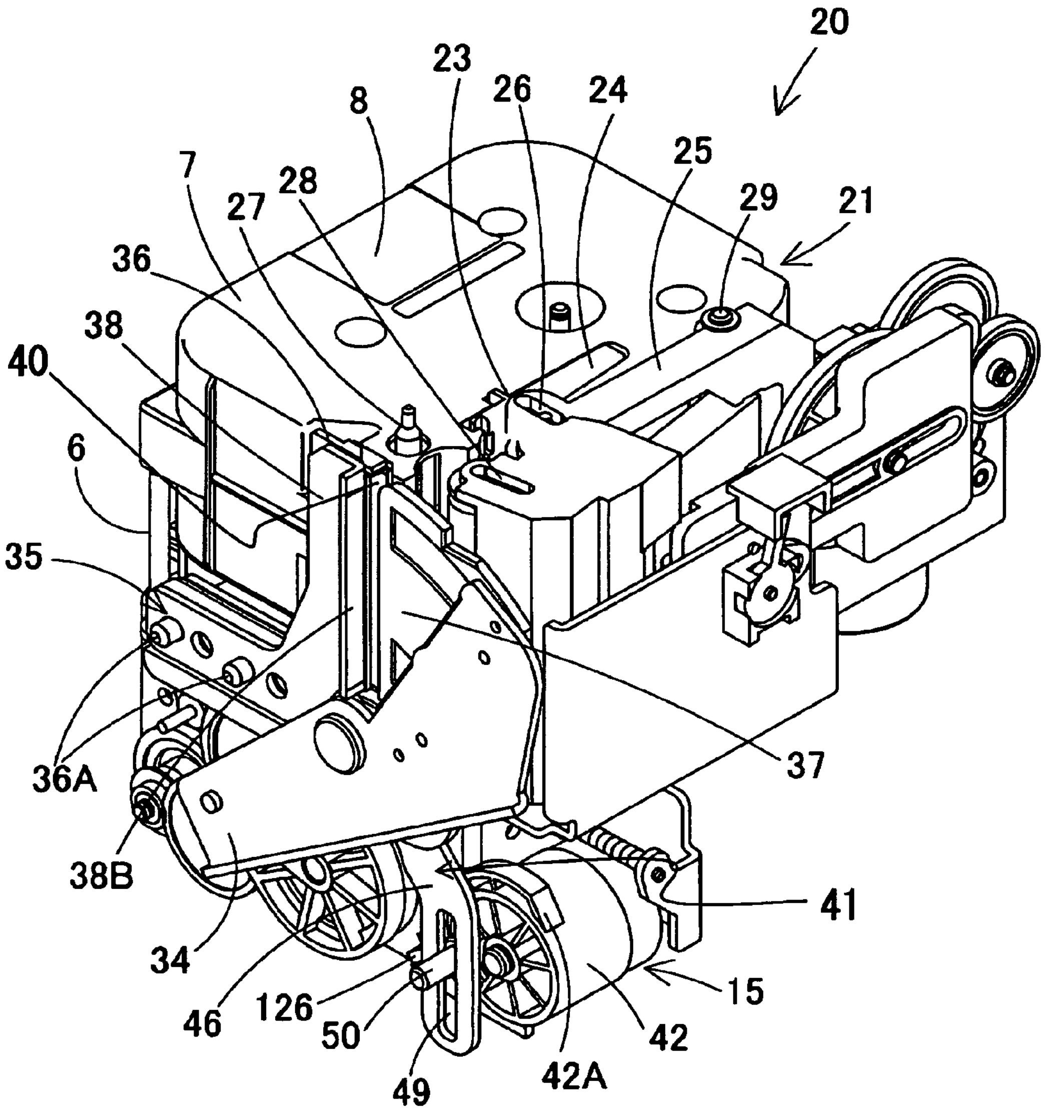
FIG. 3 is a perspective view showing a structure (however, a loop antenna is omitted) of an internal unit of the tag label producing apparatus.

As shown in FIG. 3, an internal unit 20 is arranged inside the tag label producing apparatus 1. The internal unit 20 generally includes a cartridge holder 6 that accommodates a cartridge 7, a printing mechanism 21 that includes a print head 23, a so-called thermal head, the cutter mechanism 15 having a fixed blade 40 and a movable blade 41, and a half-cutting unit 35 having a half cutter 34 and positioned downstream side of the fixed blade 40 and the movable blade 41 in the tape transport direction.

On the top surface of the cartridge 7, for example, a tape specifying display part 8 that displays the width, color, etc., of a base tape 101 incorporated in the cartridge 7. In addition, to the cartridge holder 6, a roller holder 25 is supported rotatably by a support shaft 29 and can be switched between the print position (abutment position, refer to FIG. 4, to be described later) and the release position (departure position) by a switching mechanism. A platen roller 26 and a tape pressure contact roller 28 are arranged rotatably to the roller holder 25 and when the roller holder 25 is switched to the print position, the platen roller 26 and the tape pressure contact roller 28 are pressed and contacted against the print head 23 and a feeding roller 27.

The print head 23 includes a number of heating elements and is attached to a head mounting part 24 erected on the cartridge holder 6.

The cutter mechanism 15 includes the fixed blade 40 and the movable blade 41 made of a metal member. The driving force of a cutter motor 43 (refer to FIG. 8, to be described later) is transmitted to a shaft part 46 of the movable blade 41 via a cutter skew gear 42, a boss 50, and an elongated hole 49 to rotate the movable blade, and thus cutting operation is performed together with the fixed blade 40. The state of cutting is detected by a micro switch 126 that switches by the action of a cutter skew gear cam 42A.

In the half-cutting unit 35, a receiving base 38 and a half cutter 34 are arranged in opposition to each other and further a first guide part 36 and a second guide part 37 are attached to a side plate 44 (refer to FIG. 4, to be described later) by a guide fixing part 36A. The half cutter 34 moves rotatably by the driving force of a half cutter motor 129 (refer to FIG. 8, to be described later) with a predetermined rotation supporting point (not shown) as a center. On the end part of the receiving base 38, a receiving surface 38B is formed.

Figure 4:
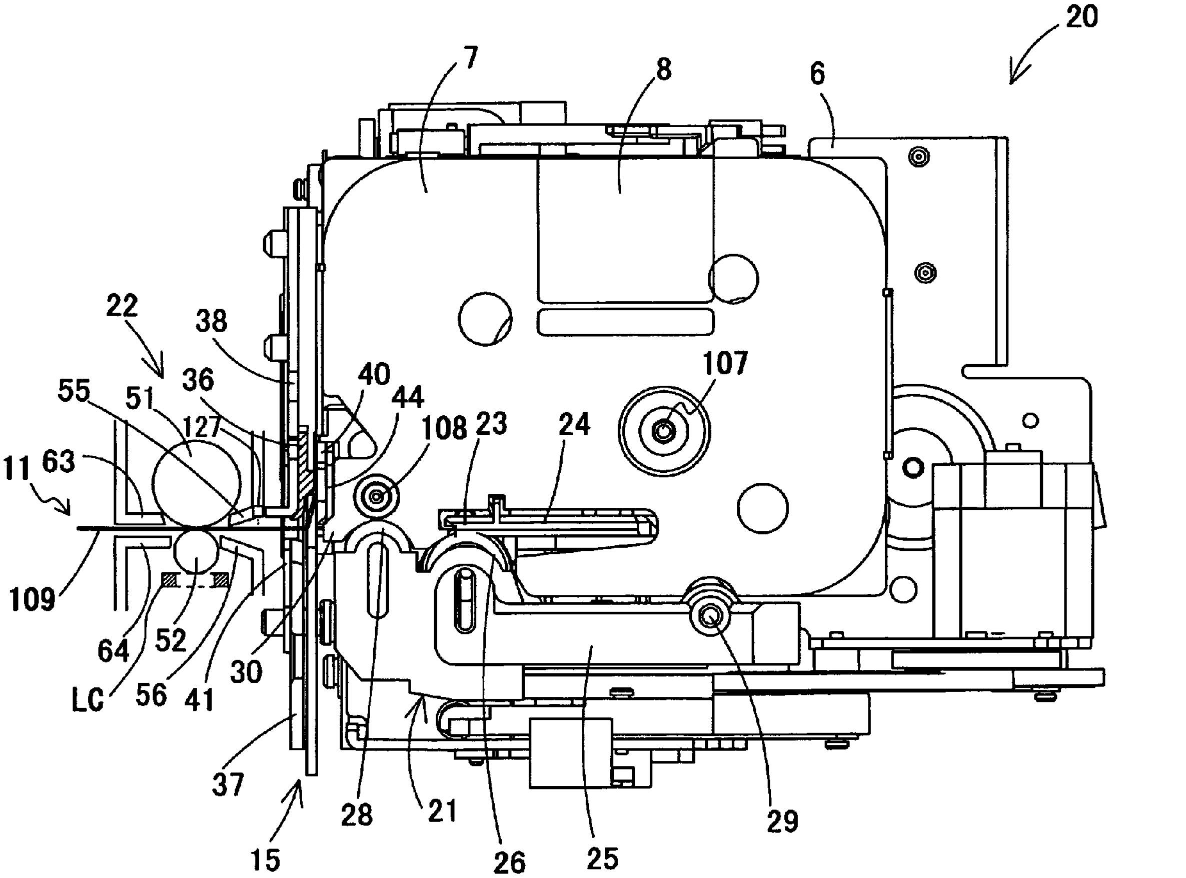
FIG. 4 is a plan view showing the structure of the internal unit shown in FIG. 3.

As shown in FIG. 4, the cartridge holder 6 accommodates the cartridge 7 so that the direction of the width direction of the tag label tape 109 with print discharged from a tape discharging part 30 of the cartridge 7 and further discharged from the label discharging exit 11 is vertical. As will be described later, a plurality of kinds of the cartridge 7 can be mounted to the cartridge holder 6. Then, a cartridge sensor CS (refer to FIG. 8 to be described later) is provided in the cartridge holder 6 in order to detect which of the cartridges 7 is mounted among the plurality of kinds of the cartridge 7 (=cartridge information).

As the cartridge sensor CS, a detection target part (for example, an identifier having a concave shape, convex shape, etc.) provided appropriately on the cartridge 7 side may be detected mechanically using a mechanical switch of contact type etc., or another optical or magnetic detection target part may be provided for optical or magnetic detection. Due to the signal (the detection signal that has detected the detection target part) from the cartridge sensor CS, it is possible to acquire the cartridge information (that is, information about the kind of tape, such as the interval of arrangement of the RFID circuit elements in the base tape 101) of the cartridge 7 mounted to the cartridge holder 6 (details will be described later). As the detection target part, bar code (detected by a bar code sensor instead of the cartridge sensor CS) or another RFID circuit element (detected by an RFID tag information reader instead of the cartridge sensor CS) may be used.

In the internal unit 20, a label discharging mechanism 22 and the loop antenna LC are provided.

The label discharging mechanism 22 discharges the tag label tape 109 with print after being cut in the cutter mechanism 15 (in other words, the RFID label T, and this applies hereinafter) from the label discharging exit 11 (refer to FIG. 2). In other words, the label discharging mechanism 22 has a driving roller 51 that rotates by the driving force of a tape discharging motor 123 (refer to FIG. 8, to be described later), a pressure roller 52 that opposes the driving roller 51 with the tag label tape 109 with print being sandwiched in between, and a mark sensor 127 that detects an identification mark PM (refer to FIG. 5 to be described later) provided on the tag label tape 109 with print. At this time, inside the label discharging exit 11, first guide walls 55, 56 and second guide walls 63, 64 that guide the tag label tape 109 with print to the label discharging exit 11 are provided. The first guide walls 55, 56 and the second guide walls 63, 64 are formed integrally into one body, respectively, and arranged with a predetermined distance in between at the discharging position of the tag label tape 109 with print (the RFID label T) cut by the fixed blade 40 and the movable blade 41.

The loop antenna LC is arranged in the vicinity of the pressure roller 52 while the pressure roller 52 is positioned in the center thereof in the radial direction and adapted to access (read or write information to or from) an RFID circuit element To provided on the base tape 101 (the tag label tape 109 with print after bonded, and this applies hereinafter) via wireless communication by magnetic induction (electromagnetic induction, magnetic coupling, and other non-contact systems via magnetic field are included).

At the time of reading or writing as described above, the correspondence relationship between the tag ID of the RFID circuit element To of the produced RFID label T and the information read from its IC circuit part 151 (or the information written into the IC circuit part 151) is stored in the route server RS and can be referred to when necessary.

A feeding roller driving shaft 108 and a ribbon take-up roller driving shaft 107 give a feeding driving force to the tag label tape 109 with print and an ink ribbon 105 (to be described later), respectively, and are rotatably driven in coordination with each other.

Figure 5:
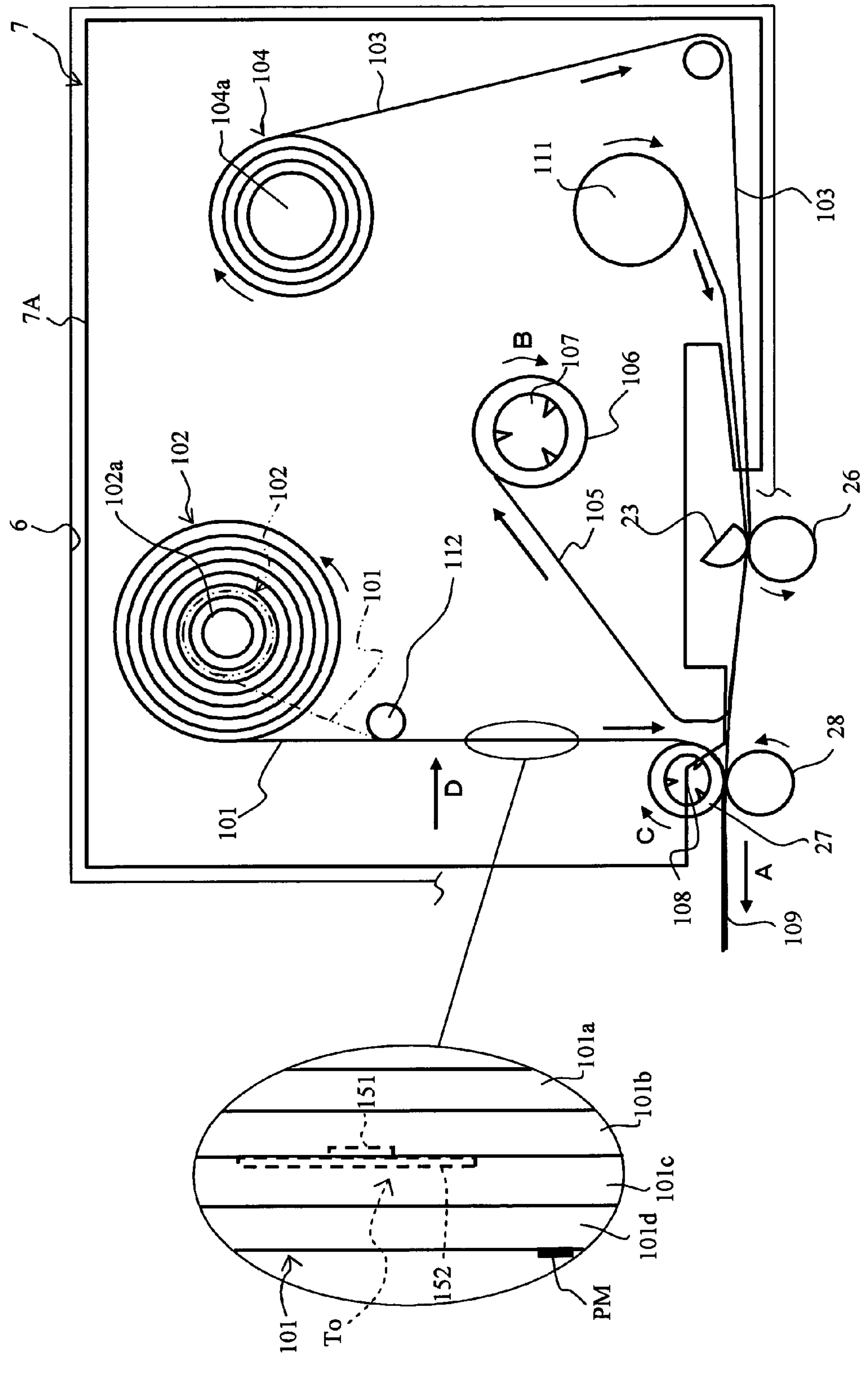
FIG. 5 is an enlarged plan view schematically showing a detailed structure of a cartridge.

As shown in FIG. 5, the cartridge 7 has a housing 7A, a first roll 102 (in a spiral shape in actuality, however, shown simply in a concentric shape) disposed inside the housing 7A and wound with the strip-shaped base tape 101, a second roll 104 (in a spiral shape in actuality, however, shown simply in a concentric shape) wound with a cover film 103 that is transparent and has approximately the same width as that of the base tape 101, a ribbon supply side roll 211 that feeds out the ink ribbon 105 (a thermal transfer ribbon, however, not necessary when the print-receiving tape is a heat sensitive tape), a ribbon take-up roller 106 that takes up the ribbon 105 with print, the feeding roller 27 supported rotatably in the vicinity of the tape discharging exit 30 of the cartridge 7, and a guide roller 112.

The feeding roller 27 presses and bonds the base tape 101 and the cover film 103 to each other to form the tag label tape 109 with print and at the same time, performs the feeding of tape in the direction shown by arrow A in FIG. 5 (that is, it also functions as a pressure roller).

The first roll 102 winds the base tape 101, on which a plurality of the RFID circuit elements To is formed sequentially at predetermined identical intervals in the lengthwise direction, around a reel member 102*a*. In this example, the base tape 101 has a four-layer structure (refer to a partially enlarged view in FIG. 5) and is configured by laminating an adhesive layer 101*a* composed of an appropriate adhesive material, a colored base film 101*b* composed of PET (polyethylene terephthalate) and the like, an adhesive layer 101*c* composed of an appropriate adhesive material, and a separation sheet 101*d* in this order from the side thereof wound inwardly (the right-hand side in FIG. 5) toward the opposite side (the left-hand side in FIG. 5).

In this example, a loop antenna 152 configured into the shape of a loop coil and which transmits/receives information is provided integrally on the backside (on the left-hand side in FIG. 5) of the base film 101*b* and an IC circuit part 151 connected to the loop antenna 152 and storing information is formed, thus the RFID circuit element To is configured.

On the surface side (on the right-hand side in FIG. 5) of the base film 101*b*, the adhesive layer 101*a* for bonding the cover film 103 later is formed and on the backside (on the left-hand side in FIG. 5) of the base film 101*b*, the separation sheet 101*d* is bonded to the base film 101*b* by the adhesive layer 101*c* provided so as to contain the RFID circuit element To internally.

The separation sheet 101*d* is designed so that when the RFID label T finally completed into the shape of a label is affixed to a predetermined commodity etc., the label can be bonded to the commodity etc. by the adhesive layer 101*c* by separating the separation sheet 101*d*. On the surface of the separation sheet 101*d*, a predetermined identification mark (in this example, a black-painted identification mark) PM for feeding control is provided (by printing, in this example) at a predetermined position (position on the further front side from the top end of the loop antenna 152 on the front side in the transport direction, in this example) corresponding to each of the RFID circuit elements To (also corresponding to a margin region S1, to be described later). Instead of using the identification mark, it may also be possible to bore a hole that penetrates through the base tape 101 by laser machining etc., or provide a machined hole by Thompson mold (refer to FIG. 1C, to be described later).

As one of the features of the present embodiment, a plurality of kinds of the cartridge 7 that contain the base tapes 101 different from one another can be mounted to the cartridge holder 6, as described above, and as to the base tape 101 of any of the cartridges 7, the separation sheet 101*d* has the same (common) form (details are described later).

The second roll 104 winds the cover film 103 around a reel member 104*a*. The ribbon 105 disposed on the backside of the cover film 103 fed out from the second roll 104 (that is, on the side to be bonded to the base tape 101) and driven by the ribbon supply side roll 211 and the ribbon take-up roller 106 is caused to come into contact with the backside of the cover film 103 by being pressed against the print head 23.

The ribbon take-up roller 106 and the feeding roller 27 are driven rotatably in coordination with each other by the driving force of a feeding motor 119 (refer to FIG. 3 and FIG. 8, to be described later), which is, for example, a pulse motor disposed outside the cartridge 7, transmitted to the ribbon take-up roller driving shaft 107 and the feeding roller driving shaft 108 via a gear mechanism, not shown. The print head 23 is disposed on the upstream side of the cover film 103 in the transport direction than the feeding roller 27.

In the configuration described above, the base tape 101 fed out from the first roll 102 is supplied to the feeding roller 27. On the other hand, the ribbon 105 disposed on the backside of the cover film 103 fed out from the second roll 104 (that is, on the side to be bonded to the base tape 101) and driven by the ribbon supply side roll 211 and the ribbon take-up roller 106 is caused to come into contact with the backside of the cover film 103 by being pressed against the print head 23.

Then, when the cartridge 7 is mounted to the cartridge holder 6 and the roll holder 25 is moved from the release position to the print position, the cover film 103 and the ink ribbon 105 are clamped between the print head 23 and the platen roller 26 and at the same time, the base tape 101 and the cover film 103 are clamped between the feeding roller 27 and the pressure roller 28. Then, the ribbon take-up roller 106 and the feeding roller 27 are rotatably driven in synchronization, respectively, by the driving force of the feeding motor 119 in the directions shown by arrows B and C in FIG. 5. At this time, the feeding roller driving shaft 108, the pressure roller 28, and the platen roller 26 described above are coupled by a gear mechanism (not shown), and the feeding roller 27, the pressure roller 28, and the platen roller 26 are rotated following the drive of the feeding roller driving shaft 108, thereby the base tape 101 is fed out from the first roll 102 and supplied to the feeding roller 27 as described above. On the other hand, the cover film 103 is fed out from the second roll 104 and at the same time, a plurality of heating elements of the print head 23 is energized by a print-head driving circuit 120 (refer to FIG. 8 to be described later). As a result, a print R (tag print, refer to FIG. 10, to be described later), which corresponds to the RFID circuit element To on the base tape 101, an object to be bonded, is printed on the backside of the cover film 103. Then, the base tape 101 and the cover film 103 having been printed are integrally bonded to each other into one body by the feeding roller 27 and the pressure roller 28, and formed as the tag label tape 109 with print and transported to the outside of the cartridge 7 from the tape discharging part 30 (refer to FIG. 4). The ink ribbon 105, which has finished the printing on the cover film 103, is taken up to the ribbon take-up roller 106 by the drive of the ribbon take-up roller driving shaft 107.

Then, after information is read from or written to the RFID circuit element To by the loop antenna LC for the tag label tape 109 with print produced by bonding, as mentioned above, the tag label tape 109 with print is cut (at the position of the cut line CL, refer to FIG. 10 and FIG. 12, to be described later) automatically or by the cutter mechanism 15 by operating the cutter driving button 16 (refer to FIG. 2), and thus the RFID label T is produced. The RFID label T is further designed to be discharged from the label discharging exit 11 (refer to FIG. 2, FIG. 4) by the label discharging mechanism 22.

Figure 6A:
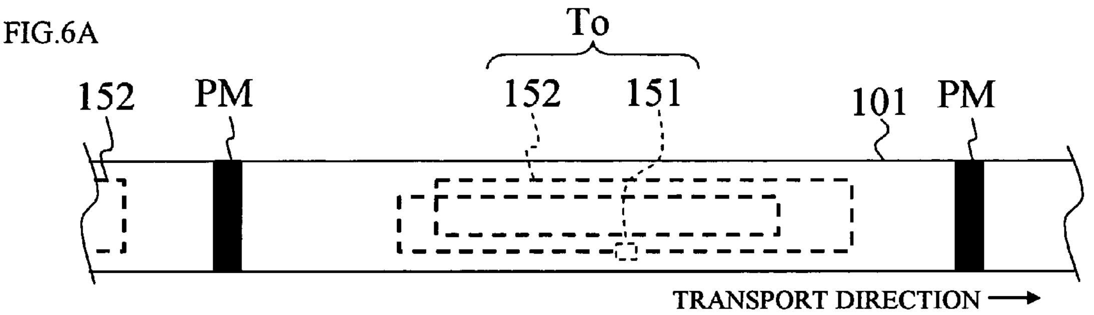
FIG. 6A and FIG. 6B are conceptual fragmentary diagrams showing the state of the base tape fed out from the first roll when viewed from the direction of arrow D in FIG. 5 (that is, when viewed from the separation sheet side).
Figure 6B:
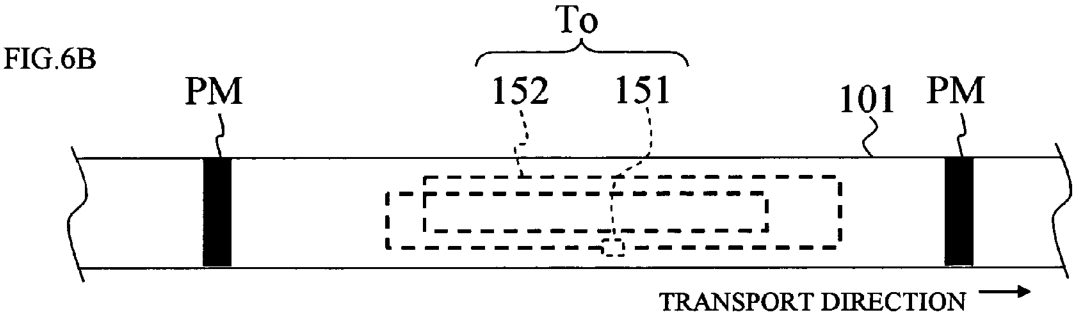

As described above, in the present embodiment, a plurality of kinds of the cartridge 7 can be mounted and the forms of the respective base tapes 101 are different from one another (in this example, the relationships between the arrangement pitch of the identification mark PM and the arrangement pitch of the RFID circuit element To are different). FIG. 6A and FIG. 6B show examples of the base tapes 101 of kinds different from one another.

Figure 7A:
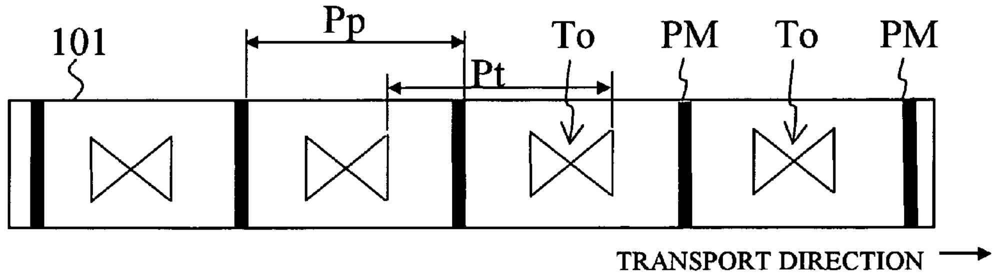
FIG. 7A and FIG. 7B are explanatory diagram conceptually representing a relationship between an arrangement pitch of identification mark and an arrangement pitch of RFID circuit element shown in FIG. 6A and FIG. 6B.
Figure 7B:
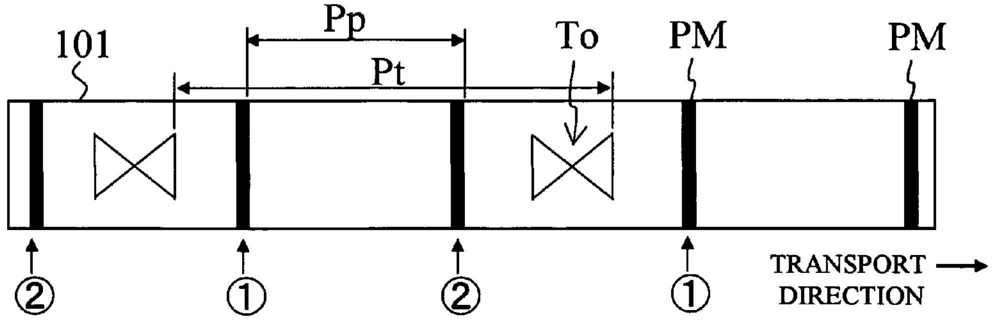

The relationship between the arrangement pitch of the identification mark PM and the arrangement pitch of the RFID circuit element To shown in FIG. 6A and FIG. 6B are shown in FIG. 7A and FIG. 7B, for easier understanding.

In other words, the arrangement pitch of the identification mark PM is a fixed value Pp both in the base tape 101 in FIG. 6A and FIG. 7A and in the base tape 101 in FIG. 6B and FIG. 7B. In this example, an arrangement pitch Pt (fixed value) of the RFID circuit element To satisfies a relationship $Pt=n\times Pp$ (n: integer equal to or greater than 1).

The base tape 101 in FIG. 6A and FIG. 7A is an example in which n=1, then Pt=Pp, that is, one RFID circuit element To is arranged between the neighboring identification marks PM, PM without exception. The base tape 101 is used to produce the RFID label T having substantially the same length (or less) as the distance between the neighboring identification marks PM, PM (the arrangement pitch Pp of the identification mark PM) (refer to FIG. 10A and FIG. 10B, to be described later).

On the other hand, the base tape 101 in FIG. 6B and FIG. 7B is an example in which n=2, then Pt=2Pp, that is, the RFID circuit element To is arranged with the pitch twice that of the identification mark PM. As a result, as shown in FIG. 7B, in this arrangement, there exist two neighboring identification marks PM, PM between which no RFID circuit element is present (blank). This base tape 101 is used to produce the RFID label T having a length substantially twice the distance (arrangement pitch Pp) between the neighboring identification marks PM, PM (or a length greater than the distance and not greater than twice the distance) (refer to FIG. 10A and FIG. 10B, and FIG. 12A and FIG. 12B, to be described later).

As described above, in the present embodiment, it is possible to use the base tapes 101 of a plurality of kinds in a plurality of correlations according to the value of n, and in the above examples, the cases of n=1 and n=2 are shown illustratively. Each of the identification marks PM consists of a mark made uniform in the present embodiment (one-line mark with a fixed width, and the one-line mark and a two-line mark do not coexist, as in a second embodiment, to be described later)

Then, as described above, the cartridge 7 is provided with the detection target part (detectable by the cartridge sensor CS), and which kind of the cartridge 7 is discriminated by the detection. This means that the detection target part can function as a correlation recording part that records correlation information indicative of the correlation of the relationship between the array regularity of the RFID circuit element To (in this example, the arrangement pitch Pt) and the pitch Pp of the identification mark PM because the correlation information indicates the correlation (in this example, the value of n, which is equal to or greater than 1).

Figure 8:
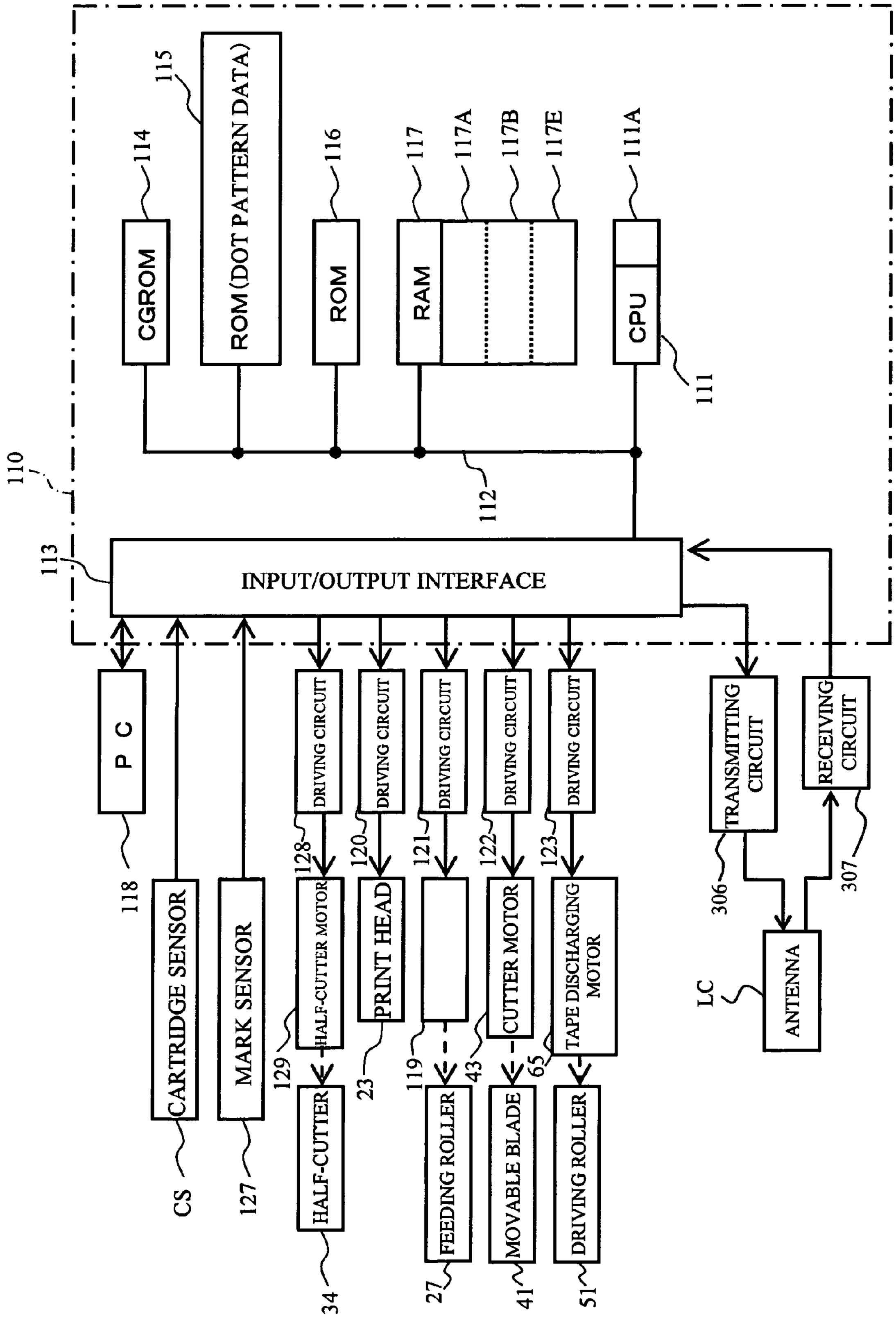
FIG. 8 is a functional block diagram showing a control system of the tag label producing apparatus in the first embodiment.

A control system of the tag label producing apparatus 1 in the first embodiment is shown in FIG. 8. In FIG. 8, a control circuit 110 is arranged on a control substrate (not shown) of the tag label producing apparatus 1.

In the control circuit 110, a CPU 111 that includes a timer 111A internally and controls each device, an input/output interface 113 connected to the CPU 111 via a data bus 112, a CGROM 114, ROMs 115, 116, and a RAM 117 are provided.

The ROM 116 stores a print drive control program to drive the print head 23, the feeding motor 119, and a tape discharging motor 65 by reading the data of the print buffer in association with the operation input signal from the PC 118, a cutting drive control program to feed the tag label tape 109 with print to the cutting position by driving the feeding motor 119 when printing is completed and to cut the tag label tape 109 with print by driving the cutter motor 43, a tape discharging program to forcedly discharge the cut tag label tape 109 with print (that is, the RFID label T) from the label discharging exit 11 by driving the tape discharging motor 65, a transmission program to generate access information, such as an interrogative signal or write signal to the RFID circuit element To and output it to a transmitting circuit 306, a reception program to process a reply signal etc. input from a receiving circuit 307, and various kinds of program necessary to control the tag label producing apparatus 1. The CPU 111 performs various kinds of operation based on the various kinds of program stored in the ROM 116.

In the RAM 117, a text memory 117A, a print buffer 117B, a parameter storage area 117E, etc., are provided. In the text memory 117A, document data input from the PC 118 is stored. In the print buffer 117B, dot patterns for printing a plurality of letters, symbols, etc., the number of pulses to be applied, that is, the amount of forming energy of each dot, etc., are stored as dot pattern data, and the print head 23 makes a dot print in accordance with the dot pattern data stored in the print buffer 117B. In the parameter storage area 117E, various kinds of operation data, tag identification information (tag ID) of the RFID circuit element To (described above) from which information has been read (acquired), etc., are stored.

To the input/output interface 113, the PC 118, the print-head driving circuit 120 that drives the print head 23, a feeding motor driving circuit 121 that drives the feeding motor 119, a cutter motor driving circuit 122 that drives the cutter motor 43, a half cutter motor driving circuit 128 that drives the half cutter motor 129, the tape discharging motor driving circuit 123 that drives the tape discharging motor 65, the transmitting circuit 306 that generates carrier waves to access (read/write from/to) the RFID circuit element To via the loop antenna LC and at the same time, outputs interrogation waves (transmission signal), which are the carrier waves modulated based on the input control signal, the receiving circuit 307 that demodulates and outputs the response signal received from the RFID circuit element To via the loop antenna LC, and the mark sensor 127 that detects the identification mark PM are connected, respectively.

In the control system having such a control circuit 110 as its core, when letter data etc. is input via the PC 118, the text (document data) is stored sequentially in the text memory 117A and at the same time, the print head 23 is driven via the driving circuit 120, and each heating element is selectively driven so as to generate heat in accordance with the print dots corresponding to a single line and print of the dot pattern data stored in the print buffer 117B is printed and in synchronization with this, the feeding motor 119 controls feeding of tape via the driving circuit 121. In addition, the transmitting circuit 306 controls modulation of carrier waves based on the control signal from the control circuit 110 and outputs the interrogation waves described above, and at the same time, the receiving circuit 307 processes the signal demodulated based on the control signal from the control circuit 110.

Figure 9:
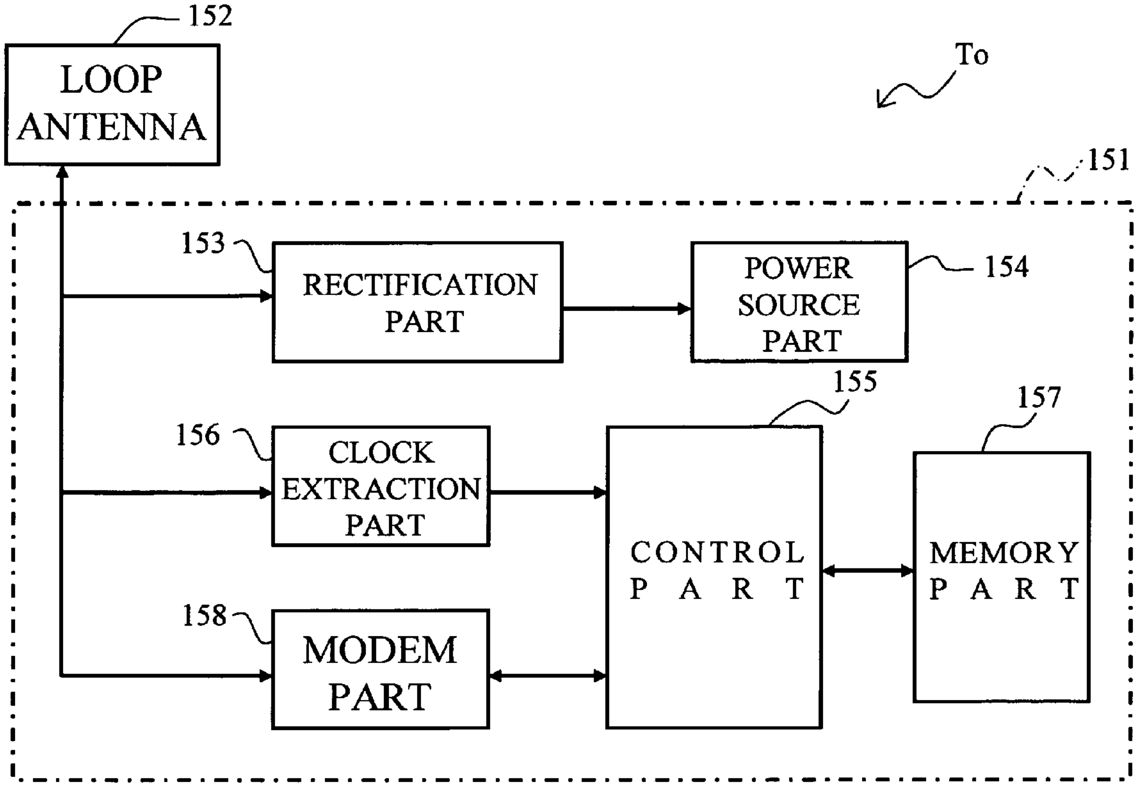
FIG. 9 is a functional block diagram showing a functional configuration of an RFID circuit element.

As shown in FIG. 9, the RFID circuit element To has the loop antenna 152 that contactlessly transmits and receives a signal by magnetic induction with the loop antenna LC of the tag label producing apparatus 1 and the IC circuit part 151 connected to the loop antenna 152.

The IC circuit part 151 includes a rectification part 153 that rectifies the interrogation wave received by the loop antenna 152, a power source part 154 that accumulates the energy of the interrogation wave rectified by the rectification part 153 to use it as a driving power source, a clock extraction part 156 that extracts a clock signal from the interrogation wave received by the loop antenna 152 and supplies it to a control part 155, a memory part 157 capable of storing a predetermined information signal, a modem part 158 connected to the loop antenna 152, and the above-mentioned control part 155 that controls the operation of the RFID circuit element To via the rectification part 153, the clock extraction part 156, the modem part 158, etc.

The modem part 158 modulates the interrogation wave received by the loop antenna 152 based on the reply signal from the control part 155 and retransmits it as a response wave from the loop antenna 152 as well as demodulating the communication signal from the loop antenna LC of the tag label producing apparatus 1 received by the loop antenna 152.

The control part 155 interprets the received signal demodulated by the modem part 158, generates a reply signal based on the information signal stored in the memory part 157, and performs a basic control, such as a control to reply by the modem part 158 etc.

The clock extraction part 156 extracts the clock component from the received signal and extracts a clock to the control part 155, supplying a clock corresponding to the frequency of the clock component of the received signal to the control part 155.

An example of an outside appearance of the RFID label is shown in FIG. 10A, FIG. 10B, FIG. 11A, and FIG. 11B. This example shows the RFID label T produced using the base tape 101 shown in FIG. 6A and FIG. 7A and having a length substantially the same as the arrangement pitch Pp of the identification mark PM.

Figure 10A:
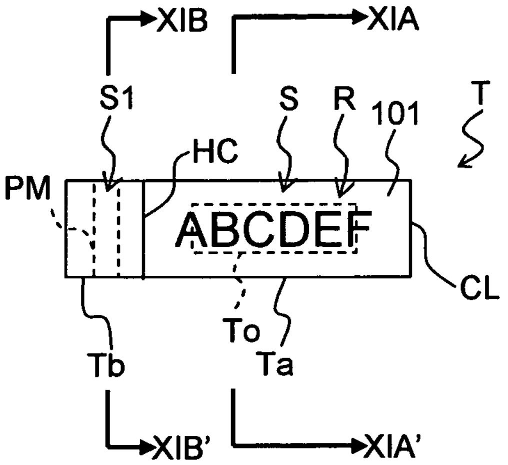
FIGS. 10A and 10B show a top view and a bottom view, respectively, showing an example of an outside appearance of an RFID label formed by completing the writing (or reading) of information to the RFID circuit element by the tab label producing apparatus.
Figure 10B:
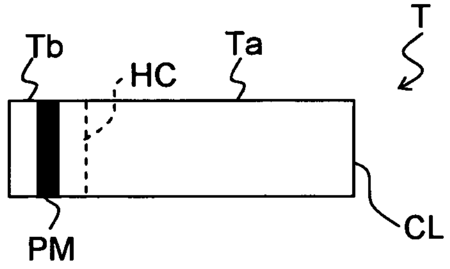
Figure 11A:
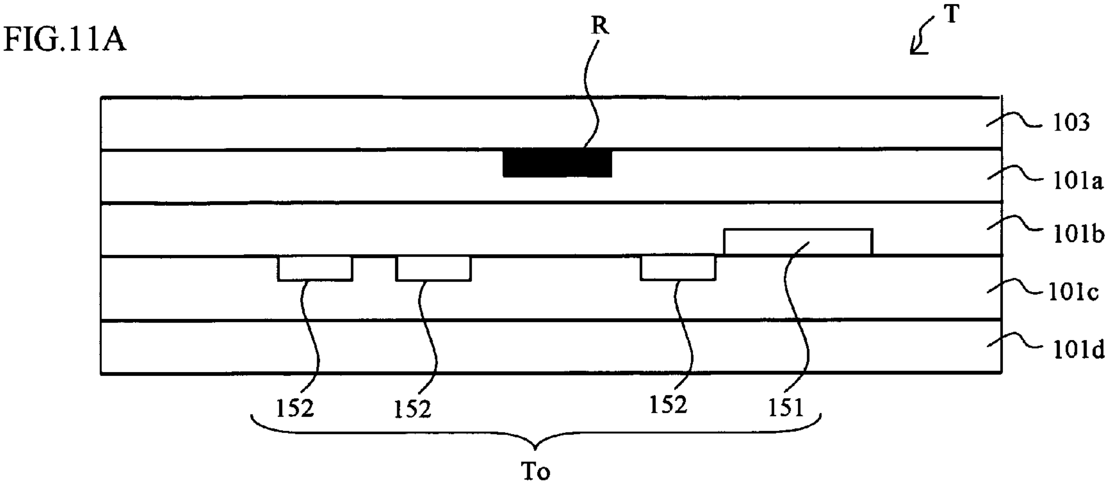
FIGS. 11A and 11B are a transverse section view of a section along XIA-XIA' in FIG. 10 rotated by 90 degrees in the counterclockwise direction, and a transverse section view of a section along XIB-XIB' in FIG. 10A rotated by 90 degrees in the counterclockwise direction, respectively.
Figure 11B:
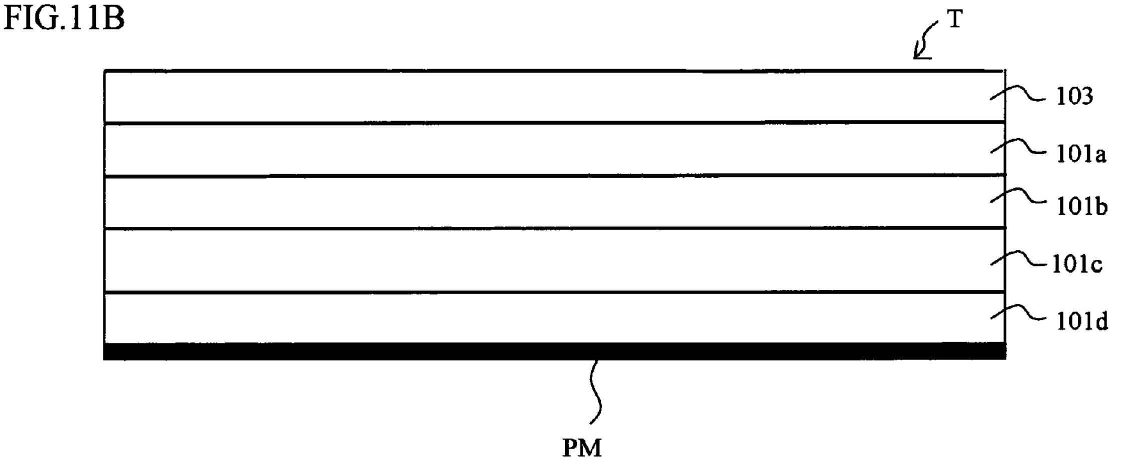
Figure 11C:
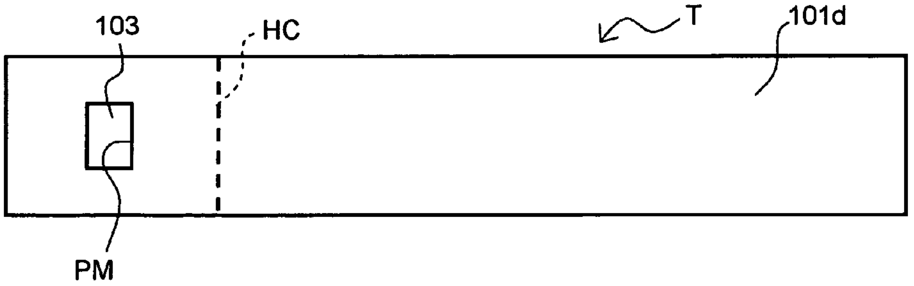
FIG. 11C is a bottom view of the RFID label with an identification mark formed by laser machine.

In FIGS. 10A, 10B, 11A, and 11B, the RFID label T has a five-layer structure in which the cover film 103 is added to the four-layer structure shown in FIG. 5 as described above, and the five-layer structure is composed of the cover film 103, the adhesive layer 101*a*, the base film 101*b*, the adhesive layer 101*c*, and the separation sheet 101*d* from the side of the cover film 103 (the upper side in FIG. 11) toward the opposite side (the lower side in FIG. 11). Then, as described above, the RFID circuit element To including the loop antenna 152 provided on the backside of the base film 101*b* is provided in the plane of bonding of the base film 101*b* and the adhesive layer 101*c*, respectively, and at the same time, the label print R (letters "ABCDEF" in this example) corresponding to the stored information etc. of the RFID circuit element To is printed on the backside of the cover film 103. In the memory part 157 of the RFID circuit element To of the RFID label T, the tag ID (access ID) is stored, which is inherent identification information.

In the RFID label T, a half cut line HC is formed by the half cutter 34 substantially along the tape width direction in the layers other than the separation sheet 101*d*, that is, in the cover film 103, the adhesive layer 101*a*, the base film 101*b*, and the adhesive layer 101*c*, as described above. In other words, the RFID label T includes an RFID label main body Ta, which is a part corresponding to a print area S in which the label print R of the cover film 103 is printed, and a margin part Tb, which is a part corresponding to the margin area S1 in which the label print R is not printed (refer to FIG. 10A), and thus, the RFID label T has a configuration in which the RFID label main body Ta and the margin part Tb are linked with each other at the half cut line via the separation sheet 101*d*. The identification mark PM described above is provided at the margin part Tb.

In the above, the example is taken for explanation, in which the half cut line HC is formed only on one side of the RFID label main body Ta in the label's longitudinal direction, however, this is not limited, and it may also be possible to provide the half cut line HC by the half cutter 34 also on the other side and provide a part similar to the margin part Tb via the line. In this case, the position of the half cut line HC on the other side may be variable (in accordance with, for example, the number of letters to be printed). In this case, however, it is desirable to set the position of the half cut line HC at least nearer to the rear end side in the transport direction than the rear end part of the RFID circuit element To in the transport direction (that is, the rear end part of the antenna 152) in order not to block the communication capability of the RFID circuit element To.

Instead of providing the black-painted marking shown in FIG. 11A and FIG. 11B as the identification mark PM as described above, it may also be possible to bore a hole that substantially penetrates through the base tape 101 by laser machining etc. as the identification mark PM, as shown in FIG. 1C.

Figure 12A:
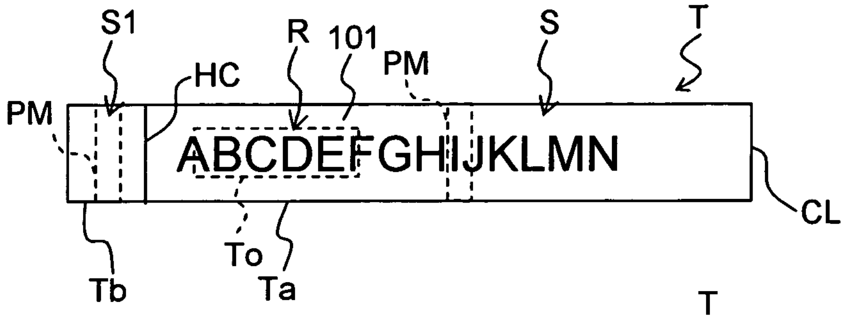
FIGS. 12A and 12B show a top view and a bottom view, respectively, showing another example of an outside appearance of an RFID label.
Figure 12B:
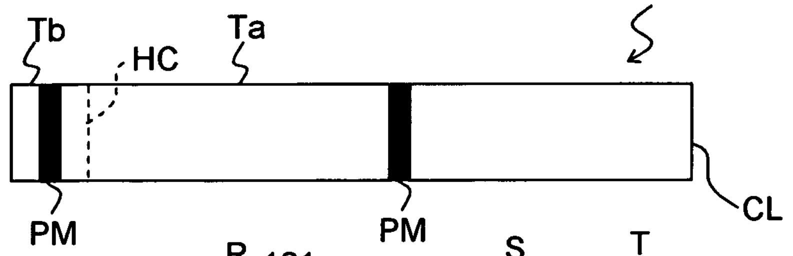

Another example of the outside appearance of the RFID label T produced by the tag label producing apparatus 1 is shown in FIGS. 12A and 12B. This example shows the RFID label T produced using the base tape 101 shown in FIG. 6B and FIG. 7B and having a length substantially twice the arrangement pitch Pp of the identification mark PM.

The RFID label T shown in FIG. 12A and FIG. 12B also has a five-layer structure, in which the cover film 103 is added, similar to the above (the structure of the transverse section is the same as that in FIG. 11A and FIG. 11B, and therefore, it is not shown schematically). In this case, the print area S (printable maximum length) on the backside of the cover film 103 is about twice (for example, slightly more than twice) that of the structure shown in FIG. 10A and the label print R (in the example, letters "ABCDEFGHIJKLMN") corresponding to the stored information etc. of the RFID circuit element To is printed.

Other points, such as that the RFID label T includes the RFID label main body Ta and the margin part Tb and they are linked with each other at the half cut line HC etc., are the same as those in the above, and therefore, their description is omitted.

Figure 12C:
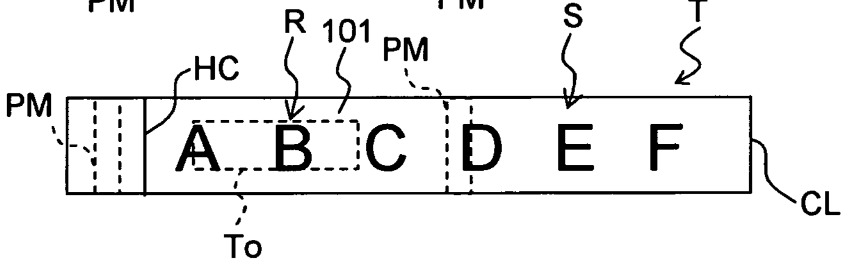
FIG. 12C is a top view showing another example more again of an outside appearance of an RFID label.

In this example, as shown in FIG. 12A, the case is shown, where the base tape 101 shown in FIG. 6B and FIG. 7B is used by an operator as a result that the number of letters to be printed is large, and the RFID label T having a length substantially twice that shown in FIG. 10A is produced. However, there can be other reasons (change in print style, preference of the operator, purpose of the label use, etc.) other than that the number of letters to be printed is large. FIG. 12C shows a case as such an example, where the base tape 101 shown in FIG. 6B and FIG. 7B is used by an operator in order to increase in size each letter of the print although the number of letters is the same, and the RFID label T having a length substantially twice that shown in FIG. 10A is produced.

As described above, the feature of the present embodiment lies in that a plurality of kinds of the RFID label T can be produced using a plurality of kinds of the base tape 101 having arrangement pitches of the RFID circuit element To different from one another. In their production, the kind of the base tape 101 is identified by detecting the detection target part provided in the cartridge 7 using the cartridge sensor CS as described above, and in accordance with this the control of tape transport and positioning, and further, the print control, communication control, cutting control, etc., associated therewith are carried out. In order to carry out the above controls, the control procedure shown in FIG. 13 is executed by the control circuit 110.

Figure 13:
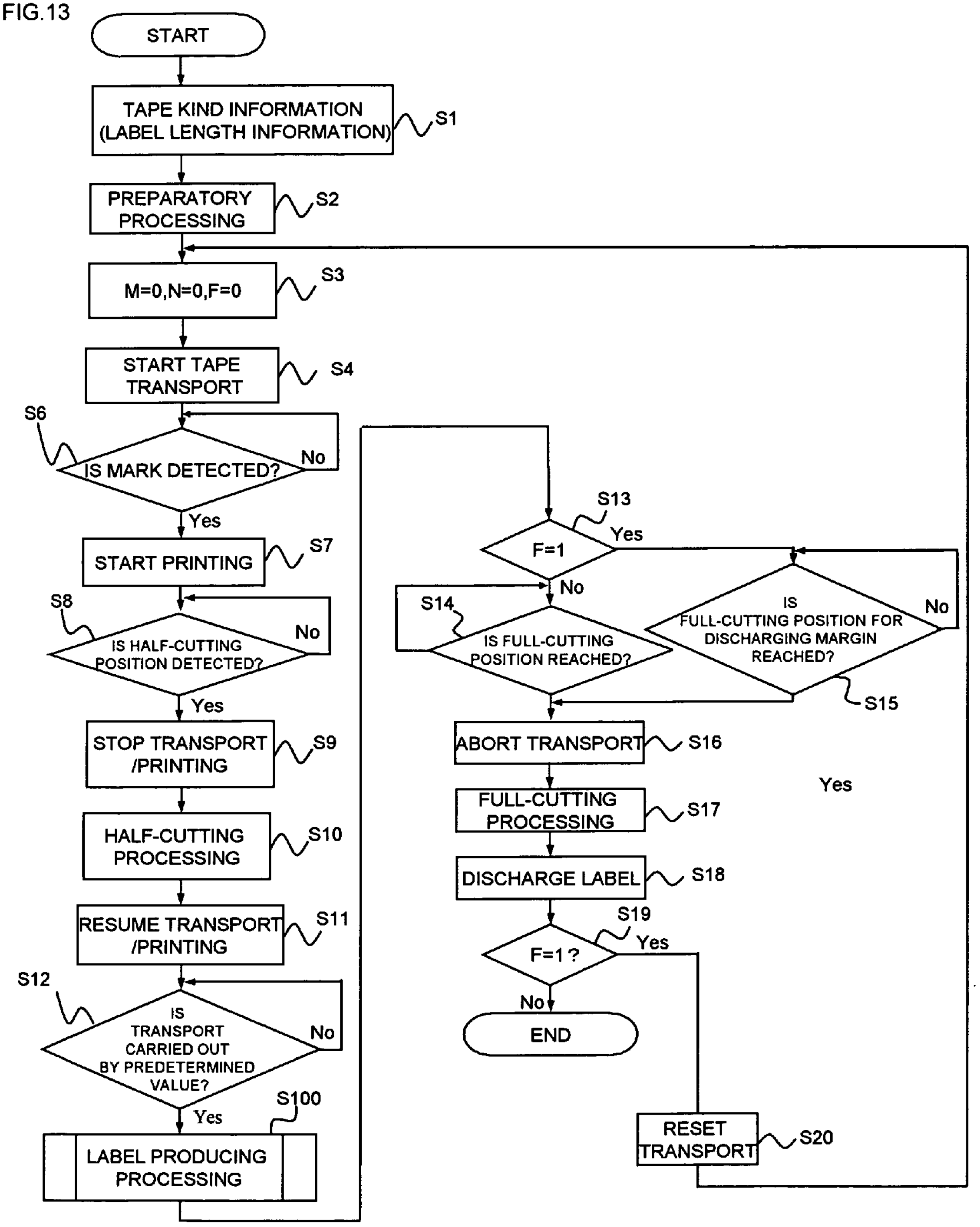
FIG. 13 is a flowchart showing a control procedure executed by a control circuit for carrying out such a control.

In FIG. 13, a flow starts when a predetermined RFID label producing operation is carried out by the tag label producing apparatus 1 via the PC 118.

First, in step S1, based on the detection signal of the cartridge sensor CS, information about the kind of tape of the corresponding base tape 101 (in the above example, whether the base tape 101 is for producing a label having the normal length shown in FIG. 6A and FIG. 7A, or whether for producing a label having twice the length shown in FIG. 6B and FIG. 7B, that is, information about the length of the label) is acquired. For example, it may also be possible to store the identifier of the detection target part and the corresponding kind of the cartridge (or the kind of the tape) associated with each other in the form of a table in an appropriate part (for example, the RAM 117, other memories, etc.) in the control circuit 110 and acquire information about the kind of the base tape 101 based thereon.

After that, the procedure moves to step S2 and preparatory processing is carried out. In other words, the operation signal from the PC 118 (via the communication line NW and the input/output interface 113) is input and the settings of the print data, data to be written into tag, half-cutting position (position of the half cut line HC), the full-cutting position (position of a cut line CL), the printing end position, etc., are made based on the operation signal. At this time, the half-cutting position and the full-cutting position are determined uniquely and fixedly for each kind of the cartridge (that is, for each kind of the base tape 101) based on the cartridge information. The half-cutting position is set so that it does not overlap the position of the RFID circuit element To.

Next, in step S3, the setting of initialization is made. Here, the setting of initialization is made so that variables M, N for counting the number of times (number of times of access trial) for communication retry when there is no response from the RFID circuit element To, and a communication error flag F indicative of the case where communication cannot be established even when communication retry is made a predetermined number of times of retry are set to zero when communication is made from the antenna LC to the RFID circuit element To.

After that, the procedure moves to step S4 and tape transport is started. Here, a control signal is output to the feeding motor driving circuit 121 via the input/output interface 113 and the feeding roller 27 and the ribbon take-up roller 106 are rotatably driven by the driving force of the feeding motor 121. Further, a control signal is output to the tape discharging motor 65 via the tape discharging motor driving circuit 123 and the driving roller 51 is rotatably driven. In this manner, the base tape 101 is fed out from the first roll 102 and supplied to the feeding roller 27 and at the same time, the cover film 103 is fed out from the second roll 104 and then the base tape 101 and the cover film 103 are bonded each other and integrated into one body by the feeding roller 27 and the sub roller 28 and formed as the tag label tape 109 with print, and transported from the direction of the outside of the cartridge 7 toward the direction of the outside of the tag label producing apparatus 1.

After that, in step S6, the identification mark PM provided on the tag label tape 109 with print is detected by the mark sensor 127 and it is determined whether or not the detection signal is input from the mark sensor 127 via the input/output interface 113 (that is, whether or not the cover film 103 has reached the position at which printing is started by the print head 23). The determination is not satisfied until the identification mark PM is detected and the procedure is repeated, and when the mark PM is detected, the determination is satisfied and the procedure moves to the next step S7.

In step S7, a control signal is output to the print-head driving circuit 120 via the input/output interface 113 to energize the print head 23 and thus the printing of the label print R, such as letters, symbols, bar code, etc., corresponding to the print data for the RFID label T acquired in step S2, is started in the print area S of the cover film 103 described above.

After that, in step S8, it is determined whether or not the tag label tape 109 with print has been transported to the half-cutting position (the position in the transport direction at which the half cutter 34 directly opposes the position of the half cut line HC) at the boundary of the RFID label main body Ta and the margin part Tb of the RFID label T set in step S1. At this time, the determination is made by, for example, detecting the distance of transport after the identification mark PM is detected in step S6 using a predetermined publicly-known method (by counting the number of pulses output by the feeding motor driving circuit 121 that drives the feeding motor 119, which is a pulse motor, etc.). The determination is not satisfied until the half-cutting position is reached and the procedure is repeated, and when the position is reached, the determination is satisfied and the procedure moves to the next step S9.

In step S9, a control signal is output to the feeding motor driving circuit 121 and the tape discharging motor driving circuit 123 via the input/output interface 113 to stop the drive of the feeding motor 119 and the tape discharging motor 65 and then, the rotation of the feeding roller 27, the ribbon take-up roller 106, and the driving roller 51 is stopped. With the arrangement, in the process in which the tag label tape 109 with print fed out from the cartridge 7 moves toward the direction of discharge, the transport of the base tape 101 from the first roll 102, the transport of the cover film 103 from the second roll 104, and the transport of the tag label tape 109 with print are stopped in the state in which the half cutter 34 of the half-cutting unit 35 directly opposes the position of the half cut line HC of the corresponding RFID label T set in step S2. Further, at this time, a control signal is output also to the print-head driving circuit 120 via the input/output interface 113 to stop the supply of current to the print head 23 and then, the printing of the label print R is stopped (printing is aborted)

After that, in step S10, a control signal is output to the half cutter motor driving circuit 128 via the input/output interface 113 to drive the half cutter motor 129, rotate the half cutter 34, and cut the cover film 103, the adhesive layer 101*a*, the base film 101*b*, and the adhesive layer 101*c* of the tag label tape 109 with print, and thus, the half-cutting processing for forming the half cut line HC is carried out.

Then, the procedure moves to step S11 and the transport of the tag label tape 109 with print is resumed by rotatably driving the feeding roller 27, the ribbon take-up roller 106, and the driving roller 51 as in step S4 described above and at the same time, the printing of the label print R is resumed by energizing the print head 23 as in step S7.

After that, in step S12, it is determined whether or not the tag label tape 109 with print to be transported has been transported by a predetermined value (for example, the distance of transport with which for the RFID circuit element To reach the position substantially opposing the antenna LC, however, the interval in which no tag is present is excluded). At this time also, it is sufficient to make the determination of the distance of transport by counting the number of pulses output by the feeding motor driving circuit 121 that drives the feeding motor 119, which is a pulse motor, as in step S8 described above.

In the next step S100, label production processing is performed. In other words, when the position of communication (for example, a position at which the RFID circuit element To of the corresponding RFID label T substantially opposes the antenna LC at least in the base tape 101 with the configuration in FIG. 6A and FIG. 7A) of the RFID circuit element To is reached, the transport and printing are stopped, transmission/reception of information with the RFID circuit element To is carried out, and then, the transport and printing are resumed to complete the print and the corresponding RFID label T is formed (refer to FIG. 14 to be described later for details).

When step S100 is completed in the manner described above, the procedure moves to step S13 and it is determined whether or not the flag F is set to "1" in the label production processing in step S100 described above (whether or not a communication error has occurred). When no communication error has occurred, then, F remains "0", and therefore, the determination is not satisfied and the procedure moves to step S14.

In step S14, it is determined whether or not the tag label tape 109 with print has been transported to the full-cutting position of the distal end part of the RFID label T set in the previous step S2 (the position in the transport direction at which the movable blade 41 of the cutter mechanism 15 directly opposes the position of the full cut line CL at the distal end of the RFID label T). At this time also, it is sufficient to make the determination by counting the number of pulses output by the feeding motor driving circuit 121 that drives the feeding motor 119, which is a pulse motor, as in the above. Until the full-cutting position is reached, the determination is not satisfied and the procedure is repeated, and when the position is reached, the determination is satisfied and the procedure moves to step S16.

On the other hand, in step S13 described above, if a communication error has occurred in the label production processing in step S100, the flag F is set to "1", and therefore, the determination is not satisfied. Such a communication error is likely to occur, for example, in the following cases. In other words, for example, it is assumed that the cartridge 7 in which the base tape 101 on which the RFID circuit element To is arranged in every two intervals between the neighboring identification marks PM, PM, as shown in FIG. 6B and FIG. 7B, is arranged, instead of the base tape 101 on which the RFID circuit element To is present, as shown in FIG. 6A and FIG. 7A, in all of the intervals (to be precise, between the transport timing (the position in the transport direction, that is, the period of time during which the tapes 101, 109 are in a certain transport state) at which one of the identification marks PM is detected by the sensor 127 and the transport timing (the position in the transport direction) at which the other identification mark PM is detected by the sensor 127, the corresponding RFID circuit element To is always at the position substantially opposing the antenna LC and at which communication is available. In the present specification, the definitions of "position in the transport direction", "interval", etc., are assumed to be all the same) is mounted to the cartridge holder 6 (this can be identified by the information about the kind of tape acquired in step S1 based on the detection signal of the cartridge sensor CS described above). Here, as described above, the label production processing (including communication (trial) with the RFID circuit element To, refer to later description) in step S100 is triggered by the timing of detection of the identification mark PM in step S6 and on the basis of this, carried out at the timing of transport when the determination in step S8 and the determination in step S12 are satisfied. At this time, it is not known at this stage whether the identification mark PM detected in step S6 is the identification mark PM (shown by (1) in FIG. 7B) at which the RFID circuit element is located immediately after the transport direction or the identification mark PM ((2) in FIG. 7B) at which after the transport direction blank area of the RFID circuit element To extends for a while.

For the time being, then, an attempt to establish communication is made on assumption that the identification mark PM is that of (1) and if communication can be established in a predetermined number of times of retries, the identification mark PM is known to be that of (1) and if communication cannot be established, the identification mark PM is known to be that of (2). In other words, it is known that the identification mark PM detected in step S6 is that of (2) (hereinafter, referred to as "case of tag absent interval" according to circumstances) when the communication error occurs (when F=0). If a communication error has occurred in the label production processing in step S100 and the flag F has been set to "1", the determination in step S13 is not satisfied any longer and the procedure moves to step S15 assuming that the identification mark PM detected in step S6 is that of (2) (the tag absent interval).

In step S15, it is determined whether or not a margin discharging full-cutting position different from that in step S14 has been reached. In other words, in step S14, it is determined whether or not the full-cutting position has been reached in order to complete the production of the RFID label T by cutting the rear end side of the tag label tape 109 with print that includes the RFID circuit element To having completed communication normally (the base tape 101 is identified to be the one on which the RFID circuit element To is present in every interval between the neighboring identification marks PM, PM as shown in FIG. 6A and FIG. 7A by the information about the kind of tape acquired in step S1 and the position of the corresponding normal cut line CL is set in the preparatory processing in step S2). In contrast to this, in step S15, it is determined whether or not the full-cutting position has been reached in order to discharge the area corresponding to the interval from the identification mark PM of (2) to the identification mark PM of (1) that follows (the area of transport until the identification mark PM of (1) is detected after the identification mark PM of (2) is detected by the sensor 127) as a margin (excess area) when the identification mark PM indicated by (2) in FIG. 7B is detected in step S6 on the assumption that the RFID circuit element To is always arranged on the top end side in the transport direction (refer to FIG. 12A and FIG. 12C) when the RFID label T twice the length is produced using the base tape 101 in FIG. 6B and FIG. 7B (the base tape 101 is identified to be that shown in FIG. 6B and FIG. 7B by the information about the kind of tape acquired in step S1, and the length of the part to be cut and discharged as a margin is determined and the full-cutting-position is set in accordance with the setting of position of the cut line CL in the preparatory processing in the subsequent step S2). At this time also, it is sufficient to make the determination by, for example, counting the number of pulses output by the feeding motor driving circuit 121 that drives the feeding motor 119, which is a pulse motor, as in the above. Until the margin discharging full-cutting position is reached, the determination is not satisfied, and the procedure is repeated. When the position is reached, the determination is satisfied, and the procedure moves to step S16.

In step S16, as in step S9 described above, the rotation of the feeding roller 27, the ribbon take-up roller 106, and the driving roller 51 is stopped to stop the transport of the tag label tape 109 with print. Whereby, in a state in which the movable blade 41 of the cutter mechanism 15 directly opposes the cut line CL corresponding to the margin discharging full-cutting position in the case of tag absent interval, or the cut line CL set in step S2 in the other cases, the transport of the base tape 101 from the first roll 102, the transport of the cover film 103 from the second roll 104, and the transport of the tag label tape 109 with print are stopped.

After that, a control signal is output to the cutter motor driving circuit 122 in step S17 to drive the cutter motor 43 and move rotatably the movable blade 41 of the cutter mechanism 15, and thereby, the full-cutting processing is carried out, in which all of the cover film 103, the adhesive layer 101*a*, the base film 101*b*, the adhesive layer 101*c*, and the separation sheet 101*d* of the tag label tape 109 with print are cut (divided) to form the cut line CL. Due to the division by the cutter mechanism 15, the top end side of the tag label tape 109 with print is separated from the remaining part. As a result, in the case of tag absent interval, the separated part is the margin part and in the other cases, the separated part is the RFID label T.

After that, the procedure moves to step S18, and a control signal is output to the tape discharging motor driving circuit 123 via the input/output interface 31 to resume the drive of the tape discharging motor 65 and rotate the driving roller 51. Whereby, the transport by the driving roller 51 is started, and the RFID label T or the margin part produced in step S17 is transported toward the label discharging exit 11, and then discharged to the outside of the tag label producing apparatus 1 from the label discharging exit 11.

After that, the procedure moves to step S19 and whether or not the flag F=1 is determined. When F=0 (that is, the determination in step S13 is not satisfied and step S14 is executed), the RFID label T has been completed as described above, and therefore, the flow is ended as is. When F=1 (in the case of tag absent interval), the RFID label T has not been produced yet as described above and only the margin part has been discharged, and therefore, the procedure moves to step S20.

In step S20, in order to newly start the production of the RFID label T from the position of transport, the reference value (for example, the count value of the pulse motor) on which the determination of distance in the transport direction is based in step S8 and step S21 is initialized (reset) and then the procedure returns to step S3 and the same procedure is repeated. Whereby, when the RFID label T twice the length is produced using the base tape 101 in FIG. 6B and FIG. 7B, even if the tag absent interval is encountered immediately after the production starts, the area corresponding to the interval from the identification mark PM of (2) to the subsequent identification mark PM of (1) is discharged as a margin. As a result, it is possible to produce without fail the RFID label twice the length in which the RFID circuit element To is arranged on the top end side in the transport direction, as shown in FIG. 12A or FIG. 12B.

Figure 14:
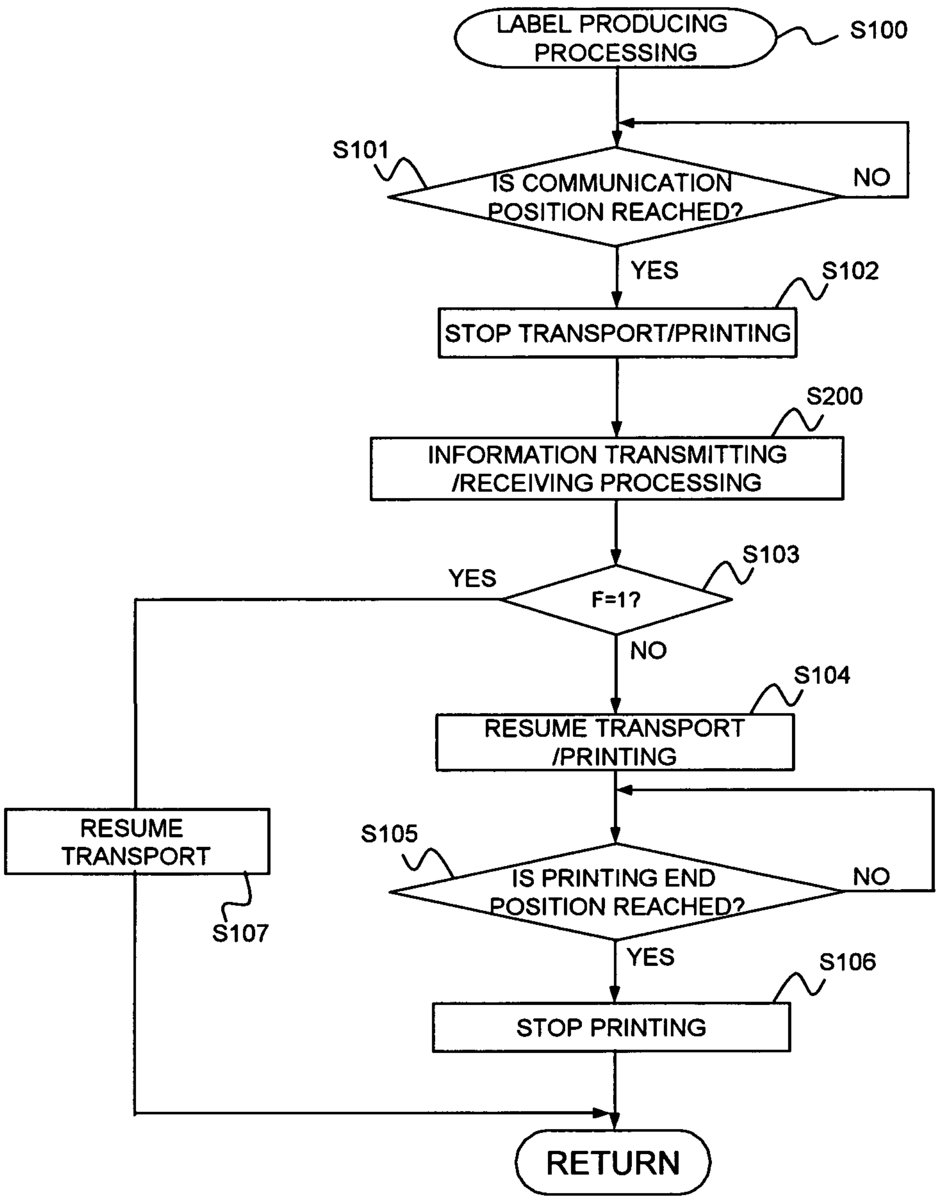
FIG. 14 is a flowchart showing a detailed procedure in step S100.

A detailed procedure in step S100 is shown in FIG. 14. In FIG. 14, first, in step S101, it is determined whether or not the tag label tape 109 with print has been transported to the position of communication with the antenna LC described above (to be precise, the position at which communication is attempted in the case of tag absent interval, and this applies hereinafter). At this time also, it is sufficient to make the determination by, for example, detecting the distance of transport after the identification mark PM of the base tape 101 is detected using a predetermined publicly-known method as in step S8 in FIG. 13 described above etc. Until the position of communication is reached, the determination is not satisfied and the procedure is repeated, and when the position is reached, the determination is satisfied and the procedure moves to the next step S102.

In step S102, as in step S9 described above, the rotation of the feeding roller 27, the ribbon take-up roller 106, and the driving roller 51 is stopped and in a state in which the antenna LC substantially opposes the RFID circuit element To (excluding, however, the case of tag absent interval), the transport of the tag label tape 109 with print is stopped. Further, the supply of current to the print head 23 is stopped and the printing of the label print R is stopped (aborted).

After that, the procedure moves to step S200 and information is transmitted and received between the antenna LC and the RFID circuit element To by wireless communication and information transmitting/receiving processing (for details, refer to FIG. 24 to be described later) is performed, in which the information generated in step S2 in FIG. 13 described above is written to the IC circuit part 151 of the RFID circuit element To (or information stored in advance in the IC circuit part 151 is read).

After that, the procedure moves to step S103 and it is determined whether or not the flag F=1, which indicates the presence or absence of the occurrence of the communication error. When the transmission/reception of information has been normally completed in step S200 and no communication error has occurred (that is, not the case of tag absent interval), the determination is not satisfied because F=0 and the procedure moves to step S104.

In step S104, as in step S11 in FIG. 13, the feeding roller 27, the ribbon take-up roller 106, and driving roller 51 are rotatably driven to energize the print head 23 to resume the printing of the label print R as well as resuming the transport of the tag label tape 109 with print.

After that, the procedure moves to step S105 and it is determined whether or not the tag label tape 109 with print has been transported to the printing end position (calculated in step S2 in FIG. 13). At this time also, it is sufficient to make the determination by detecting the distance of transport after the identification mark PM of the base tape 101 is detected in step S6 using a predetermined publicly-known method. Until the printing end position is reached, the determination is not satisfied and the procedure is repeated, and when the position is reached, the determination is satisfied and the procedure moves to the next step S106.

In step 106, as in step S9 in FIG. 13, the supply of current to the print head 23 is stopped and the printing of the label print R is stopped. Whereby, the printing of the label print R to the print area S is completed. Thus, the routine is completed as described above.

On the other hand, in step S103, when the transmission/reception of information has not been completed normally and a communication error has occurred (in the case of tag absent interval), the determination is satisfied because F=1 and the procedure moves to step S107.

In step S107, as in step S4 in FIG. 13, the feeding roller 27, the ribbon take-up roller 106, and the driving roller 51 are rotatably driven to resume the transport of the tag label tape 109 with print and thus the routine is ended.

Figure 15:
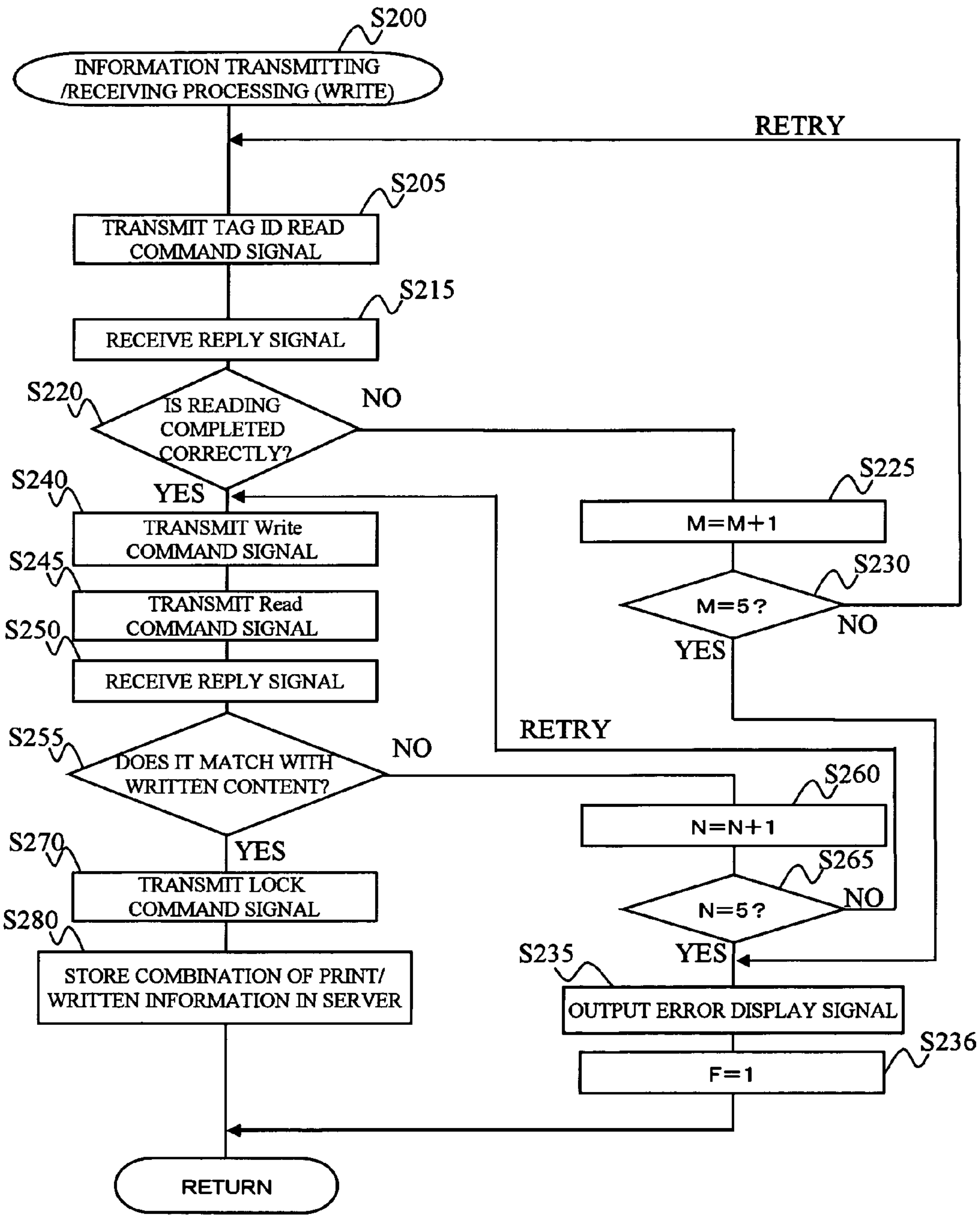
FIG. 15 is a flowchart showing a detailed procedure in step S200.

A detailed procedure in step S200 is shown in FIG. 15. In this example, the writing of information is described as an example out of the writing of information and the reading of information described above.

In FIG. 15, first, in step S205, a control signal is output to the transmitting circuit 306 via the input/output interface 113 and an interrogation wave having been subjected to a predetermined modulation is transmitted to the RFID circuit element To, which is an object to be written, via the loop antenna LC as an inquiry signal (in this example, a tag ID read command signal) for acquiring ID information stored in the RFID circuit element To. With the arrangement, the memory part 157 of the RFID circuit element To is initialized.

After that, in step S215, a reply signal (including the tag ID) transmitted from the RFID circuit element To, which is an object to be written, is received via the loop antenna LC and taken in via the receiving circuit 307 and the input/output interface 113 in response to the tag ID read command signal.

Next, in step S220, based on the received reply signal, it is determined whether or not the tag ID of the RFID circuit element To has been read normally.

When the determination is not satisfied, the procedure moves to step S225 and M is incremented by one and further in step S230, whether or not M=5 is determined. When M<4, the determination is not satisfied and the procedure returns to step S205 and the same procedure is repeated. When M=5, the procedure moves to step S235 and an error indication signal is output to the PC 118 via the input/output interface 113 to produce a corresponding writing error display and further in step S236, the flag F is set to F=1, which corresponds to the occurrence of communication error and the routine is ended. In this manner, even if initialization is not carried out properly, retries are attempted up to five times.

When the determination in step S220 is satisfied, the procedure moves to step S240 and a control signal is output to the transmitting circuit 306, and as a signal (in this example, a Write command signal) for specifying the tag ID read in step S215 and writing desired data to the memory part 157 of the relevant tag, an interrogation wave having been subjected to a predetermined modulation is transmitted to the RFID circuit element To, which is an object to which information is written, via the loop antenna LC, and then information is written.

After that, in step S245, a control signal is output to the transmitting circuit 306 and as a signal (in this example, a Read command signal) for specifying the tag ID read in step S215 and reading data stored in the memory part 157 of the relevant tag, an interrogation wave having been subjected to a predetermined modulation is transmitted to the RFID circuit element To, which is an object to which information is written, via the loop antenna LC to prompt a reply. After that, in step S250, a reply signal transmitted from the RFID circuit element To, which is an object of writing, is received via the loop antenna LC and taken in via the reception circuit 307 in response to the read command signal.

Next, in step S255, based on the received reply signal, it is determined whether or not the transmitted predetermined information described above has been stored in the memory part 157 normally by confirming the information stored in the memory part 157 of the RFID circuit element To and using publicly-known error detection code (cyclic redundancy check (CRC) etc.).

When the determination is not satisfied, the procedure moves to step S260 and N is incremented by one and further in step S265, whether or not N=5 is determined. When N<4, the determination is not satisfied and the procedure returns to step S240 and the same procedure is repeated. When N=5, the procedure moves to step S235 and the PC 118 is caused to produce a corresponding write error display similarly, the flag is set to F=1, and the routine is ended. In this manner, even if initialization is not carried out properly, retries are attempted up to five times.

When the determination in step S255 is satisfied, the procedure moves to step S270 and a control signal is output to the transmitting circuit 306, and as a signal (in this example, a lock command signal) for specifying the tag ID read in step S215 and prohibiting the overwrite of the data recorded in the memory part 157 of the relevant tag, an interrogation wave having been subjected to a predetermined modulation is transmitted to the RFID circuit element To, which is an object to which information is written, via the loop antenna LC to prohibit new information from being written to the RFID circuit element To. With the arrangement, the writing of RFID tag information to the RFID circuit element To, which is an object to be written, is completed.

After that, the procedure moves to step S280 and a combination of information having been written to the RFID circuit element To in step S240 and print information of the label print R to be printed in the print area S by the print head 23 in accordance therewith is output via the input/output interface 113 and the communication line NW and stored in the information server IS or the route server RS. The stored data is stored and held, for example, in the database of each of the servers IS, RS in such a manner that the PC 118 can refer to it. Thus, the routine is ended as described above.

The case is described so far, where RFID tag information is transmitted to the RFID circuit element To and written to the IC circuit part 151, and thus the RFID label T is produced. However, this is not limited, and there is a case where while RFID tag information is being read from the read-only RFID circuit element To in which predetermined RFID tag information is stored and held unrewritably, the print in accordance therewith is made to produce the RFID label T.

In this case, the setting of data to be written to the tag in the preparatory processing in step S2 in FIG. 13 is no longer necessary and it is only required to read RFID tag information in the information transmission/reception processing in step S200 in FIG. 14. At this time, it is only required in step S280 to store the combination of the print information and the read RFID tag information in the server.

In the tag label producing apparatus 1 in the present embodiment configured as described above, the predetermined label print R is made by the print head 23 on the cover film 103. Then, the cover film 103 and the base tape 101 fed out from the first roll 102 are bonded to each other and integrated into one body by the feeding roller 27 and the pressure roller 28 and formed as the tag label tape 109 with print. For the RFID circuit element To provided on the tag label tape 109 with print, information is contactlessly transmitted/received to/from the antenna LC, the reading or writing of information is carried out, the tag label tape 109 with print is cut into a predetermined length by the cutter mechanism 15, and thus the RFID label T is produced. At this time also, the sensor 127 detects the identification mark PM provided on the base tape 101 (the tag label tape 109 with print), and thereby, the transport to the predetermined position and the control of positioning based on the mark, and the control of printing, communication, and cutting using this mark are carried out smoothly.

A plurality of kinds of the cartridge 7 can be mounted to the cartridge holder 6 in the tag label producing apparatus 1 in the present embodiment. However, although the arrangement pitch Pp of the identification mark PM on the base tape 101 is the same (common) in each kind of the cartridge 7, the arrangement pitch Pt of the RFID circuit element To differs from one another. Therefore, in the present embodiment, the correlation information between the arrangement pitch Pp of the identification mark PM and the arrangement pitch Pt of the RFID circuit element To is recorded in the detection target part of the cartridge 7 for each cartridge 7. Then, in step S1, the detection result (including the correlation information) of the detection target part by the cartridge sensor CS is acquired. With the arrangement, when the identification mark PM is detected by the sensor 127, it is possible to recognize the array and its regularity of the RFID circuit element To of the base tape 101 (the tag label tape 109 with print) of the cartridge 7 currently mounted using the correlation information and smoothly carry out the transport to the corresponding predetermined position and the control of positioning, and the control of printing, communication, and cutting using this mark (the determination whether or not the full-cutting position has been reached in step S14 and step S15 based on the acquisition of information about the kind of tape in step S1 etc.).

As described above, by adopting a method in which the transport, the control of positioning, etc., are carried out based on the identification mark PM using the correlation information acquired from the detection target part of the cartridge 7, it is possible to make uniform all of the arrangement pitches Pp of the identification mark PM of the base tape 101 provided to the cartridge 7 even when a plurality of kinds of the cartridge 7 having different array regularities of the RFID circuit element To are mounted to the cartridge holder 6, as described above. As a result, the facilities for forming the identification mark PM on the base tape 101 will suffice if only equipped with a function of forming the identification mark PM with only the single arrangement pitch Pp. In this example, in particular, the identification mark PM is formed on the separation sheet 101*d* by printing, and therefore, it is only required to include the function of printing the identification mark PM with the single arrangement pitch Pp and it is no longer necessary to prepare a plurality of molds/plates etc. for printing. As a result, it is possible to simplify the structure and control of the facilities, and therefore, the manufacturing cost of the base tape 101 can be reduced and at the same time, the number of inventories of the printed tag tape and the amount of waste resulting from disposal can be reduced.

In the present embodiment, in particular, the form itself of each identification mark PM is made uniform (in the example, composed of one black strip (=mark element)). With the arrangement, the facilities for forming the identification mark PM on the base tape 101 can be further simplified.

In addition, in the present embodiment, it is possible to use the base tape 101 as shown in FIG. 6B and FIG. 7B (the arrangement pitch Pt of the RFID circuit element To is greater than the arrangement pitch Pp of the identification mark PM). In this case, after the previous production of label has ended, assuming the state that the base tape 101 (the tag label tape 109 with print) has stopped in the tag absent interval (the RFID circuit element To does not reach the position substantially opposing the antenna LC for the time being), the transport is started from the tag absent interval when the production of tag label is newly started.

In the present embodiment, in response to this, in step S13, whether or not it is the tag absent interval is determined (in this example, the determination is made depending on whether or not there is a response to the inquiry from the antenna LC). With the arrangement, even if the transport is started from the tag absent interval as described above, the procedure moves to step S15 because the determination in step S13 is satisfied as described above, and it is possible to carry out the corresponding control of printing, communication, cutting, etc., (in the example, the control of producing the tag label again after discharging the margin part).

Then, in the present embodiment, when the result of the determination is the tag absent interval, the tag label is produced without fail after the state in which the interval is not the tag absent interval is brought about by cutting and discharging the corresponding margin part. As a result, it is possible to align the position at which the RFID circuit element To is present at substantially a fixed position from the top end side of the label regardless of the length of the produced RFID label T as shown in FIGS. 10A to 10C and FIGS. 11A to 11C.

Further, in the present embodiment, in particular, when the RFID label T is produced, the cutter mechanism 15 cuts the tape while avoiding cutting the RFID circuit element To as described above. With the arrangement, it is possible to prevent the RFID circuit element To from being erroneously cut at the time of cutting of the tape at the cut line CL and the communication capability from being blocked or lost. In particular, by setting the minimum value of the length of the produced RFID label T in the transport direction at least equal to the arrangement pitch Pp between the identification marks PM (so that the label length≧Pp), it is possible at least to prevent without fail the RFID circuit element To from being erroneously cut because the position of the cut line CL is too close to the identification mark PM (that is, the tag label length is too short).

In the first embodiment, in the case of tag absent interval, the corresponding margin part is cut and discharged so that it is possible to align the position at which the RFID circuit element To is present at substantially a fixed position from the top end side of the label regardless of the length of the produced RFID label T, however, this is not limitative. A variation will be described below, in which the cutting or discharging is not carried out.

Figure 16:
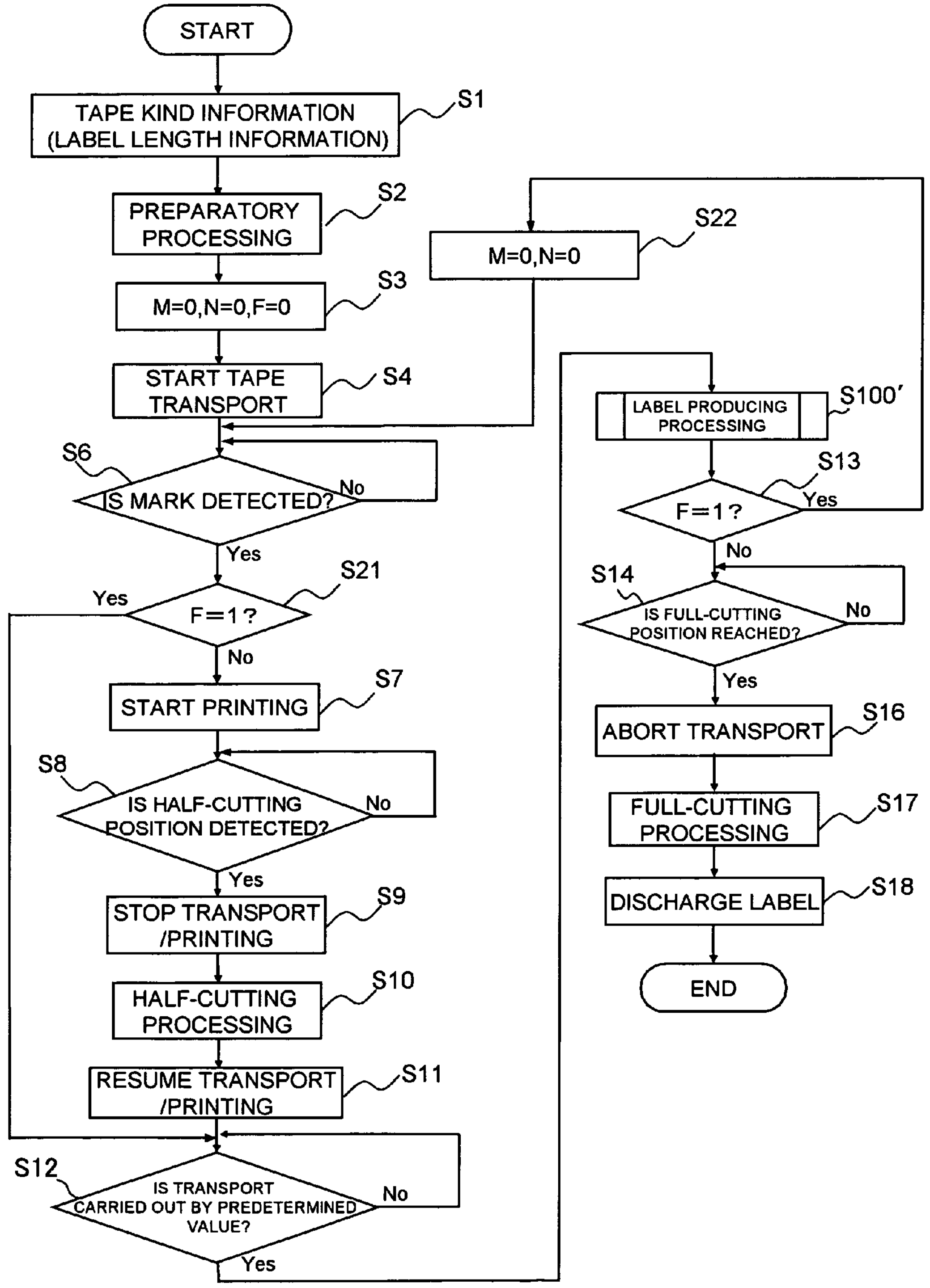
FIG. 16 is flowchart showing a control procedure executed by a control circuit provided in a variation in which a margin part is not cut or discharged.

A detailed procedure in step S100 is shown in FIG. 14. In FIG. 14, control procedure executed by the control circuit 110 provided in such a variation is shown in FIG. 16 (corresponding to FIG. 13). The same parts as those in FIG. 13 are assigned the same symbols and their description is omitted or simplified.

In FIG. 16, step S21 is newly provided between step S6 and step S7, in which it is determined whether or not the flag F indicative of the occurrence of a communication error is "1". When F=1, the determination is satisfied and the procedure moves to step S12, and when F=0, the determination is not satisfied and the procedure moves to step S7.

Further, in place of step S100, which is the label production processing procedure in the first embodiment, step S100' (details are described later) corresponding to S100 is provided, and step S13 is provided between step S100' and step S14. In step S13, when the determination is not satisfied because F=0, the procedure moves to step S16, as is the same as that described before, and when F=1 and the determination is satisfied, the procedure moves to newly provided step S22. In step S22, as is the same as that in step S3, the variables M, N for counting the number of times of access trial are initialized to "0", then the procedure returns to step S6 and the same procedure is repeated.

Figure 17:
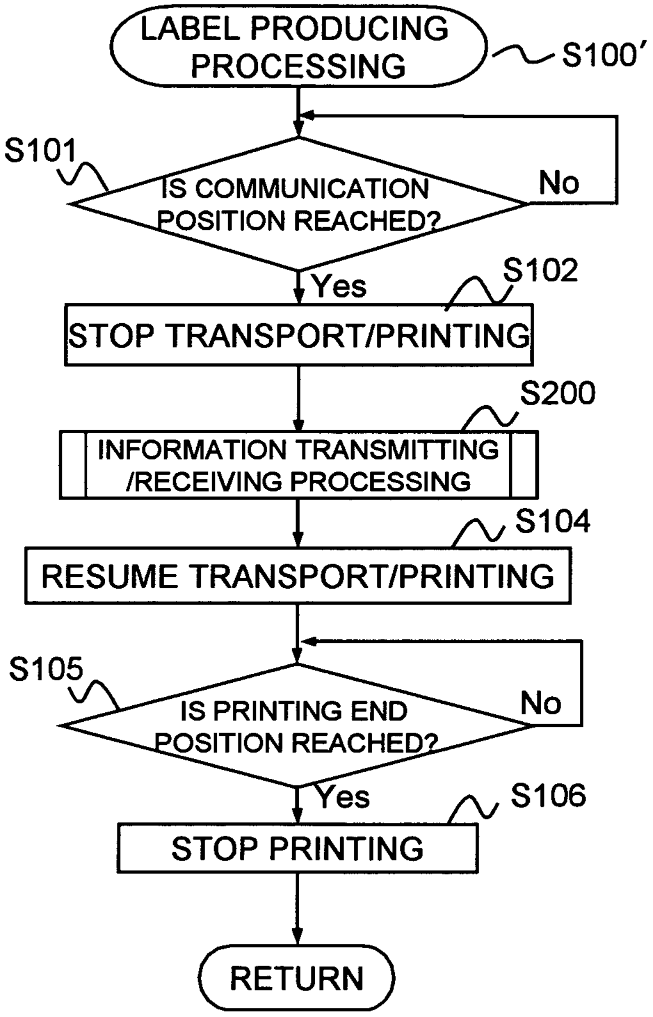
FIG. 17 is a flowchart showing a detailed procedure in step S100'.

A detailed procedure in step S100' is shown in FIG. 17 (corresponding to FIG. 14). The flowchart shown in FIG. 17 is the flowchart shown in FIG. 14, from which step S103 and step S107 are omitted and others are the same.

In the present variation, the processing in the case of tag absent interval is the most outstanding feature, as described above. Here, a case is described by taking an example, where the base tape 101 in FIG. 6B and FIG. 7B is used to produce the RFID label T having twice the length and further the identification mark PM detected in step S6 is the mark of (2) (that is, the tag absent interval).

In FIG. 16, step S1 to step S6 are the same as those in FIG. 13. At first, F=0, then, the determination in step S21 is not satisfied and after printing is started in step S7, the transport by the predetermined value described above (the transport distance with which the RFID circuit element To reaches the antenna LC in the case of other than that of tag absent interval) is carried out in step S12 after undergoing step S8 to step S11, and the procedure moves to step S100'. In step S100' in FIG. 17, the transport and printing are stopped in step S102 after step S101 and information transmitting/receiving processing is performed in step S200. At this time, since the RFID circuit element To is not present in the communication range of the antenna LC, a communication error occurs and F is set to "1". After that, the transport and printing are resumed in step S104, then, the printing is stopped in step S106 after step S105, and the procedure moves to step S13 in FIG. 16.

Here, as described above, because F=1, the determination in step S13 is satisfied and the procedure returns to step S6 after step S22. Then, because F=1, the determination in step S21 is satisfied and again, after the transport by the predetermined value described above (the transport distance with which the RFID circuit element To reaches the antenna LC) in step S12 (without undergoing step S7 to step S11), the label production processing is performed in step S100'. This time, the tag absent interval ends because of being subjected to step S12 and the RFID circuit element To has reached the position substantially opposing the antenna LC, and therefore, the transmission/reception of information is completed and F is set to "0" (F=0). Because of the arrangement, the determination in step S13 is not satisfied any longer, and then, the tape is cut in step S17 after undergoing step S14, step S16, discharged in step S18, and thus the RFID label T is completed.

Figure 18A:
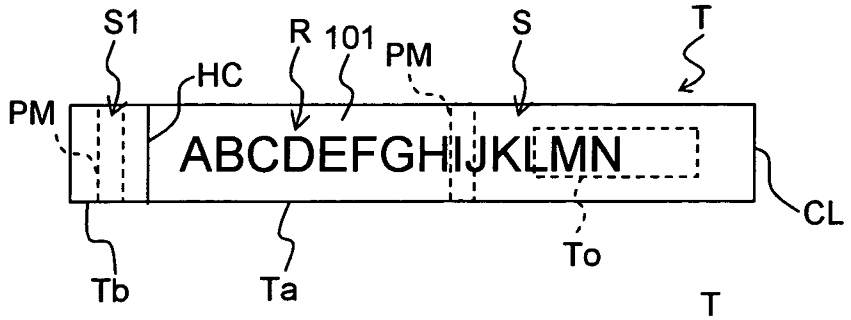
FIGS. 18A to 18C are diagrams showing an outside appearance of an RFID label.
Figure 18B:
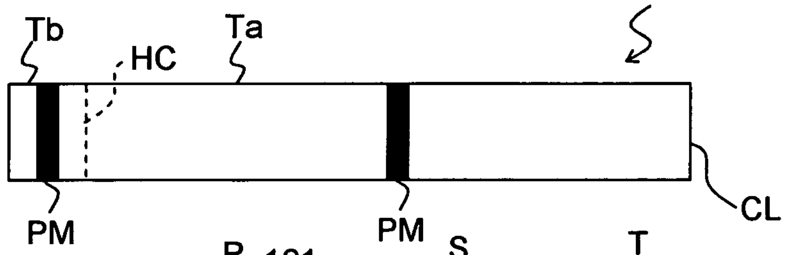
Figure 18C:
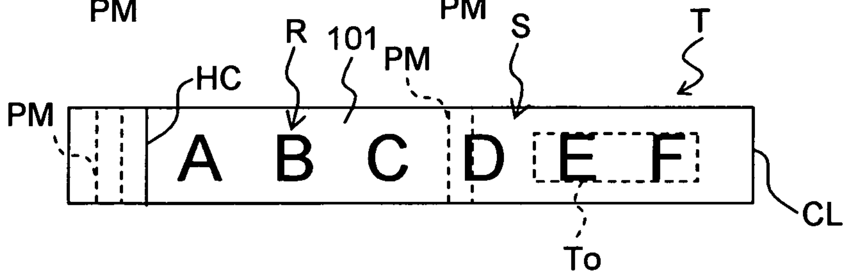

As described above, in the present variation, in step S7 in the flowchart in FIG. 16, the printing is started first (that is, the printing is applied to the first half part of the label having twice the length (that is, the area corresponding to the first interval)) and in the second loop after the procedure returns from step S13 to step S6, step S7 etc. is skipped and the information transmission/reception is performed in step S200 (that is, communication is performed in the second half part of the label having twice the length (that is, the second interval). The outside appearance of the RFID label T produced by such a control procedure is shown in FIGS. 18A, 18B, and 18C (corresponding to FIGS. 12A, 12B, and 12C).

In the present variation also, the same effect as that in the first embodiment is obtained. Further, as with the first embodiment, when the production of the tag label is started even in the tag absent interval, the label is produced using the corresponding area without the cutting and discharging, and therefore, it is possible to effectively make use of the tape without waste and efficiently produce the tag label.

In the above, the case is described as an example, where each of the identification marks PM is composed of the mark (one-line mark with fixed width) made uniform into the single form, however, this is not limitative. Another embodiment will be described below.

A second embodiment of the present disclosure will be described with reference to FIG. 19 to FIG. 40. The present embodiment is an embodiment in which an identification mark PM includes a mark having one black strip with fixed width and a mark having two strips as a mark element. The same parts as those in the first embodiment are assigned the same symbols and their description is omitted or simplified appropriately.

Figure 19A:
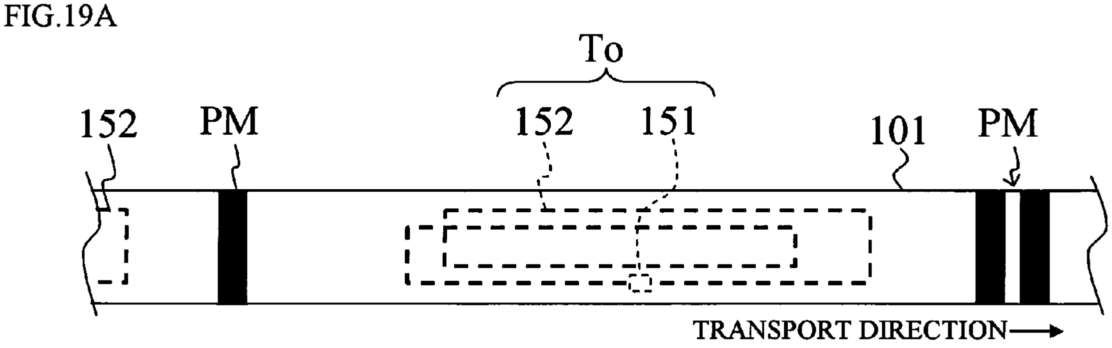
FIGS. 19A and 19B are conceptual fragmentary diagrams showing a base tape fed out from a first roll provided in a tag label producing apparatus in a second embodiment of the present disclosure, viewed from the direction of arrow D in FIG. 5 (that is, viewed from the side of the separation sheet).
Figure 19B:
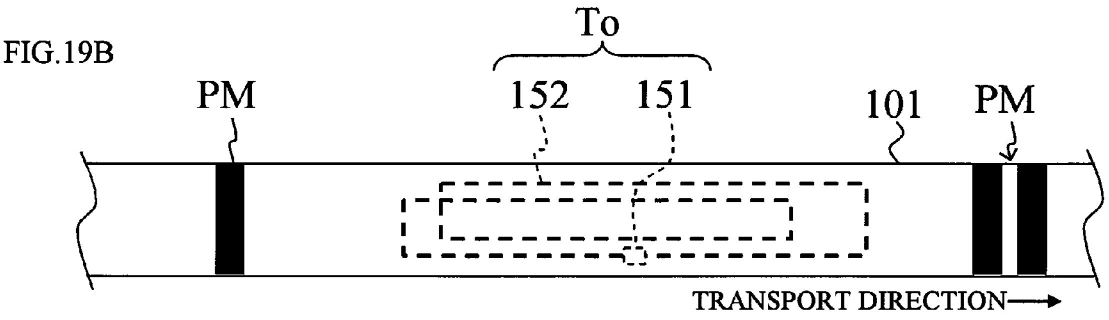

The base tape 101 fed out from the first roll 102 of the second embodiment is shown in FIG. 19A and FIG. 19B (corresponding to FIG. 6A and FIG. 6B). The relationship between the arrangement pitch of the identification mark PM and the arrangement pitch of the RFID circuit element To is shown in FIG. 20A and FIG. 20B (corresponding to FIG. 7A and FIG. 7B).

Figure 20A:
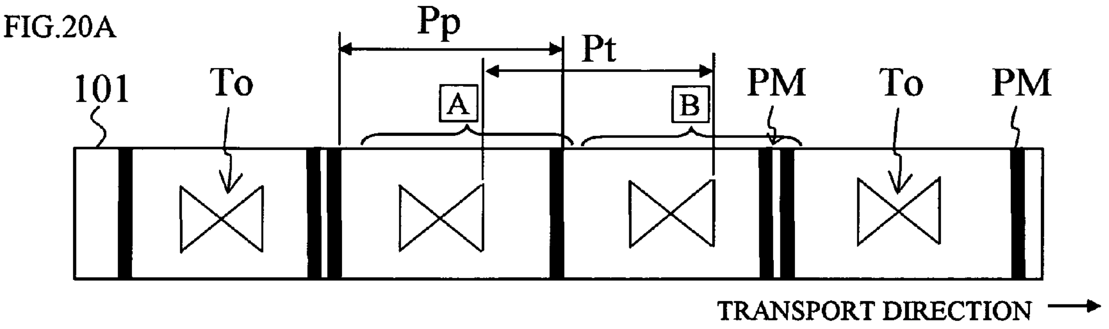
FIGS. 20A and 20B are explanatory diagrams conceptually representing a relationship between an arrangement pitch of identification mark and an arrangement pitch of RFID circuit element shown in FIG. 19A and FIG. 19B.
Figure 20B:
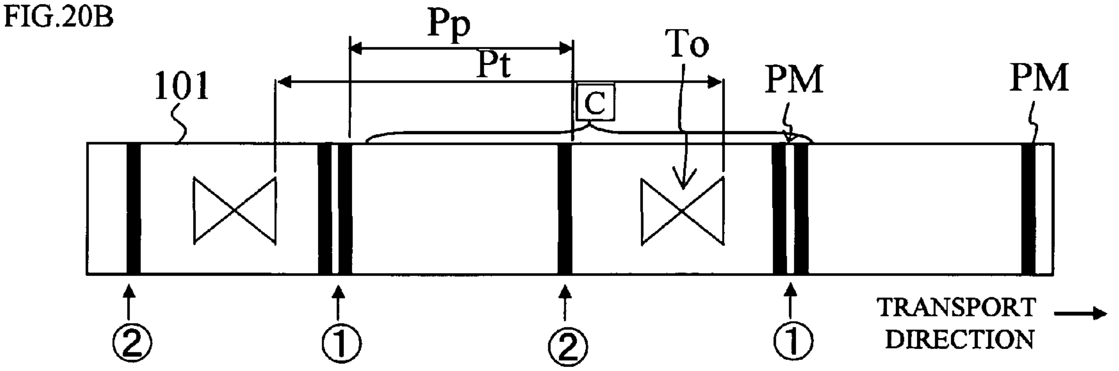

On both the base tape 101 in FIG. 19A and FIG. 20A and the base tape 101 in FIG. 19B and FIG. 20B, different from the first embodiment, an identification mark PM with two black strips and an identification mark PM with one black strip (instead of making the numbers of strips different, it may also be possible to change the form of the whole mark, or the length (=dimension in the tape width direction), width (=dimension in the tape longitudinal direction), color, etc., of the mark element, and further, different graphic shapes (circle, triangle, etc.) may be used) are arranged mixedly (in this example, alternately arranged in the tape longitudinal direction). As with the first embodiment, the arrangement pitch of the identification mark PM is Pp and the arrangement pitch Pt of the RFID circuit element To holds the relationship Pt=n×Pp (n: integer equal to 1 or more). The arrangement pitch between the marks of the identification mark PM with two black strips is 2Pp and the arrangement pitch between the marks of the identification mark PM with one black strip is also 2Pp.

The base tape 101 in FIG. 19A and FIG. 20A is an example, in which n=1, then Pt=Pp, that is, one RFID circuit element To (second RFID circuit element) is arranged without exception between the neighboring identification marks PM, PM. The base tape 101 is used to produce the RFID label T having substantially the length same as (or not more than) the distance between the neighboring identification marks PM, PM (the arrangement pitch Pp of the identification mark PM) (refer to FIG. 21A and FIG. 21B, and FIG. 22A and FIG. 22B, to be described later).

On the other hand, the base tape 101 in FIG. 19B and FIG. 20B is an example, in which n=2, then Pt=2Pp, that is, the RFID circuit element To is arranged with the pitch twice that of the identification mark PM. As a result, as shown in FIG. 20B, in this arrangement, there exist two neighboring identification marks PM, PM between which no RFID circuit element is present (blank). This base tape 101 is used to produce the RFID label T having a length substantially twice the distance (arrangement pitch Pp) between the neighboring identification marks PM, PM (or by a factor not less than 1 and not more than 2) (refer to FIG. 21A and FIG. 21B, to be described later).

As described above, in the present embodiment also, it is possible to use the base tapes 101 of a plurality of kinds having a plurality of correlations according to the value of n, as in the first embodiment, and in the above examples, the cases of n=1 and n=2 are shown illustratively.

Figure 21A:
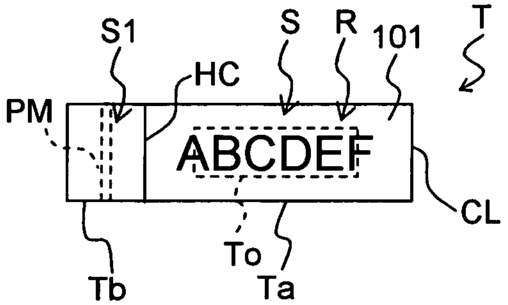
FIGS. 21A and 21B are diagrams showing an example of an outside appearance of an RFID label produced by completing the writing (or reading) of information to the RFID circuit element and cutting of the tag label tape with print by the tag label producing apparatus.
Figure 21B:
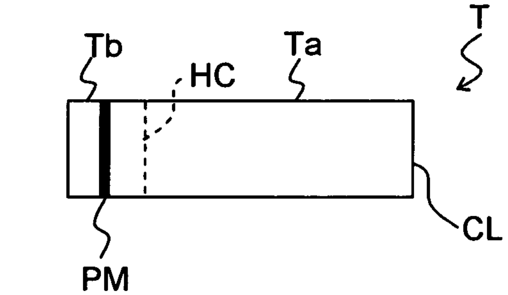
Figure 22A:
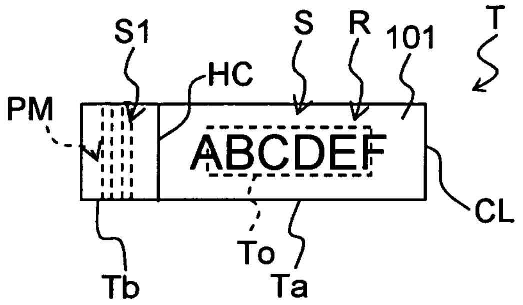
FIGS. 22A and 22B are diagrams showing another example of an outside appearance of an RFID label produced by completing the writing (or reading) of information to the RFID circuit element and cutting of the tag label tape with print by the tag label producing apparatus.
Figure 22B:
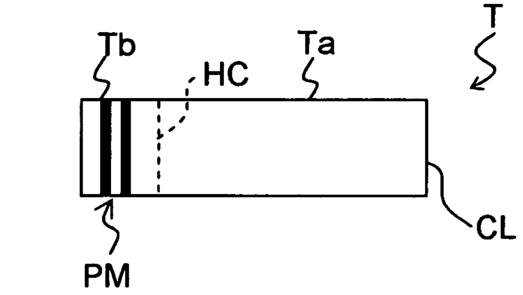

An example of the outside appearance of the RFID label T is shown in FIG. 21A and FIG. 21B. This example shows the RFID label T produced using the base tape 101 (in detail, the part shown by (A) in the figure) shown in FIG. 19A and FIG. 20A and having substantially the same length as the arrangement pitch Pp of the identification mark PM, wherein FIG. 21A is its top view (corresponding to FIG. 10A in the first embodiment) and FIG. 21B is its bottom view (corresponding to FIG. 10B in the first embodiment). Similarly, another example of the outside appearance of the RFID label T is shown in FIG. 22A and FIG. 22B. The RFID label is produced using the base tape 101 (in detail, the part shown by (B) in the figure) shown in FIG. 19A and FIG. 20A. FIGS. 21A and 21B are different from FIGS. 22A and 22B only in that the identification mark PM in the former figures is composed of the mark with one black strip, while the identification mark PM in the latter figures is composed of the mark with two black strips. The sectional structure thereof is the same as that described using FIG. 11, and therefore, its description is omitted.

Figure 23A:
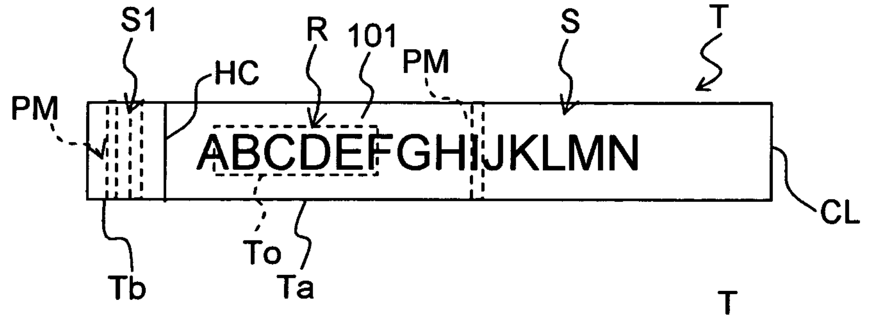
FIGS. 23A to 23C are diagrams showing another example of an outside appearance of an RFID label produced by the tag label producing apparatus.
Figure 23B:
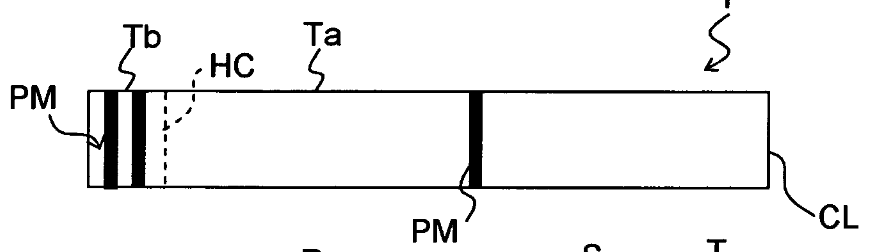

Another example of the outside appearance of the RFID label T is shown in FIG. 23A and FIG. 23B. This example shows the RFID label T produced using the base tape 101 shown in FIG. 19B and FIG. 20B and having the length substantially twice that of the arrangement pitch Pp of the identification mark PM, wherein FIG. 23A is its top view (corresponding to FIG. 12A in the first embodiment) and FIG. 23B is its bottom view (corresponding to FIG. 12B in the first embodiment). In this case, the print area S (printable maximum length) on the backside of the cover film 103 is about twice (for example, slightly more than twice) that of the structure shown in FIG. 21A and FIG. 22A and the label print R (in the example, letters "ABCDEFGHIJKLMN") corresponding to the stored information etc. of the RFID circuit element To is printed. It may also be possible for an operator to produce the RFID label T about twice the length compared to that in FIG. 22A by using the base tape 101 shown in FIG. 19B and FIG. 20B in order to increase in size each letter of the print.

Figure 24:
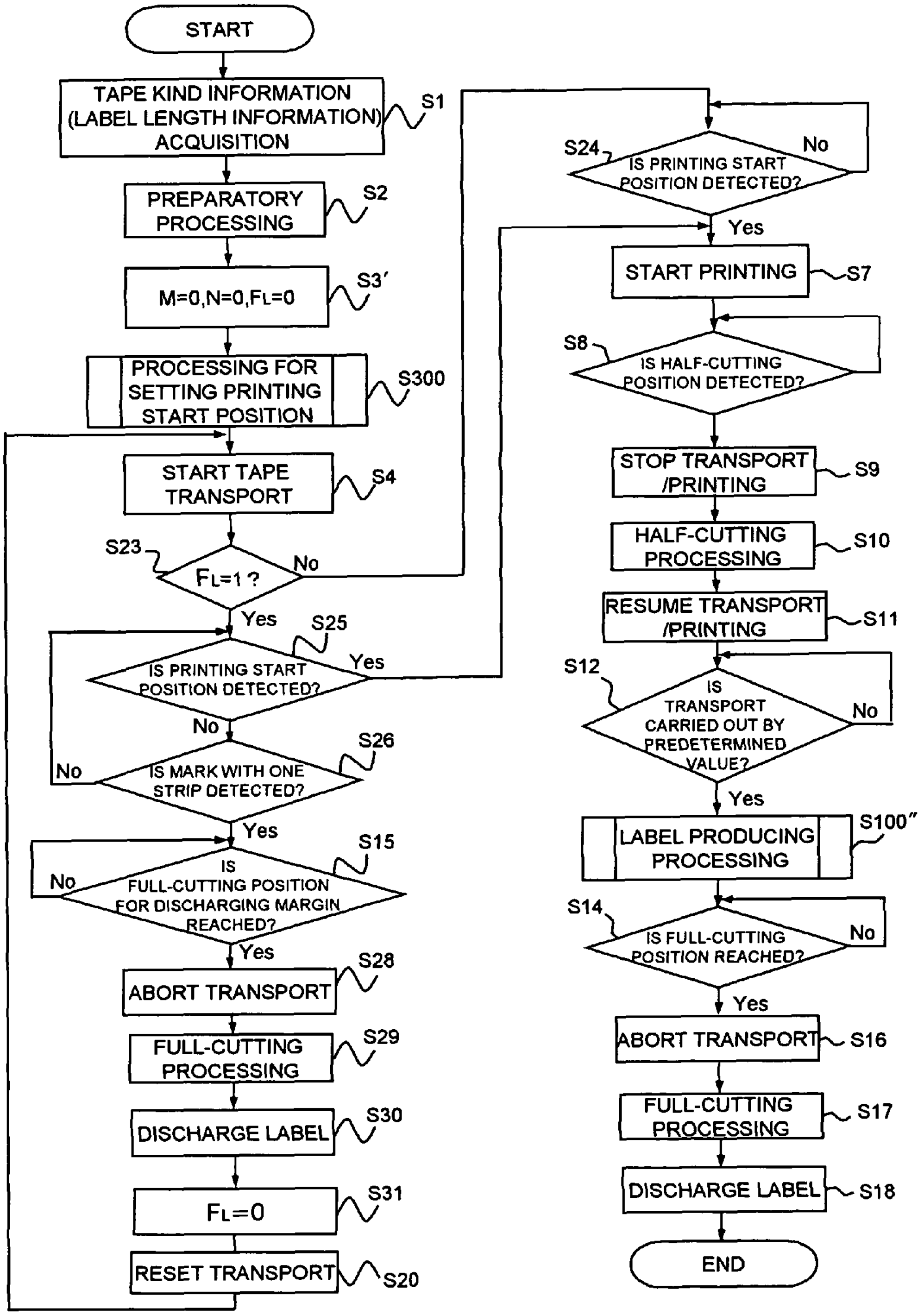
FIG. 24 is a flowchart showing a control procedure executed by a control circuit.

A control procedure executed by the control circuit 110 provided in the tag label producing apparatus 1 in the present embodiment, is shown in FIG. 24 (corresponding to FIG. 13). The same steps as those in FIG. 13 are assigned the same symbols.

In FIG. 24, similar to the above, the flowchart is started when the predetermined RFID label production operation is performed by the tag label producing apparatus 1 via the PC 118.

First, as in the first embodiment, in step S1, based on the detection signal of the cartridge sensor CS, information about the kind of tape of the corresponding base tape 101 (in the above examples, whether the base tape 101 is for producing a label having the normal length shown in FIG. 19A and FIG. 20A, or whether for producing a label having twice the length shown in FIG. 19B and FIG. 20B, that is, information about the length of the label) is acquired. After that, the procedure moves to step S2 and first preparatory processing similar to that in the above is executed.

Next, in step S3' corresponding to step 3, the setting of initialization is carried out. In the present embodiment, the above variables M, N and a flag FL for twice the length (long label) indicative of the base tape 101 for producing the long label twice the length shown in FIG. 19B and FIG. 20B are initialized to "0".

After that, the procedure moves to step S300, newly provided, and the setting of the printing start position is made based on the information about the length and kind of tape acquired in step S1. In other words, the setting is made about whether the printing by the print head 23 is started when the mark with one black strip is detected, or when the mark with two black strips is detected, or when both are detected by the sensor 127 (for details, refer to FIG. 25, to be described later).

After that, the procedure moves to step S4 and after the tape transport is started in a manner similar to the above, the procedure moves to step S23, newly provided.

In step S23, whether or not FL=1 is determined. When the base tape 101 is the one for producing the label with the normal length shown in FIG. 19A and FIG. 20A, FL=0, and therefore, the determination is not satisfied and the procedure moves to step S24. In step S24, it is determined whether or not the printing start position (when either the mark with one black strip or the mark with two black strips is detected, in the case, because FL=0. Refer to step S304 in FIG. 25, to be described later) is detected by the sensor 127 and when detected, the procedure moves to step S7.

On the other hand, in step S23, when the base tape 101 is the one for producing the label twice the length shown in FIG. 19B and FIG. 20B, the determination is satisfied because FL=1, and then the procedure moves to step S25. In step S25, it is determined whether or not the printing start position (when the mark with two black strips is detected, in this case, because FL=1. Refer to step S302 in FIG. 25, to be described later) is detected by the sensor 127 and when detected, the procedure moves to step S7.

Step S7 to step S12 are the same as those in the first embodiment. In other words, the printing is started in the print area S of the cover film 103 and after the transport and printing are stopped at the half-cutting position and the half-cutting processing is performed, the transport and printing are resumed and when the tag label tape 109 with print is transported by the predetermined value, the procedure moves to step S100" newly provided in place of step S100.

In step S100", the label production processing substantially the same as that in step S100 is performed (refer to FIG. 26, to be described later) and when transported to the position of communication of the RFID circuit element To, the transport and printing are stopped and transmission/reception of information for the RFID circuit element To is performed, and then, the transport and printing are resumed to complete the print.

After step S100" is completed as described above, step S14, step S16, step S17, and step S18 are the same as those described above, and therefore, their description is omitted.

On the other hand, in step S25, when the printing start position (when the mark with two black strips is detected) is not detected by the sensor 127, the determination is not satisfied and the procedure moves to step S26.

In step S26, it is determined whether or not the mark with one black strip is detected by the sensor 127. When detected, the procedure moves to step S15 the same as that in the first embodiment, and when not detected, the determination is not satisfied and the procedure returns to step S25 and the same procedure is repeated. In other words, when the determination in step S23 is satisfied, step S25 and step S26 are repeated in such an order of step S25→step S26→step S25,→step S26→ . . . , and when the mark with two black strips is detected first, the procedure moves to step S7 and when the mark with one black strip is detected first, the procedure moves to step S15.

In step S15, as in the first embodiment, it is determined whether or not the margin discharging full-cutting position, which is different from that in step S14, has been reached. In step S15, it is determined whether or not the full-cutting position has been reached in order to discharge the area corresponding to the interval from the identification mark PM of (2) to the identification mark PM of (1) that follows (the area of transport until the identification mark PM of (1) is detected after the identification mark PM of (2) is detected by the sensor 127) as a margin (excess area) when the identification mark PM indicated by (2) in FIG. 20B is detected in step S26 on the assumption that the RFID circuit element To is always arranged on the top end side in the transport direction (refer to FIG. 23A and FIG. 23C) when the RFID label T twice the length is produced using the base tape 101 in FIG. 19B and FIG. 20B (the base tape 101 is identified to be the one shown in FIG. 19B and FIG. 20B by the information about the kind of tape acquired in step S1, and the length of the part to be cut and discharged as a margin is determined and the full-cutting-position is set in accordance with the setting of position of the cut line CL in the preparatory processing in the subsequent step S2). At this time also, it is sufficient to make the determination by, for example, counting the number of pulses output by the feeding motor driving circuit 121 that drives the feeding motor 119, which is a pulse motor, as in the above. Until the margin discharging full-cutting position is reached, the determination is not satisfied, and the procedure is repeated and when the position is reached, the determination is satisfied and the procedure moves to step S28.

After that, step S28, step S29, and step S30 are substantially the same as step S16, step S17, and step S18. In other words, in step S28, the rotation of the feeding roller 27, the ribbon take-up roller 106, and the driving roller 51 is stopped and the transport of the tag label tape 109 with print is stopped, and in step S29, the movable blade 41 of the cutter mechanism 15 is rotated and the tag label tape 109 with print is cut, and then, the driving roller 51 is rotated to start the transport and then the margin part produced in step S29 is transported toward the label discharging exit 11 and discharged to the outside of the tag label producing apparatus 1.

Figure 23C:
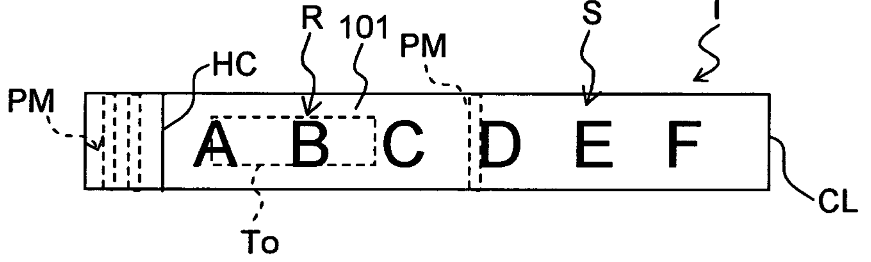

After that, in step S31, the flag FL is set to "0" (FL=1) and in step S20, the reference value on which the determination of the distance in the transport direction is based is initialized (reset) and then the procedure returns to step S4 and the same procedure is repeated. Whereby, when the RFID label T twice the length is produced using the base tape 101 in FIG. 19B and FIG. 20B, even if the tag absent interval is encountered immediately after the production starts, the area corresponding to the interval from the identification mark PM of (2) to the subsequent identification mark PM of (1) is discharged as a margin. With the arrangement, it is possible to produce without fail the RFID label T twice the length in which the RFID circuit element To is arranged on the top end side in the transport direction, as shown in FIG. 23A to FIG. 23C.

Figure 25:
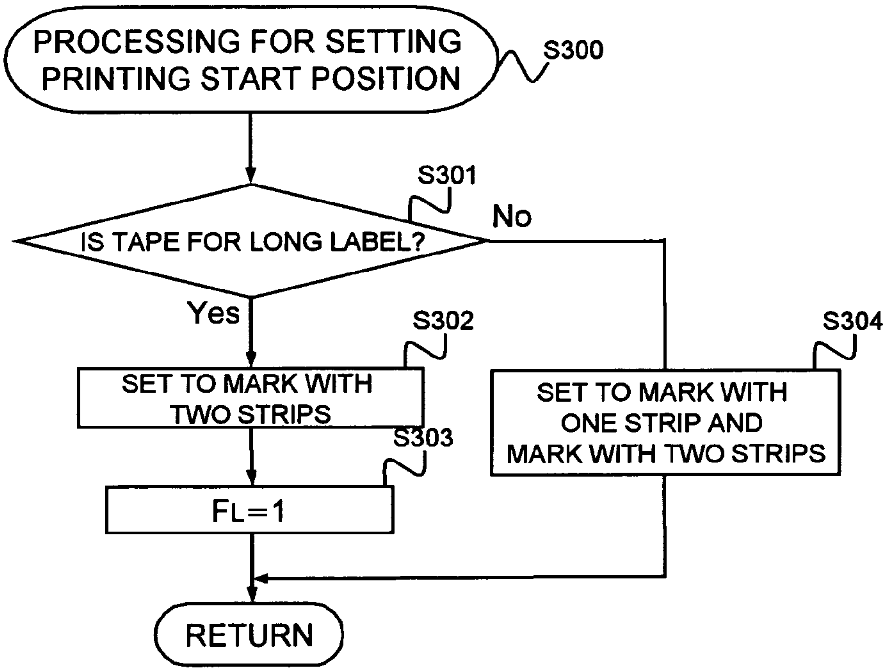
FIG. 25 is a flowchart showing a detailed procedure in step S300.

A detailed procedure in step S300 is shown in FIG. 25. In FIG. 25, first in step S301, it is determined whether or not the base tape 101 (as shown in FIG. 19B or FIG. 20B) in the cartridge 7 is the tape for producing the label twice the length (tape for long label) based on the information about the kind of tape acquired in step S1 in FIG. 24.

When the tape is the one for producing the label twice the length shown in FIG. 19B and FIG. 20B, the determination of step S301 is satisfied and the procedure moves to step S302, in which the mark with two black strips is set as the identification mark PM indicative of the printing start position and further in step S303, the flag FL for twice the length is set to "1" (FL=1), and the routine is ended.

On the other hand, in step S301, when the tape is the base tape 101 for producing the label with the normal length shown in FIG. 19A and FIG. 20A, the determination is not satisfied and the procedure moves to step S304, in which the mark with one black strip is set as the identification mark PM indicative of the printing start position, and the routine is ended.

Figure 26:
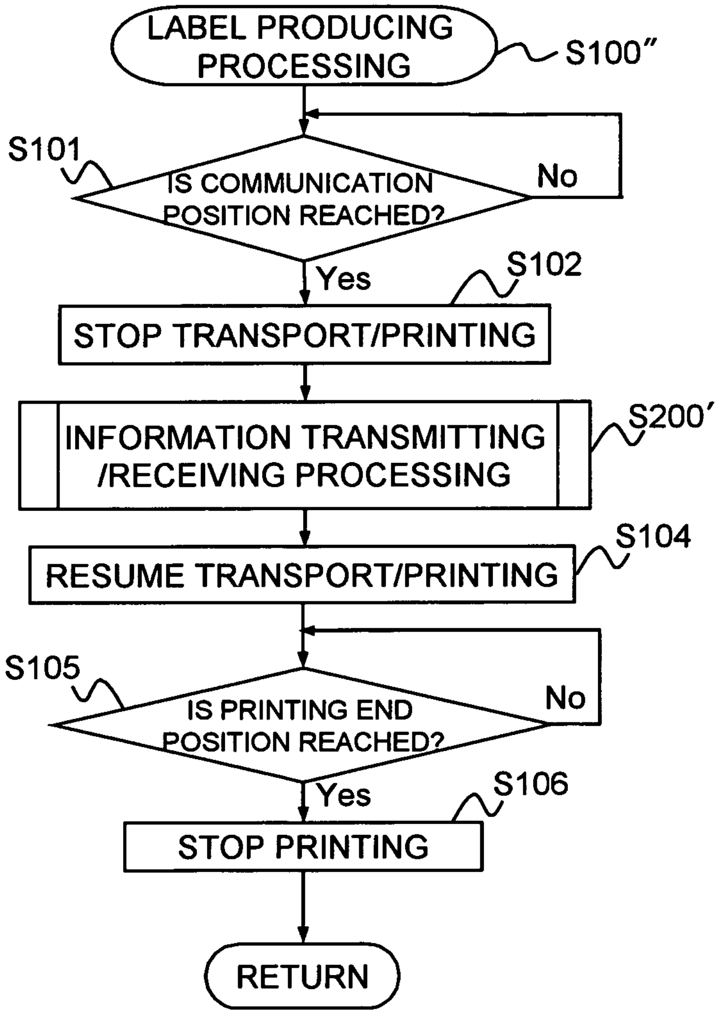
FIG. 26 is a flowchart showing a detailed procedure in step S100".

A detailed procedure in step S100" is shown in FIG. 26 (corresponding to FIG. 17). The flowchart shown in FIG. 26 is the flowchart shown in FIG. 17 in which step S200 has been replaced with step S200" and others are the same.

Figure 27:
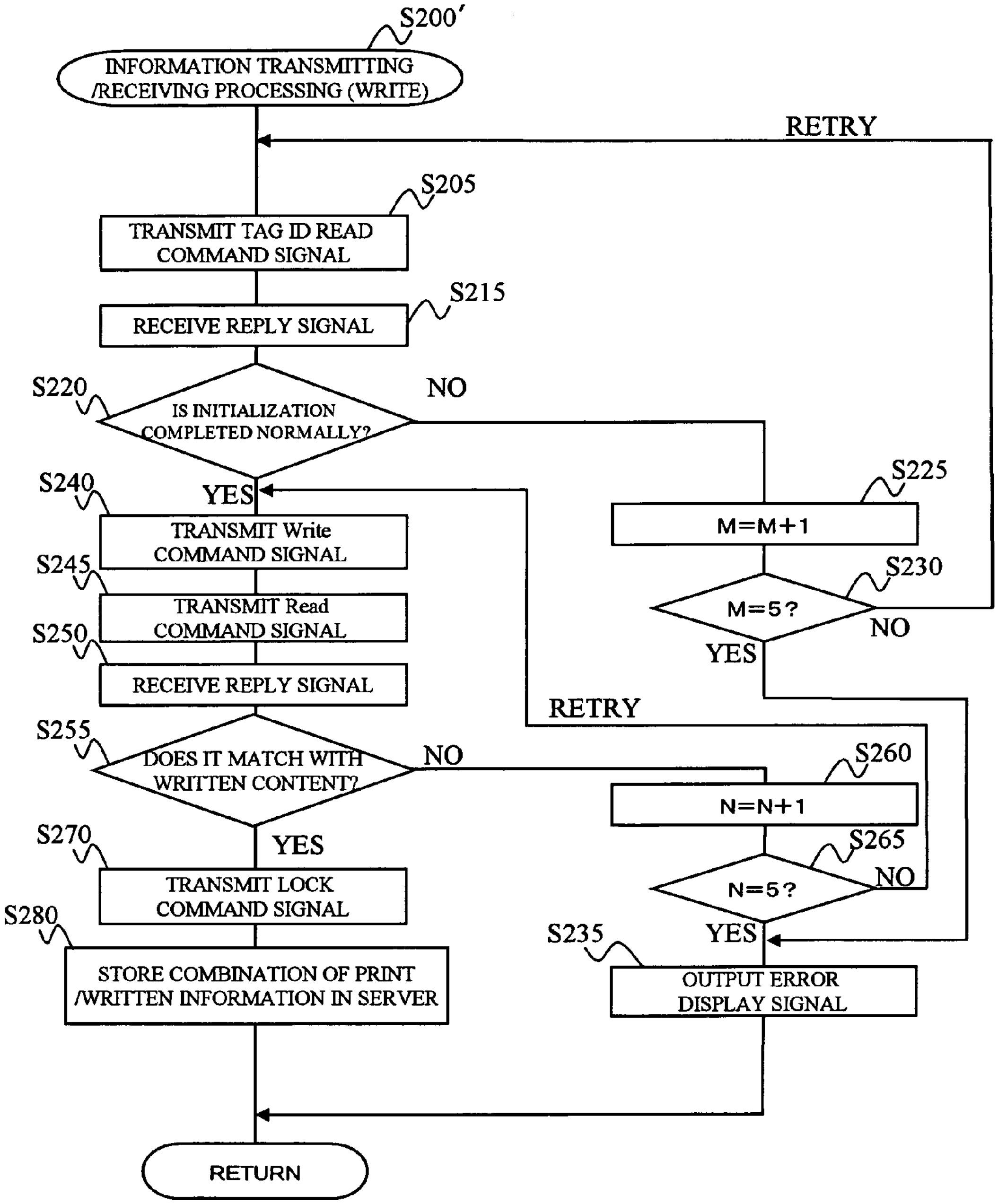
FIG. 27 is a flowchart showing a detailed procedure in step S200'.

A detailed procedure in step S200' is shown in FIG. 27 (corresponding to FIG. 15). The flowchart shown in FIG. 27 is the flowchart shown in FIG. 15 from which step S236 has been omitted and others are the same.

The present embodiment is also not limited to the case where RFID tag information is transmitted to the RFID circuit element To and written to the IC circuit part 151, and thus the RFID label T is produced, as described above. In other words, it may also be possible to produce the RFID label T by, while reading RFID tag information from the read-only RFID circuit element To in which predetermined RFID tag information is unrewritably stored and held in advance, carrying out printing in accordance with the RFID tag information.

In this case, the setting of data to be written to the tag in the preparatory processing in step S2 in FIG. 24 is no longer necessary and it is only required to read RFID tag information in the information transmitting/receiving processing in step S200' in FIG. 26. At this time, it is only required in step S280 to store the combination of the print information and the read RFID tag information in the server.

In the tag label producing apparatus 1 in the second embodiment having the configuration described above, the identification mark PM is arranged with the predetermined pitch Pp at a plurality of positions in the longitudinal direction of the base tape 101 in the cartridge 7. At this time, the identification marks PM include a plurality of kinds of form different from one another, that is, the identification mark PM formed by two black strips and the identification mark PM formed by one black strip. Then, in the present embodiment, when the RFID labels T with various lengths are produced using the base tape 101 (in this example, the cartridge 7 is replaced), among the identification marks PM detected by the sensor 127 during the transport of the tape, the identification marks PM of different forms are distinguished, that is, the identification mark PM formed by two black strips is distinguished from the identification mark PM formed by one black strip in step S25, step S26, and step S24 (based on the setting in step S300), and by using them appropriately according to the RFID label T with a length of label to be produced, the transport and the control of positioning for printing on the tape, cutting, etc., are carried out smoothly (the margin part discharging control to step S15, the control of printing, communication, cutting, etc., after step S7).

As described above, by adopting a method in which a plurality of kinds of the identification mark PM of different forms are prepared and they are distinguished from one another when used, it is possible to make uniform all of the pitches Pp of the identification mark PM to be provided thereon even if the plurality of kinds of the base tape 101 with different array regularities of the RFID circuit element To are present in order to produce the RFID labels T with a variety of lengths (in this example, the tape for producing the label with the normal length in FIG. 19A and FIG. 20A and the tape for producing the label with twice the length in FIG. 19B and FIG. 20B). As a result, the facilities for forming the identification mark PM on the base tape 101 will suffice if only equipped with a function of forming the identification mark with the pitch 2Pp of a single pattern for the identification mark PM with two black strips, and similarly, for the identification mark PM with one black strip also, the facilities will suffice if only equipped with a function of forming the identification mark with the pitch 2Pp of a single pattern. In other words, it is no longer necessary to change the pitches of all of the identification marks PM for each kind of tape (as in the above, it is no longer necessary to prepare a plurality of molds/plates, etc. for printing, for formation by printing) and therefore, it is possible to simplify the structure and control of the facilities. As a result, the manufacturing cost of the base tape 101 can be reduced and at the same time, the number of inventories of the tag tape and the amount of waste resulting from disposal can be reduced.

In the present embodiment, in particular, the RFID circuit element To is formed based on the tag array regularity having a predetermined correlation with the pitch Pp of the identification mark PM and the array regularity is acquired based on the detection result by the cartridge sensor CS in step S1 as correlation information between the arrangement pitch Pp of the identification mark PM and the arrangement pitch Pt of the RFID circuit element To recorded in the detection target part of each cartridge 7. With the arrangement, when producing a relatively long RFID label T using the RFID circuit element To arranged with the pitch 2Pp on the base tape 101 for producing the label twice the length, it is possible to carry out the transport, communication control, etc., on the basis of only the identified identification mark PM with two black strips based on the setting in step S300 (step S7 to step S18 etc.). When producing a relatively short RFID label T using the RFID circuit element To arranged with the short pitch Pp on the base tape 101 for producing the label with normal length, it is possible to carry out the transport, communication control, etc., on the basis of both the identified identification mark PM with one black strip and the identified identification mark PM with two black strips based on the setting in step S300 (step S7 to step S18 etc.).

In the present embodiment, in response to the above, when producing a relatively long RFID label T using the base tape 101 for producing a label twice the length, it is determined whether or not the identification mark PM with one black strip has been detected in step S26 (whether or not the interval is the tag absent interval). With the arrangement, it is possible to carry out the corresponding control of printing, communication, cutting, etc., (in this example, the control to newly produce the tag label after discharging the margin part) even when the transport is started from the tag absent interval immediately after the label production is started.

Then, when the identification mark PM with one black strip is detected in the tag absent interval as described above, the interval until the identification mark PM with two black strips is detected is cut and discharged (step S15, step S28 to step S30), and thereby, the label is produced without fail after the interval in which the identification mark PM with two black strips is detected is reached in step S7 and subsequent steps. As a result, regardless of the length of the produced label (that is, regardless whether the base tape 101 for producing the label twice the length is used or the base tape 101 for producing the label with normal length is used), it is possible to align the position at which the RFID circuit element To is present at substantially a fixed position (in this example, on the top end side) from the top end side of the label in the produced RFID label T as shown in FIGS. 21A and 21B, FIGS. 22A and 22B, and FIGS. 23A to 23C.

In the present embodiment also, as in the first embodiment, when the RFID label T is produced, the cutter mechanism 15 cuts the tape while avoiding cutting the RFID circuit element To. With the arrangement, it is possible to prevent the RFID circuit element To from being erroneously cut at the time of cutting of the tape at the cut line CL and the communication capability from being blocked or lost. In particular, by setting the minimum value of the length of the produced RFID label T in the transport direction at least equal to the arrangement pitch Pp between the identification marks PM (so that the label length≧Pp), it is possible at least to prevent without fail the RFID circuit element To from being erroneously cut because the position of the cut line CL is too close to the identification mark PM (that is, the tag label length is too short).

The second embodiment is not limited to the above aspects and there can be various modifications in the range not departing from its gist and technical concept. Those are described below in due order.

(1) When Arrangement Patter of One Black Strip and Two Black Strips is Changed

In the second embodiment, the mark with one black strip and the mark with two black strips are alternately arranged in the tape longitudinal direction and as a result, the relationship between the arrangement pitch Pp of the identification mark PM and the arrangement pitch Pt of the RFID circuit element To is established as Pt=Pp or Pt=2Pp, however, this is not limitative. The relationship between the arrangement pitch Pp of the identification mark PM and the arrangement pitch Pt of the RFID circuit element To in a variation in which the relationship Pt=3Pp can hold, is shown in FIG. 28A and FIG. 28B (corresponding to FIG. 20A and FIG. 20B).

Figure 28A:
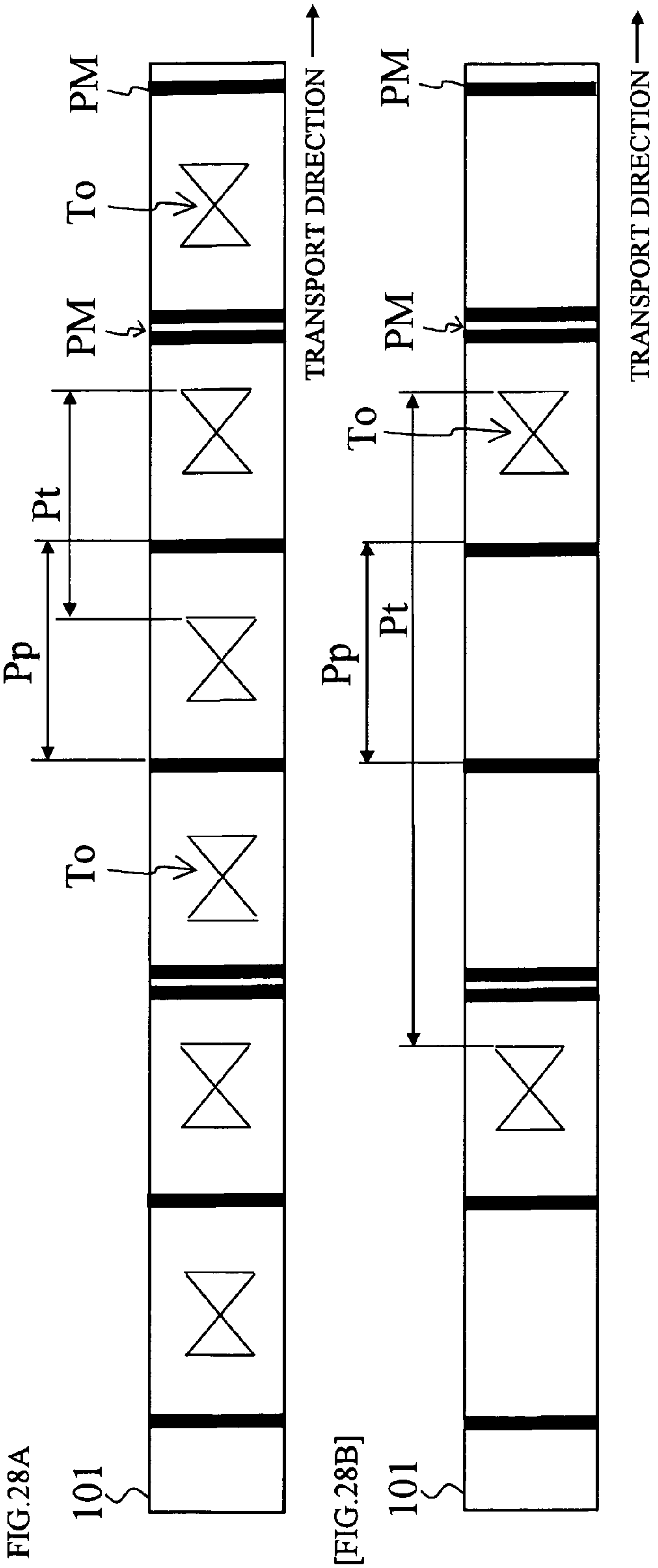

On both of the base tapes 101 in FIG. 28A and FIG. 28B, the identification mark PM with two black strips and the identification mark PM with one black strip are arranged mixedly (in this example, a set of three marks, that is, one with two black strips, one with two black strips, and one with two black strips, is arranged repeatedly in the tape longitudinal direction). The arrangement pitch between the neighboring identification marks PM with two black strips is 3Pp and the arrangement pitch between the neighboring identification marks PM with one black strip is Pp or 2Pp.

Then, the base tape 101 in FIG. 28A shows an example of Pt=Pp, that is, n=1 for Pt=n×Pp, and similar to the above, one RFID circuit element To is arranged without exception between the neighboring identification marks PM, PM. From this base tape 101, the RFID label T with a length substantially same as (or not more than) the distance between the neighboring identification marks PM, PM (the arrangement pitch Pp of the identification mark PM) can be produced.

On the other hand, the base tape 101 in FIG. 28B shows an example of Pt=3Pp, that is, n=3, wherein the RFID circuit element To is arranged with a pitch three times that of the identification mark PM. As a result, as shown in FIG. 28B, the arrangement is such that in two intervals of three intervals, the RFID circuit element To is not present (blank) between the neighboring identification marks PM, PM. From this base tape 101, the RFID label T with a length substantially three times (or by a factor not less than 1 and not more than 3) the distance (=arrangement pitch Pp) between the neighboring identification marks PM, PM can be produced.

In the present variation also, it is possible to obtain the same effect as that in the second embodiment.

(2) When Mark with Three Black Strips is Used

Further, it is also possible to realize a relationship Pt=4Pp using a mark with three black strips. A relationship between the arrangement pitch Pp of the identification mark PM and the arrangement pitch Pt of the RFID circuit element To in such a variation, is shown in FIGS. 29A, 29B, and 29C (corresponding to FIG. 28A, FIG. 28B, etc.).

Figures 29A, 29B, 29C:
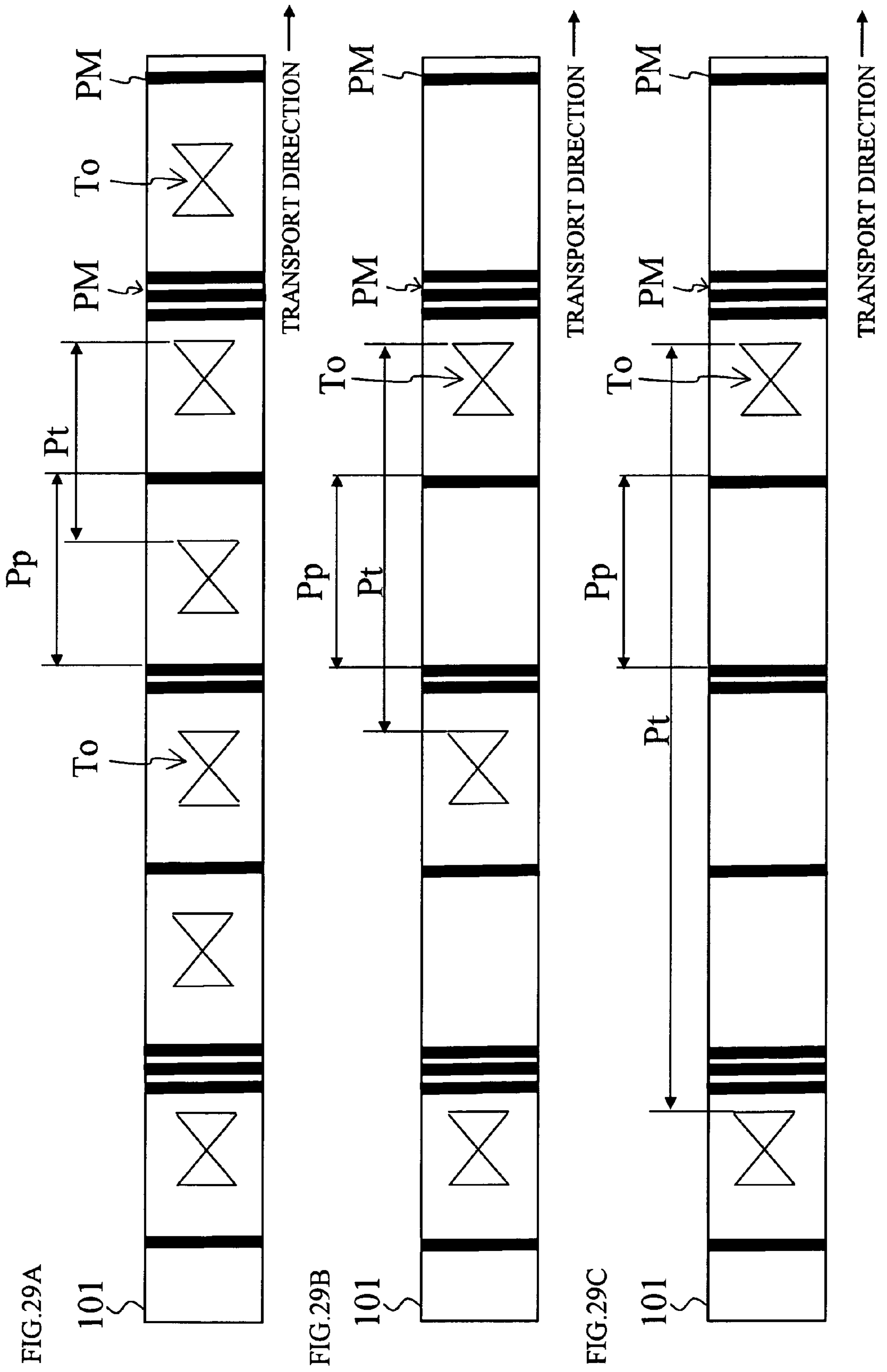
FIGS. 29A to 29C are explanatory diagrams conceptually representing a relationship between an arrangement pitch of identification mark and an arrangement pitch of RFID circuit element in a variation in which a mark with three black strips is used.

On any one of the base tapes 101 in FIG. 29A to FIG. 29C, the identification mark PM with one black strip, the identification mark PM with two black strips, and the identification mark PM with three black strips are arranged mixedly (in this example, a set of four marks, that is, one with three black strips, one with one black strip, one with two black strips, and one with one black strip, is arranged repeatedly in the tape longitudinal direction). The arrangement pitch between the neighboring identification marks PM with three black strips and between the neighboring identification marks PM with two black strips is 4Pp and the arrangement pitch between the neighboring identification marks PM with one black strip is 2Pp.

Then, the base tape 101 in FIG. 29A shows an example of Pt=Pp, that is, n=1 for Pt=n×Pp, and similar to the above, one RFID circuit element To is arranged without exception between the neighboring identification marks PM, PM. From this base tape 101, the RFID label T with a length substantially same as (or not more than) the distance between the neighboring identification marks PM, PM (the arrangement pitch Pp of the identification mark PM) can be produced.

The base tape 101 in FIG. 29B shows an example of Pt=2Pp, that is, n=2, wherein the RFID circuit element To is arranged with a pitch twice that of the identification mark PM. As a result, as shown in FIG. 29B, the arrangement is such that in two intervals of four intervals, the RFID circuit element To is not present (blank) between the neighboring identification marks PM, PM. From this base tape 101, the RFID label T with a length substantially twice (or by a factor not less than 1 and not more than 2) the distance (=arrangement pitch Pp) between the neighboring identification marks PM, PM can be produced.

The base tape 101 in FIG. 29C shows an example of Pt=4Pp, that is, n=4, wherein the RFID circuit element To is arranged with a pitch four times that of the identification mark PM. As a result, as shown in FIG. 29C, the arrangement is such that in three intervals of four intervals, the RFID circuit element To is not present (blank) between the neighboring identification marks PM, PM. From this base tape 101, the RFID label T with a length substantially four times (or by a factor not less than 1 and not more than 4) the distance (=arrangement pitch Pp) between the neighboring identification marks PM, PM can be produced.

In the present variation also, it is possible to obtain the same effect as that in the second embodiment.

(3) When Black Strip is not Provided Across the Entire Width in the Tape Width Direction.

In the second embodiment described above, both the mark with one black strip and the mark with two black strips, arranged alternately in the tape longitudinal direction, are formed (by printing etc.) across the entire width in the tape width direction, however, this is not limitative, and the mark may be provided partially in part of the area in the tape width direction. A relationship between the arrangement pitch Pp of the identification mark PM and the arrangement pitch Pt of the RFID circuit element To in such a variation, is shown in FIG. 30A and FIG. 30B (corresponding to FIG. 20A and FIG. 20B).

Figure 30A:
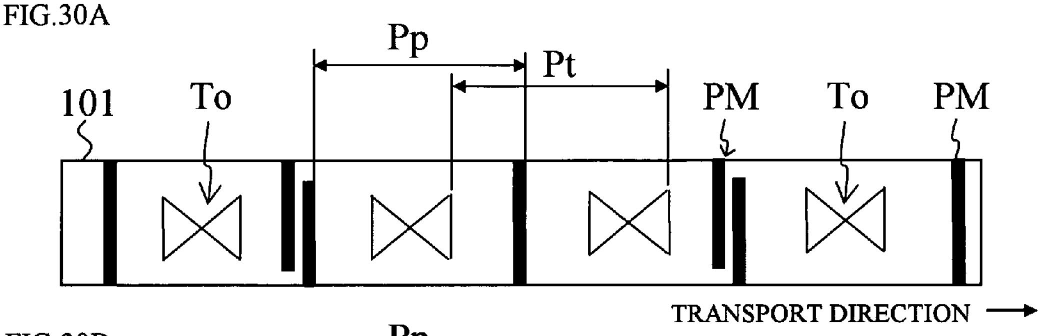
FIGS. 30A and 30B are explanatory diagrams conceptually representing a relationship between an arrangement pitch of identification mark and an arrangement pitch of RFID circuit element in a variation in which a black strip is not provided across the entire tape in the tape width direction.
Figure 30B:
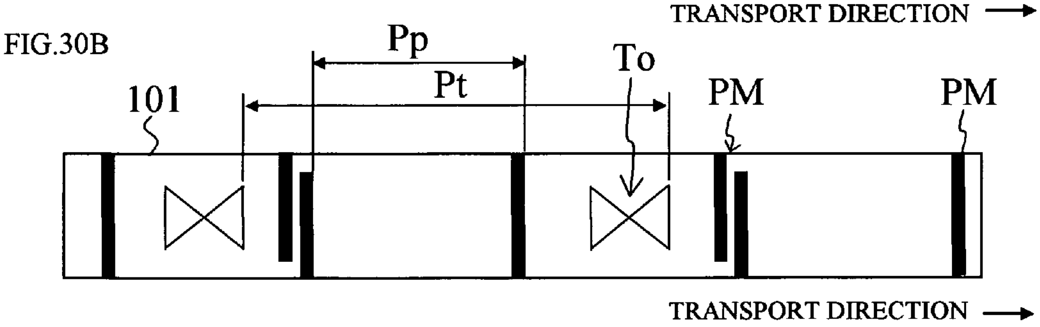

In FIG. 30A and FIG. 30B, the mark with two black strips of the identification marks PM has a form in which the end part in the tape width direction thereof is missing. In this case also, as long as the sensor 127 detects the center side of the tape in the width direction, no problem will arise because the mark is correctly recognized as a mark with two black strips. Conversely, it may also be possible for the mark with one black strip of the identification marks PM to have a form in which the end part in the tape width direction thereof is missing.

In the present variation also, it is possible to obtain the same effect as that in the second embodiment.

(4) When Two Sensor Outputs are Used for Identification Instead of the Number of Black Strips In the second embodiment and its variations described above, the marks with different numbers of black strips are arranged mixedly and identified by one mark sensor 127, and thus, the processing for setting the printing start position is performed by appropriately using the recognized marks in different forms in the flowchart shown in FIG. 25, however, this is not limitative. In other words, it may also be possible to perform the processing for setting printing start position by providing the two mark sensors 127 and appropriately using the output of each of the sensors 127, 127 while using the same number of black strips.

Figure 31A:
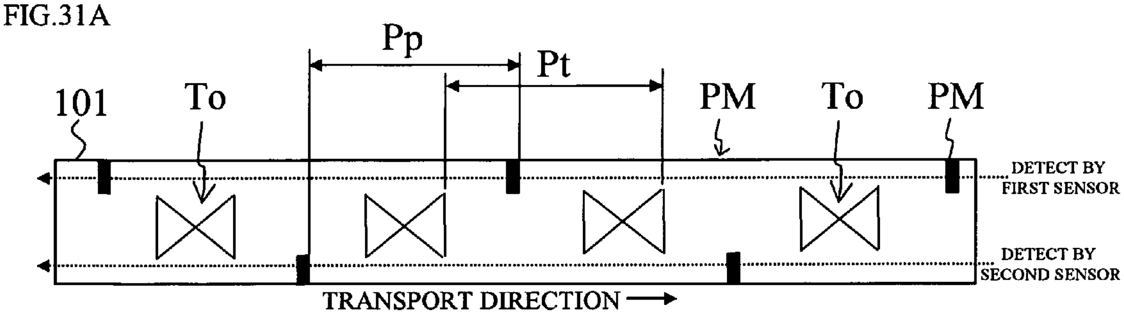
FIGS. 31A and 31B are explanatory diagrams conceptually representing a relationship between an arrangement pitch of identification mark and an arrangement pitch of RFID circuit element in a variation in which two sensor outputs are used for identification instead of the number of black strips.
Figure 31B:
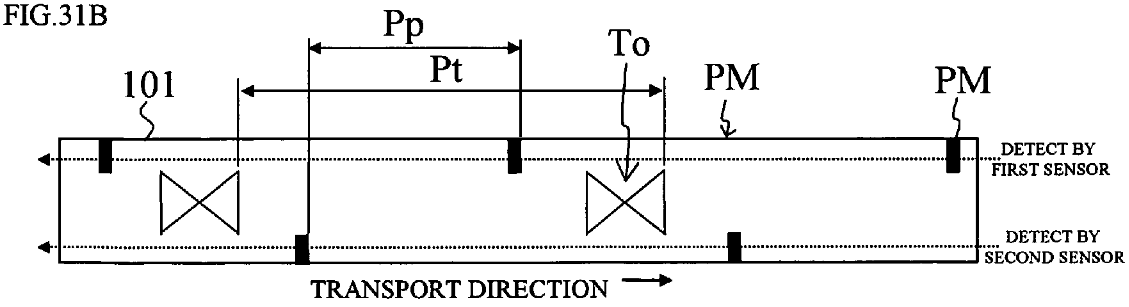

A relationship between the arrangement pitch Pp of the identification mark PM and the arrangement pitch Pt of the RFID circuit element To in such a variation, is shown in FIG. 31A and FIG. 31B (corresponding to FIG. 20A and FIG. 20B).

On both of the base tapes 101 in FIG. 31A and FIG. 31B, the mark with one black strip provided locally at the edge part on one side in the tape width direction (in this example, shown on the upper side) and the mark with one black strip provided locally at the edge part on the other side in the tape width direction (in this example, shown on the lower side) are arranged mixedly (in this example, arranged alternately in the longitudinal direction). Then, the arrangement pitch of the neighboring identification marks PM provided at the edge part on the one side in the tape width direction (shown on the upper side) is 2Pp and the identification mark PM is detected by the sensor 127 on the one side of the two mark sensors 127, 127. The arrangement pitch of the neighboring identification marks PM provided at the edge part on the other side in the tape width direction (shown on the upper side) is 2Pp and the identification mark PM is detected by the sensor 127 on the other side of the two sensors 127, 127.

Then, the base tape 101 in FIG. 31A shows an example of Pt=Pp, that is, n=1 for Pt=n×Pp, and similar to the above, one RFID circuit element To is arranged without exception between the neighboring identification mark PM (shown at the edge part on the upper side) and identification mark PM (shown at the edge part on the lower side). This base tape 101 is used to produce the RFID label T with a length substantially same as (or not more than) the distance between the neighboring identification marks PM, PM (the arrangement pitch Pp of the identification mark PM). When this base tape 101 is used, the identification mark PM is detected using both the first sensor 127 and the second sensor 127 (refer to FIG. 32, to be described later).

On the other hand, the base tape 101 in FIG. 31B shows an example of Pt=2Pp, that is, n=2, wherein the RFID circuit element To is arranged with a pitch twice that of the identification mark PM. As a result, as shown in FIG. 31B, the arrangement is such that there exist the neighboring identification marks PM, PM between which the RFID circuit element To is not present (blank). This base tape 101 is used to produce the RFID label T with a length substantially twice (or by a factor not less than 1 and not more than 2) the distance (=arrangement pitch Pp) between the neighboring identification marks PM, PM (refer to FIG. 32 to be described later).

Figure 32:
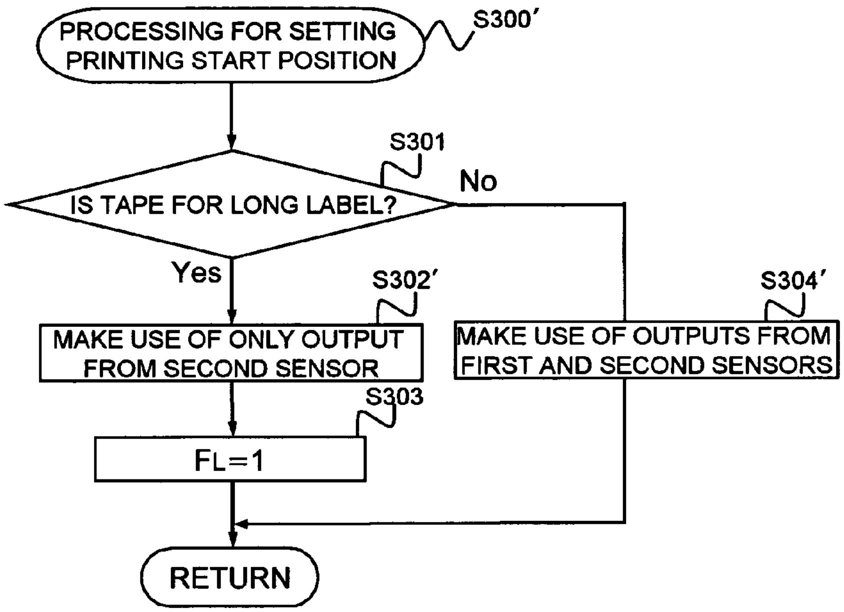
FIG. 32 is a flowchart showing a detailed procedure in step S300' executed by a control circuit.

The control circuit 110 provided in the tag label producing apparatus 1 in the present variation executes a procedure in step S300' of FIG. 32 (corresponding to FIG. 25), corresponding to step S300 described above. The FIG. 32 has the same steps as those in FIG. 25 are assigned the same symbols.

In FIG. 32, first, in step S301 similar to the above, it is determined whether or not the base tape 101 in the cartridge 7 is the one for producing the label twice the length (tape for the long label) (as shown in FIG. 31B) based on the information about the kind of tape acquired in step S1 in FIG. 24.

When it is the tape for producing the label twice the length shown in FIG. 31B, the determination of step S301 is satisfied and the procedure moves to step S302' provided instead of step S302, and the setting is made so that the identification mark PM indicative of the printing start position is recognized using only the output of the second sensor 127. Then, in step S303 similar to the above, the flag FL for twice the length is set to "1" (FL=1) and the routine is ended.

On the other hand, in step S301, when the base tape 101 is for producing the label with normal length shown in FIG. 31A, the determination is not satisfied and the procedure moves to step S304' provided instead of step S304, and the setting is made so that the identification mark PM indicative of the printing start position is recognized using both outputs from the first sensor 127 and the second sensor 127 and the routine is ended.

By making the setting as described above, in the case of the base tape 101 for producing the label with normal length shown in FIG. 31A, it is possible to carry out the corresponding control of feeding etc. while recognizing all of the identification marks PM arranged with the arrangement pitch Pp. In the case of the base tape 101 for producing the label twice the length shown in FIG. 31B, it is possible to carry out the corresponding control of feeding etc. while recognizing the identification mark PM at the edge part on the lower side in the figure arranged with the arrangement pitch 2×Pp. With the arrangement, in the present variation also, it is possible to obtain the same effect as that in the second embodiment.

(4) Extension to Normal Print Label not Equipped with RFID Circuit Element

If the technical concept of the first and second embodiments and their variations is extended, it is possible to apply it to the production of a normal print label not equipped with the RFID circuit element. In other words, this is a case where encircling cut lines (having been half cut) having a predetermined size corresponding to the label are formed in advance continuously in the tape longitudinal direction on the label base in a tape form (so-called die cut label) and when the label is used, the label part within the encircling cut line is peeled off the tape and used as a label. With the arrangement, it is possible for an operator to easily affix the label to an object to be affixed by separating the area within the encircling cut line by hand from outside. In such a case, it is possible to make uniform the identification mark of each tape by applying the techniques in the first and second embodiments and their variations when producing the label using two tapes with different arrangement pitches of the encircling cut line. Such a variation will be described below.

Figure 33:
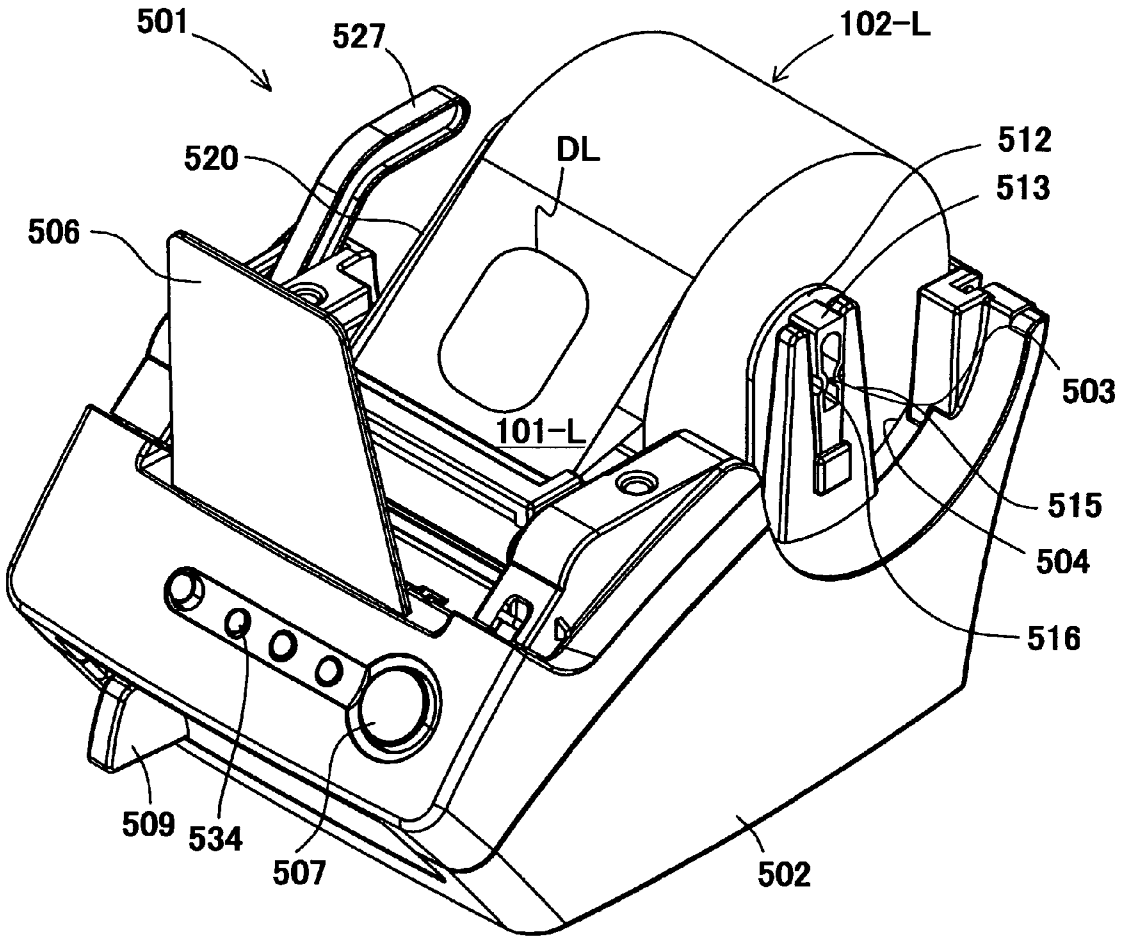
FIG. 33 is a perspective view showing a general configuration of a tag label producing apparatus in a variation in which extension is made to a normal print label not including an RFID circuit element.

In FIG. 33, the tag label producing apparatus 501 has a housing 502, a tray 506 made of, for example a transparent resin, a power source button 507, a cutter lever 509, an LED lamp 534, a tape holder accommodating part 504, and a print head advance/retreat lever 527, and a tape holder 503 is accommodated and arranged in the tape holder accommodating part 504.

The tape holder 503 mounts a base tape roll body 102-L rotatably and detachably between a positioning hold member 512 and a guide member 520. The tape holder 503 and the base tape roll body 102-L constitute a detachable cartridge. As will be described later, to the tape holder accommodating part 504, a plurality of kinds of cartridge (the tape holder 503 and the base tape roll body 102-L. Hereinafter, referred to as "cartridge 503 etc.") can be mounted.

The tape holder accommodating part 504 that functions as a cartridge holder is provided with the same cartridge sensor CS (refer to FIG. 8 described earlier) as that in the first and second embodiments in order to detect which of the kinds of cartridge 503 etc. is mounted (=cartridge information).

In the present variation also, as in the above, instead of the cartridge sensor CS, a detection target part provided appropriately on the side of cartridge 503 etc. may be detected mechanically using a mechanical switch of contact type etc., or another optical or magnetic detection target part may be provided for optical or magnetic detection. Due to the signal (the detection signal that has detected the detection target part) from the cartridge sensor CS, it is possible to acquire the cartridge information (that is, information about the kind of tape, such as the interval of arrangement of the encircling cut lines DL in a base tape 101-L) of the cartridge 503 etc. mounted to the tape holder accommodation part 504, as in the above.

The base tape roll body 102-L is configured by winding the base tape 101-L (including the encircling cut line DL with a predetermined arrangement pitch, refer to FIG. 35A and FIG. 35B, to be described later) with a predetermined width as a label tape.

Although not shown schematically, the base tape 101-L has a laminated structure of a plurality of layers (three layers in this example) similar to the base tape 101 described above, in which a base layer 101*a*-L made of a proper material, an adhesive layer 101*b*-L made of a proper adhesive material, and a separation sheet 101*c*-L are laminated in this order from the side to be wound outside the roll body 102-L toward the opposite side thereof.

As described above, the base layer 101*a*-L is provided with the encircling cut line DL that surrounds the predetermined area. The encircling cut line DL is formed in advance as a so-called half cut line, along which the base layer 101*a*-L and the adhesive layer 101*b*-L are cut, while the separation sheet 101*c*-L is not cut.

The separation sheet 101*c*-L is designed, similar to the separation sheet 101*d*, so that when the finally completed label L is affixed to a predetermined commodity etc., it can be bonded to the commodity etc. by the adhesive layer 101*b*-L by peeling off the separation sheet 101*c*-L. On the surface of the separation sheet 101*b*-L, similar to the above, the predetermined identification mark (in this example, a black-painted identification mark) PM for feeding control is provided (by printing, in this example) in advance at a predetermined position corresponding to the position of the encircling cut line DL. Instead of using the identification mark, it may also be possible to bore a hole that penetrates through the base tape 101-L by laser machining etc., or provide a machined hole by Thompson mold.

At the edge part of the tape holder accommodating part 504, the holder support member 15 including a positioning groove part 516 is provided. The tape holder 503 is inserted into the holder support member 15 by an attachment member 513 of the positioning hold member 512 coming into close contact with the inside of the positioning groove part 516.

Figure 34:
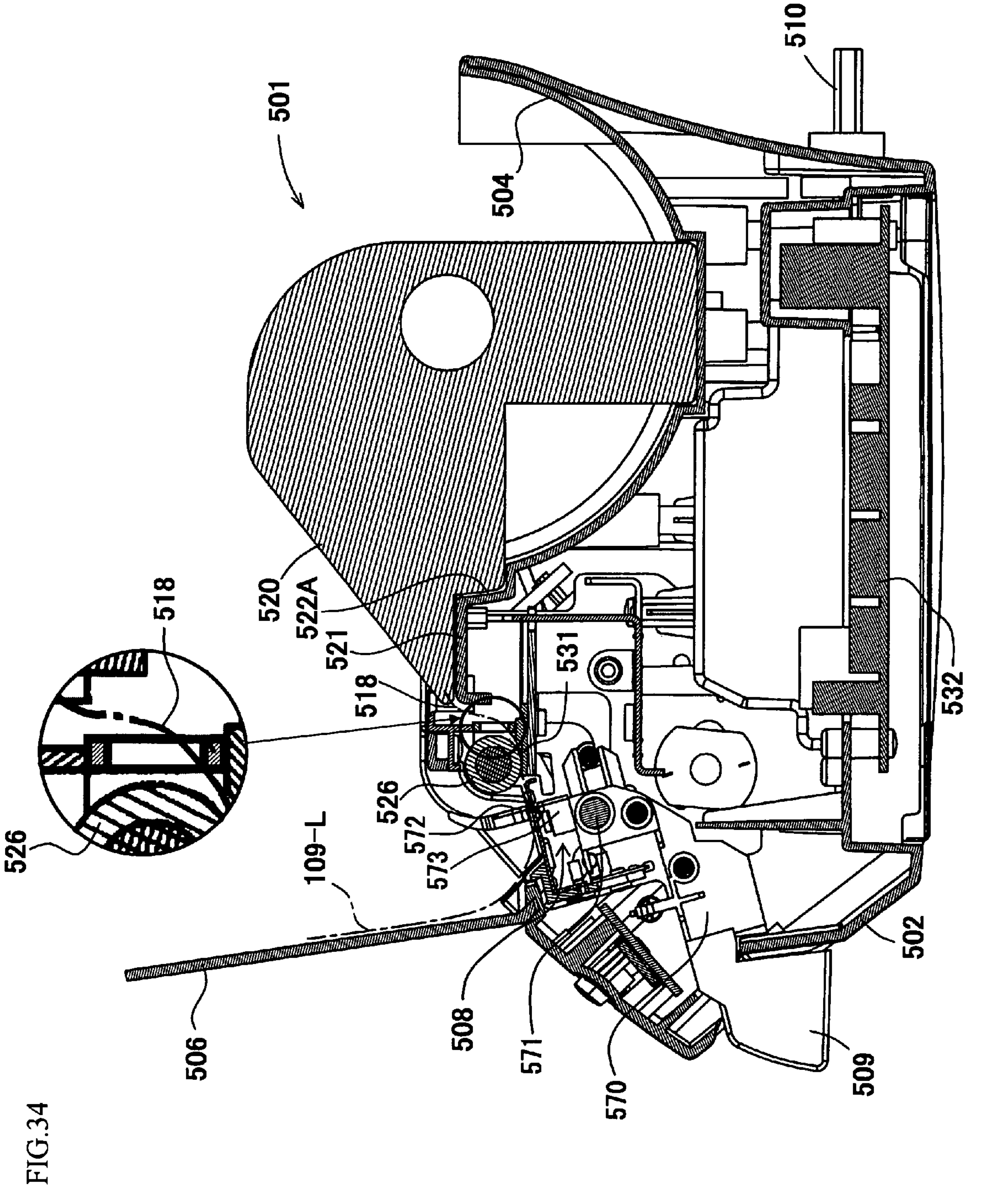
FIG. 34 is a transverse section view showing a state in which a base tape roll body has been removed from the label producing apparatus shown in FIG. 33.

As shown in FIG. 34, the top end part of the guide member 520 constituting the tape holder 503 is placed on a mounting part 521 and the top end part of the guide member 520 is extended up to an insertion inlet 518 through which the base tape 101-L is inserted. Part of the part that comes into contact with the mounting part 521 of the guide member 520 is inserted into a positioning groove part 522A from above.

At the lower part on the upstream side in the transport direction of the base tape 101-L of a cutter unit 508, a print head 531 for printing is provided. At the position in opposition to the print head 531 with the transport path of the base tape 101-L being sandwiched in between, a platen roller 526 is provided.

Then, while an end of the base tape 101-L is being sandwiched between the print head 531 and the platen roller 526, the platen roller 526 is rotatably driven by the drive of a motor, not shown, and the drive of the print head 531 is controlled via a printing driving circuit, not shown, and thereby, predetermined print data can be printed on the print surface while the base tape 101-L is being transported.

At a proper position (for example, near the platen roller 526) in the tape transport path by the platen roller 526, the same mark sensor 127 (not shown in this figure) as that in the above, which detects the same identification mark PM (for details, refer to FIG. 35 etc., to be described later) as that in the above provided in the base tape 101-L (tag label tape 109-L with print), is provided.

The cutter lever 509 is provided with the cutter unit 508 via a connection member 570. The cutter unit 508 has a cutter (cutting blade) 572 movably arranged by a guide shaft 571 and an intermediate member 573. As described above, the label tape 109-L with print (constituting label media together with the base tape 101-L), for which printing has been completed and which is discharged onto the tray 506, is cut by the cutter unit 508 by manually operating the cutter lever 509 and thus the label L with print is produced.

At the lower part of the housing 502, there is provided a control substrate 32 on which the control circuit 110 (not shown, the same as that in the first and second embodiments) that controls the drive of each mechanical part based on the instructions from an external personal computer etc. is formed, and to the rear side of the housing 502, a power source cord 510 is connected. In addition, the control circuit 110 is connected to the wired or wireless communication line NW shown in FIG. 1 in the first and second embodiments via an input/output interface, not shown, and further connected to the route server RS, the plurality of information servers IS, the terminal 118*a*, and the general-purpose computer 118*b* via the communication line NW, in the same manner as that shown in FIG. 1.

Figure 35A:
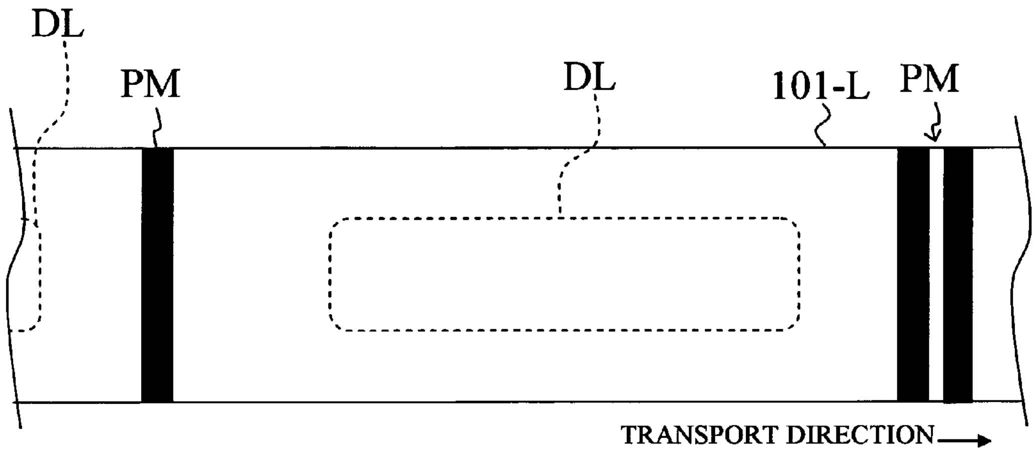
FIGS. 35A and 35B are conceptual fragmentary diagrams showing a state in which the base tape fed out from the base tape roll body provided in the label producing apparatus in the present variation is viewed from the backside (that is, viewed from the side of the separation sheet described above).
Figure 35B:
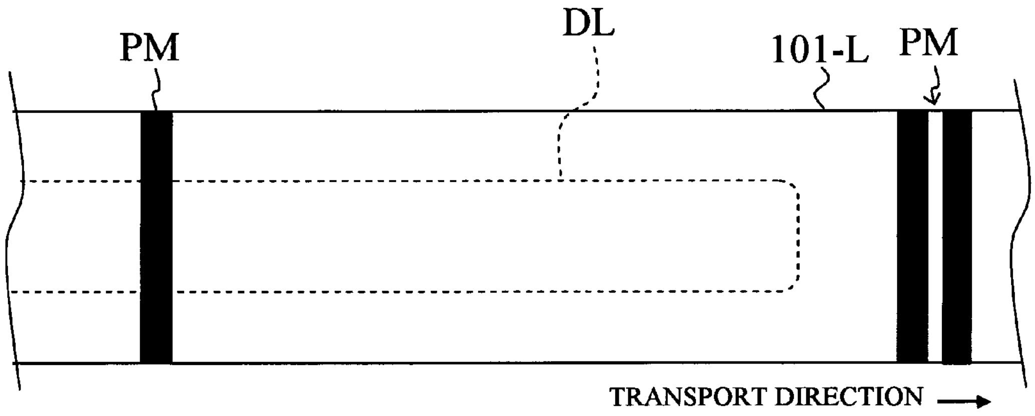

The base tape in the present variation viewed from the backside is shown in FIG. 35A and FIG. 35B (corresponding to FIG. 6A and FIG. 6B). The relationship between the arrangement pitch of the identification mark PM and the arrangement pitch of the encircling cut line DL shown in FIG. 35A and FIG. 35B, is shown in FIG. 36A and FIG. 36B (corresponding to FIG. 7A and FIG. 7B).

Figure 36A:
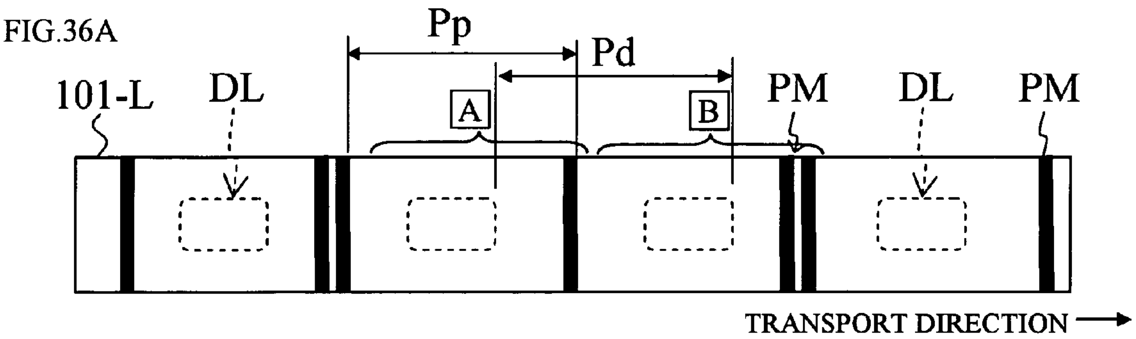
FIGS. 36A and 36B are explanatory diagrams schematically representing a relationship between an arrangement pitch of identification mark and an arrangement pitch of encircling cut line.
Figure 36B:
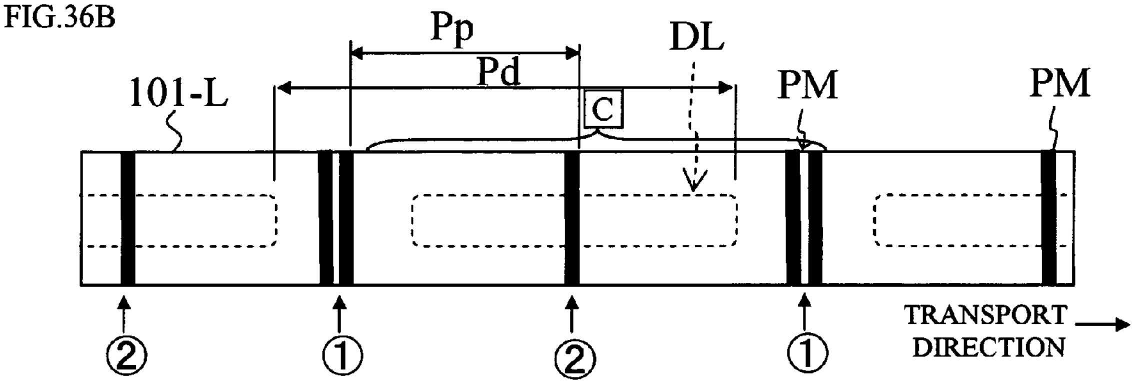

On both the base tape 101-L in FIG. 35A and FIG. 36A and the base tape 101-L in FIG. 35B and FIG. 36B, similar to the second embodiment, an identification mark PM with two black strips and an identification mark PM with one black strip (instead of making the numbers of strips different, it may also be possible to change the form of the whole mark, or the length (=dimension in the tape width direction), width (=dimension in the tape longitudinal direction), color, etc., of the mark element, and further, different graphic shapes (circle, triangle, etc.) may be used) are arranged mixedly (in this example, alternately arranged in the tape longitudinal direction). As is the same as the above, the arrangement pitch Pp of the identification mark PM is Pp and an arrangement pitch Pd of the encircling cut line DL holds the relationship Pd=n×Pp (n: integer equal to 1 or more). The arrangement pitch between the marks of the identification mark PM with two black strips is 2Pp and the arrangement pitch between the marks of the identification mark PM with one black strip is also 2Pp.

The base tape 101-L in FIG. 35A and FIG. 36A is an example, in which n=1, then Pd=Pp, that is, one encircling cut line DL is arranged without exception between the neighboring identification marks PM, PM. The base tape 101-L is used to produce the label L having substantially the length same as (or not more than) the distance between the neighboring identification marks PM, PM (the arrangement pitch Pp of the identification mark PM) (refer to FIG. 37A and FIG. 37B, and FIG. 38A and FIG. 38B, to be described later).

On the other hand, the base tape 101-L in FIG. 35B and FIG. 36B is an example, in which n=2, then Pd=2Pp, that is, the encircling cut line DL is arranged with the pitch twice that of the identification mark PM and the length of each encircling cut line DL in the direction of tape is longer than that of the base tape 101-L in FIG. 35B and FIG. 36B. As a result, as shown in FIG. 36B, in this arrangement, one encircling cut line DL is extended up to its opposite side beyond the identification mark PM (in this example, the mark with one black strip). This base tape 101-L is used to produce the label L having a length substantially twice the distance (arrangement pitch Pp) between the neighboring identification marks PM, PM (or by a factor not less than 1 and not more than 2) (refer to FIG. 37A and FIG. 37B, to be described later).

As described above, in the present variation also, it is possible to use the base tapes 101-L of a plurality of kinds having a plurality of correlations according to the value of n, as in the second embodiment, and in the above examples, the cases of n=1 and n=2 are shown illustratively.

Figure 37A:
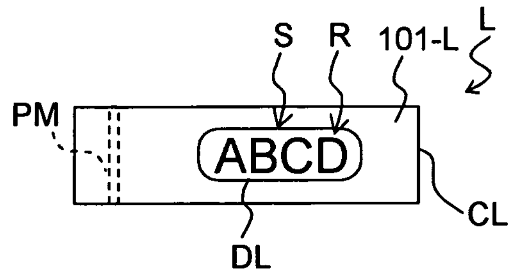
FIGS. 37A and 37B are diagrams showing an example of an outside appearance of a produced label produced by completing the cutting of the label tape with print by the label producing apparatus.
Figure 37B:
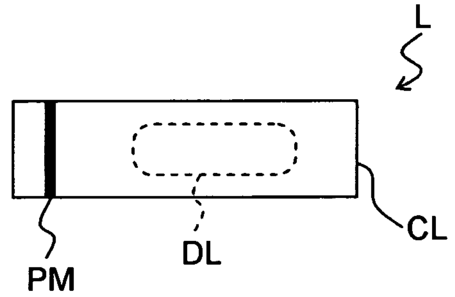

An example of the outside appearance of the label L produced by completing the cutting of the label tape 109-L with print as described above by the label producing apparatus 501 in the present variation is shown in FIG. 37A (corresponding to FIG. 10A) and FIG. 37B (corresponding to FIG. 10B). This example shows the label L produced using the base tape 101-L (in detail, the part shown by (A) in the figure) shown in FIG. 35A and FIG. 36A and having substantially the same length as the arrangement pitch Pp of the identification mark PM.

In the print area S (printable maximum length) on the surface of the base layer 101*a*-L, the label print R (in this example, letters "ABCD") comparatively small in the number of letters is printed by the print head 531.

Figure 38A:
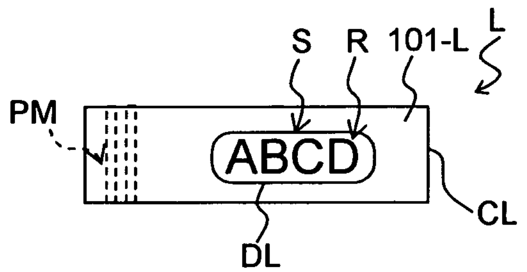
FIGS. 38A and 38B are diagrams showing another example of an outside appearance of a produced label.
Figure 38B:
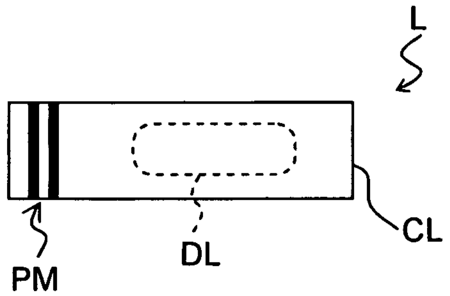

Similarly, another example of an outside of the label L is shown in FIG. 38A and FIG. 38B. The label L is produced by using the base tape 101-L (in detail, the part shown by (B) in the figure) shown in FIG. 35A and FIG. 36A. FIGS. 37A and 37B are different from FIGS. 38A and 38B only in that the identification mark PM in the former figures is composed of the mark with one black strip, while the identification mark PM in the latter figures is composed of the mark with two black strips.

Figure 39A:
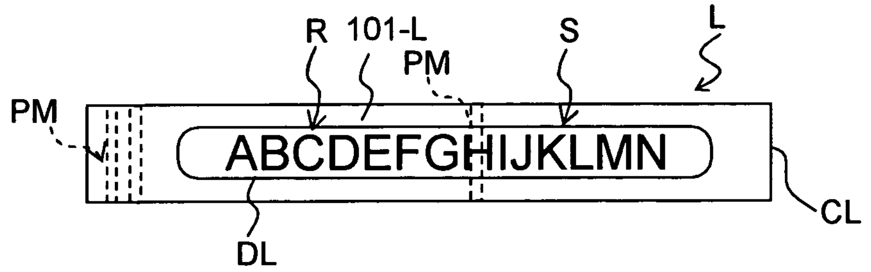
FIGS. 39A to 39C are diagrams showing another example of an outside appearance of a produced label.
Figure 39B:
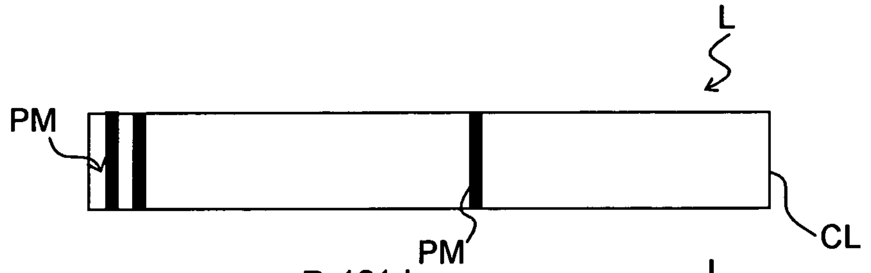

Another example of the outside appearance of the label L produced by the label producing apparatus 501, is shown in FIG. 39A and FIG. 39B. This example shows the label L produced using the base tape 101-L shown in FIG. 35B and FIG. 36B and having the length substantially twice that of the arrangement pitch Pp of the identification mark PM, wherein FIG. 39A is its top view (corresponding to FIG. 12A in the first embodiment) and FIG. 39B is its bottom view (corresponding to FIG. 12B in the first embodiment). In this case, the print area S (printable maximum length) on the surface of the base layer 101*a*-L is longer than the structure shown in FIG. 37A and FIG. 38A and the label print R (in the example, letters "ABCDEFGHIJKLMN") comparatively large in the number of letters is printed. It may also be possible for an operator to produce the label L about twice the length compared to that in FIG. 38A by using the base tape 101-L shown in FIG. 35B and FIG. 36B in order to increase in size each letter of the print.

Figure 40:
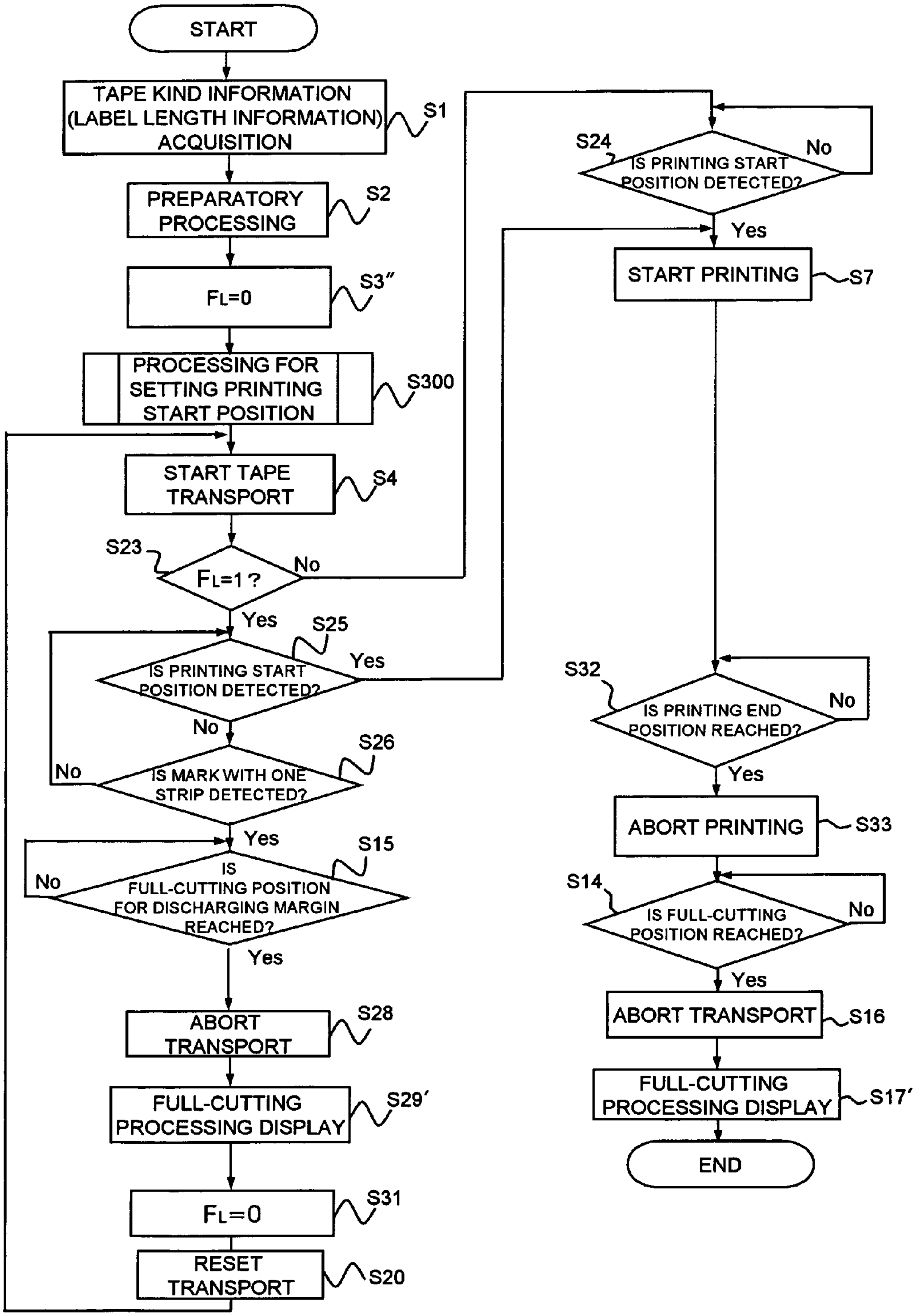
FIG. 40 is a flowchart showing a control procedure executed by a control circuit.

A control procedure executed by the control circuit 110 provided in the label producing apparatus 501 in the present variation, is shown in FIG. 40 (corresponding to FIG. 13). The same steps as those in FIG. 13 are assigned the same symbols.

In FIG. 40, similar to the above, the flowchart is started when the predetermined label production operation is performed by the label producing apparatus 501 via the PC 118.

First, as in the first embodiment, in step S1, based on the detection signal of the cartridge sensor CS, information about the kind of tape of the corresponding base tape 101-L (in the above examples, whether the base tape 101-L is for producing a label having the normal length shown in FIG. 35A and FIG. 36A, or whether for producing a label having twice the length shown in FIG. 35B and FIG. 36B, that is, information about the length of the label) is acquired.

After that, the procedure moves to step S2 and the preparatory processing similar to that in the above is executed. In other words, the operation signal from the PC 118 (via the communication line NW and the input/output interface) is input and the settings of the print data, full-cutting position (position of the full cut line CL), the printing end position, etc., are made based on the operation signal. At this time, the full-cutting position is determined uniquely and fixedly for each kind of the cartridge (that is, for each kind of the base tape 101-L) based on the cartridge information and set so that it does not overlap the position of the encircling cut line DL.

Next, in step S3" corresponding to step 3, the setting of initialization is carried out. In the present variation, the flag FL for twice the length (long label) indicative of the base tape 101-L for producing the long label twice the length shown in FIG. 35B and FIG. 36B are initialized to "0".

After that, the procedure moves to step S300, similar to the above, and the setting of the printing start position is made based on the information about the length and kind of tape acquired in step S1. The detailed procedure of the setting is the same as that described earlier using FIG. 25. In other words, the setting is made about whether the printing by the print head 531 is started when the mark with one black strip is detected, or when the mark with two black strips is detected, or when both are detected by the sensor 127.

After that, the procedure moves to step S4 and the tape transport is started as in the above. In other words, a control signal is output via the input/output interface and the platen roller 526 is rotatably driven by the driving force of a motor, not shown. Whereby, the base tape 101-L is fed out from the base tape roll body 102-L and formed as the label tape 109-L with print (after the printing by the print head 531, to be described later) and transported in the direction toward the outside of the label producing apparatus 501.

After step S4, the procedure moves to step S23, similar to the above, and whether or not FL=1 is determined. When the base tape 101-L is the one for producing the label with the normal length shown in FIG. 35A and FIG. 36A, FL=0, and therefore, the determination is not satisfied and the procedure moves to step S24, similar to the above. In step S24, it is determined whether or not the printing start position (when either the mark with one black strip or the mark with two black strips is detected, in this case, because FL=0. Refer to step S304 in FIG. 25.) is detected by the sensor 127 and when detected, the procedure moves to step S7, similar to the above.

On the other hand, in step S23, when the base tape 101-L is the one for producing the label twice the length shown in FIG. 35B and FIG. 36B, the determination is satisfied because FL=1, and then the procedure moves to step S25, as in the above. In step S25, it is determined whether or not the printing start position (when the mark with two black strips is detected, in this case, because FL=1. Refer to step S302 in FIG. 25.) is detected by the sensor 127 and when detected, the procedure moves to step S7.

In step S7, as in the above, a control signal is output to the print-head driving circuit via the input/output interface to energize the print head 531 and thus the printing of the label print R, such as letters, symbols, bar code, etc., corresponding to the print data for the label L acquired in step S2, is started in the print area S of the base layer 101*a*-L of the base tape 101-L.

After that, in step S32, newly provided, it is determined whether or not the label tape 109-L with print has been transported to the printing end position set in step S1. At this time, the determination is made by, for example, detecting the distance of transport after the identification mark PM is detected in step S24 using a predetermined publicly-known method (by counting the number of pulses output to the pulse motor that drives the platen roller 526.). The determination is not satisfied until the printing end position is reached and the procedure is repeated, and when the position is reached, the determination is satisfied and the procedure moves to the next step S33.

In step S33, as in step S102 (refer to FIG. 14) described above, the supply of current to the print head 531 via the print-head driving circuit is stopped and the printing of the label print R is stopped (aborted).

As described above, after step S33 is completed, the procedure moves to step S14, as in the above. In step S14, it is determined whether or not the label tape 109-L with print has been transported to the full-cutting position of the distal end part of the label L set in the previous step S2 (the position in the transport direction at which the cutting blade 572 of the cutter unit 508 directly opposes the position of the full cut line CL at the distal end of the label L). At this time also, it is sufficient to make the determination by counting the number of pulses output to the pulse motor etc. as in the above. Until the full-cutting position is reached, the determination is not satisfied and the procedure is repeated, and when the position is reached, the determination is satisfied and the procedure moves to step S16, similar to the above.

In step S16, a control signal is output via the input/output interface to stop the rotational drive of the platen roller 526 and stop the transport of the label tape 109-L with print. Whereby, in a state in which the cutting blade 572 of the cutter unit 508 directly opposes the cut line CL set in step S2, the transport of the base tape 101-L from the base tape roll body 102-L and the transport of the label tape 109-L with print are stopped.

After that, in step S171 provided in place of the previous step S17, a control signal is output to a display means (for example, LED etc.) provided at an appropriate portion and the fact that the full-cutting position has been reached is displayed to prompt an operator to cut the tape by manually operating the cutter lever 509. In response to the display, the operator manually operates the cutter lever 509 to perform the full-cutting processing for forming the cut line CL by cutting (dividing) the label tape 109-L with print. By this division, the top end side of the label tape 109-L with print is cut off from the rest and the cut-off part, which is the label T, is discharged to the outside of the label producing apparatus 501 and the flowchart is completed.

On the other hand, in step S25, when the printing start position (when the mark with two black strips is detected) is not detected by the sensor 127, the determination is not satisfied and the procedure moves to step S26, similar to the above.

In step S26, it is determined whether or not the mark with one black strip is detected by the sensor 127. When detected, the procedure moves to step S15, similar to the above, and when not detected, the determination is not satisfied and the procedure returns to step S25 and the same procedure is repeated. In other words, when the determination in step S23 is satisfied, step S25 and step S26 are repeated in such an order of step S25→step S26→step S25,→step S26→ . . . , and when the mark with two black strips is detected first, the procedure moves to step S7 and when the mark with one black strip is detected first, the procedure moves to step S15.

In step S15, as in the above, it is determined whether or not the margin discharging full-cutting position, which is different from that in step S14, has been reached. In step S15, it is determined whether or not the full-cutting position has been reached in order to discharge the area corresponding to the interval from the identification mark PM of (2) to the identification mark PM of (1) that follows (the area of transport until the identification mark PM of (1) is detected after the identification mark PM of (2) is detected by the sensor 127) as a margin (excess area) when the identification mark PM indicated by (2) in FIG. 36B is detected in step S26 on the assumption that the encircling cut line DL is always arranged between the mark with two black strips and the mark with two black strips while crossing over the mark with one black strip (refer to FIG. 39A and FIG. 39C) when the label L twice the length is produced using the base tape 101-L in FIG. 35B and FIG. 36B (the base tape 101-L is identified to be the one shown in FIG. 35B and FIG. 36B by the information about the kind of tape acquired in step S1, and the length of the part to be cut and discharged as a margin is determined and the full-cutting-position is set in accordance with the setting of position of the cut line CL in the preparatory processing in the subsequent step S2). At this time also, it is sufficient to make the determination by, for example, counting the number of pulses output to the pulse motor, as in the above. Until the margin discharging full-cutting position is reached, the determination is not satisfied, and the procedure is repeated and when the position is reached, the determination is satisfied and the procedure moves to step S28, similar to the above.

After that, step S28 and step S29 are substantially the same as step S16 and step S17 described in the present variation. In other words, in step S28, the rotation of the platen roller 526 is stopped and the transport of the label tape 109-L with print is stopped, and in step S29, the fact that the full-cutting position has been reached is displayed to prompt an operator to cut the tape manually. Due to this cutting, the produced margin part is discharged to the outside of the label producing apparatus 501.

Figure 39C:
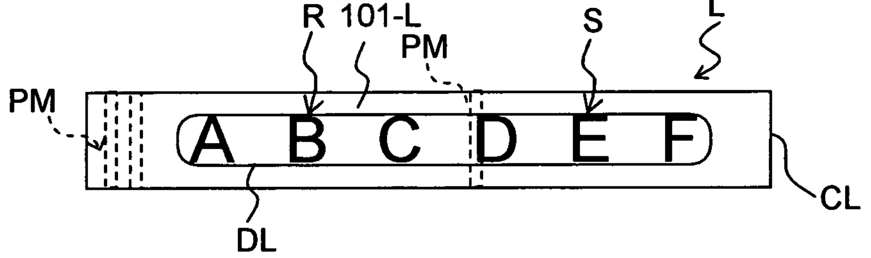

After that, in step S31, similar to the above, the flag FL is set to "0" (FL=1) and in step S20, the reference value on which the determination of the distance in the transport direction is based is initialized (reset), as in the above, and then the procedure returns to step S4 and the same procedure is repeated. With the arrangement, when the label T twice the length is produced using the base tape 101-L in FIG. 35B and FIG. 36B, the area corresponding to the interval from the identification mark PM of (2) to the subsequent identification mark PM of (1) is discharged as a margin. Whereby, it is possible to produce without fail the label L twice the length as shown in FIG. 39A to FIG. 39C.

In the variation configured as described above, the identification mark PM is arranged with the predetermined pitch Pp in the plurality of portions in the longitudinal direction of the base tape 101-L in the cartridge 503 etc. At this time, the identification marks PM include the plurality of kinds of mark having different forms, that is, the identification mark PM formed by two black strips and the identification mark PM formed by one black strip. Then, in the present variation, when the labels L of a variety of lengths are produced using the base tape 101-L (in this example, the cartridge 503 etc. is replaced), among the identification marks PM detected by the sensor 127 during the transport of the tape, the identification marks PM of different forms are distinguished, that is, the identification mark PM formed by two black strips is distinguished from the identification mark PM formed by one black strip in step S25, step S26, and step S24 (based on the setting in step S300), and by using them appropriately according to the label L with a length of label to be produced, the control of feeding and positioning for printing on the tape, cutting, etc., is carried out smoothly (the margin part discharging control to step S15, the control of printing etc. after step S7).

As described above, by adopting a method in which a plurality of kinds of the identification mark PM of different forms is prepared and they are distinguished from one another when used, it is possible to make uniform all of the pitches Pp of the identification mark PM to be provided on the base tapes even if the plurality of kinds of the base tape 101-L with different array regularities of the encircling cut line DL (cut line regularity) are present in order to produce the labels L with a variety of lengths (in this example, the tape for producing the label with the normal length in FIG. 35A and FIG. 36A and the tape for producing the label with twice the length in FIG. 35B and FIG. 36B). As a result, the facilities for forming the identification mark PM on the base tape 101 will suffice if only equipped with a function of forming the identification mark with the pitch 2Pp of a single pattern for the identification mark PM with two black strips, and similarly, for the identification mark PM with one black strip also, the facilities will suffice if only equipped with a function of forming the identification mark with the pitch 2Pp of a single pattern. In other words, it is no longer necessary to change the pitches of all of the identification marks PM for each kind of tape (as in the above, it is no longer necessary to prepare a plurality of molds/plates, etc. for printing, for formation by printing) and therefore, it is possible to simplify the structure and control of the facilities. As a result, the manufacturing cost of the base tape 101-L can be reduced.

In the present variation, in particular, the encircling cut line DL is formed based on the cut line regularity having a predetermined correlation with the pitch Pp of the identification mark PM and the array regularity is acquired based on the detection result by the cartridge sensor CS in step S1 as correlation information between the arrangement pitch Pp of the identification mark PM and the arrangement pitch Pt of the RFID circuit element To recorded in the detection target part of each cartridge 503 etc. With the arrangement, when producing a relatively long label L using the encircling cut line DL arranged with the pitch 2Pp on the base tape 101-L for producing the label twice the length, it is possible to carry out the control of feeding etc. on the basis of only the identified identification mark PM with two black strips based on the setting in step S300 (step S7 to step S17' etc.). When producing a relatively short label L using the encircling cut line DL arranged with the short pitch Pp on the base tape 110-L for producing the label with normal length, it is possible to carry out the control of feeding etc. on the basis of both the identified identification mark PM with one black strip and the identified identification mark PM with two black strips based on the setting in step S300 (step S7 to step S17' etc.).

In the present variation, in response to the above, when producing a relatively long label L using the base tape 101 for producing a label twice the length, it is determined whether or not the identification mark PM with one black strip has been detected in step S26. With the arrangement, it is possible to carry out the corresponding control of printing etc., (in this example, the control to newly produce the label after discharging the margin part) even when the transport is started from interval in which the encircling cut line is not present immediately after the label production is started.

Then, when the identification mark PM with one black strip is detected as described above, the interval until the identification mark PM with two black strips is detected is cut and discharged by the operator (step S15, step S28, step S29'), and thereby, the label is produced without fail after the interval in which the identification mark PM with two black strips is detected is reached in step S7 and subsequent steps. As a result, regardless of the length of the produced label L (that is, regardless of whether the base tape 101-L for producing the label twice the length is used or the base tape 101-L for producing the label with normal length is used), it is possible to produce the label L without fail that always includes the whole of the encircling cut line DL (without missing part) regardless of the length of the produced label L as shown in FIGS. 37A and 37B, FIGS. 38A and 38B, and FIGS. 39A to 39C.

In the present variation also, as in the first embodiment, when the label L is produced, the transport is controlled so that operator does not cut the tape with the cutter unit 508 without cutting the encircling cut line DL. With the arrangement, it is possible to prevent the label from being disabled to function as a label by erroneously cutting the encircling cut line DL at the time of cutting of the tape at the cut line CL. In particular, by setting the minimum value of the length in the transport direction of the produced label L at least equal to the arrangement pitch Pp between the identification marks PM (so that the label length≧Pp), it is possible at least to prevent without fail the encircling cut line DL from being erroneously cut because the position of the cut line CL is too close to the identification mark PM (that is, the tag label length is too short).

(5) Others

In the first embodiment and its variation, and the second embodiment and its variations (1) to (3), the cases are described as an example, where the length of the print letters is sufficiently long and the position in the transport direction (transport timing) when printing by the print head 23 is completed is nearer to the downstream side in the transport direction than the position in the transport direction (transport timing) when the communication by the antenna LC is completed, however, these are not limitative. When the length of the print letters is short, the position in the transport direction (transport timing) when printing by the print head 23 is completed may be nearer to the upstream side in the transport direction than the position in the transport direction (transport timing) when the communication by the antenna LC is completed. Alternatively, it may also be possible to automatically increase in size the print font so that the position in the transport direction when printing is completed is nearer to the downstream side in the transport direction than the position in the transport direction when communication is completed.

In the first embodiment and its variation, and the second embodiment and its variations (1) to (3), the cases are described as an example, where the base tape 101 (label tape 109 with print) etc. is stopped at the predetermined position and the reading/writing is carried out, however, these are not limitative. In other words, it may also be possible to carry out writing/reading of RFID tag information to/from the RFID circuit element for the base tape 101 (label tape 109 with print) that is moving.

In the first embodiment and its variation, and the second embodiment and its variations (1) to (3), the method is adopted, in which the print is made on the cover film 103 separate from the base tape 101 including the RFID circuit element To and these are bonded to each other, however, this is not limitative and the present disclosure may be applied to a method in which the print is made on the print-receiving tape layer provided on the tag tape (a method in which bonding is not carried out). Further, the present disclosure is not limited to those in which reading/writing of RFID tag information from/to the IC circuit part 151 of the RFID circuit element To is carried out and at the same time, the printing for identifying the RFID circuit element To by the print head 23 is carried out. The printing does not need to be carried out necessarily and the present disclosure can be applied to those in which only the reading/writing of RFID tag information is carried out.

Furthermore, in the first embodiment and its variation, and the second embodiment and its variations (1) to (3), the cases are described as an example, where the tag tape is wound around the reel member to configure the roll and the roll is arranged in a cartridge 100 and the tag tap is fed out therefrom, however, these are not limitative. For example, it may also be possible to produce the tag label by stacking an elongated, flat sheet-like, or strip-like tape or sheet (including those formed by cutting a tape wound around a roll into an appropriate length after it is fed out) in a predetermined accommodating part (for example, stacking flat and laminating into a tray-like shape) to form a cartridge, mounting the cartridge in the cartridge holder on the side of the tag label producing apparatus 1, and carrying out the transfer or transport from the accommodating part, printing, and writing. Further, there can be thought a configuration in which the roll is mounted directly and detachably on the side of the tag label producing apparatus 1 or a configuration in which an elongated, flat sheet-like or strip-like tape or sheet is transferred and supplied one by one into the tag label producing apparatus 1 from outside by a predetermined transport mechanism, and moreover, it can also be thought to provide the first roll 102 that cannot be detached as, for example, a so-called stationary type or integration type, to the side of the tag label producing apparatus 1, not limited to those detachable with respect to the apparatus 1 side, such as the cartridge 100. In this case also, the same effect can be obtained.

In addition to those already described above, the techniques in the above embodiments and respective variations may be combined appropriately for use.

Although not shown above for each, the present disclosure may be embodied within the scope not departing from its gist with various modifications being added.

What is claimed is:

1. A label tape for producing a label to be affixed to an object comprising:

a plurality of first detection target marks having a first print form;

a plurality of second detection target marks having a second form different from said first form;

a plurality of sections arranged along a longitudinal direction of the label tape; and a plurality of RFID circuit elements having an IC circuit part that stores information and an antenna that performs transmission/reception of information, respectively; wherein said first detection target marks and said second detection target marks are arranged alternately one by one with a fixed pitch, said sections are divided with each other by one of said first detection target marks and said second, detection target marks such that no other of the one of said first detection target marks and said second detection marks occur in each respective section; and a single one of said RFID circuit elements: is:

(i) located on every two sections; or (ii) located on every three sections.

2. The label tape according to claim 1, wherein:

said second detection target marks are formed so that at least a part of each second detection mark is arranged in an area shared with said first detection target marks in a tape width direction.

3. A label tape for producing a label to be affixed to an object comprising:

a plurality of first detection target marks having a first print form;

a plurality of second detection target marks having a second form different from said first form;

a plurality of sections arranged along a longitudinal direction of the label tape; and a plurality of encircling cut lines in order to cut off an area to be affixed to said object to be affixed as a label; wherein said first detector target marks and said second detection target marks are arranged alternately one by one with a fixed pitch, said sections are divided with each other by one of said first detection target marks and said second detection target marks such that no other of the one of said first detection target marks and said second detection marks occur in each respective section: and a single one of said encircling cut lines is located on every two sections.

4. The label tape according to claim 3, wherein:

said second detection target marks are formed so that at least a part of each second detection mark is arranged in an area shared with said first detection target marks in a tape width direction.

* * * * *